United States Patent
Kami et al.

(10) Patent No.: US 9,540,793 B2
(45) Date of Patent: Jan. 10, 2017

(54) WORK MACHINE CONTROL SYSTEM, WORK MACHINE, AND WORK MACHINE CONTROL METHOD

(71) Applicant: Komatsu Ltd., Tokyo (JP)

(72) Inventors: Yoshiki Kami, Hadano (JP); Takeshi Takaura, Minou (JP)

(73) Assignee: Komatsu Ltd., Tokyo (JP)

( * ) Notice: Subject to any disclaimer, the term of this patent is extended or adjusted under 35 U.S.C. 154(b) by 299 days.

(21) Appl. No.: 14/386,094

(22) PCT Filed: May 30, 2014

(86) PCT No.: PCT/JP2014/064543
§ 371 (c)(1),
(2) Date: Sep. 18, 2014

(87) PCT Pub. No.: WO2015/181989
PCT Pub. Date: Dec. 3, 2015

(65) Prior Publication Data
US 2016/0244950 A1    Aug. 25, 2016

(51) Int. Cl.
*E02F 9/20* (2006.01)
*E02F 9/26* (2006.01)
(Continued)

(52) U.S. Cl.
CPC ............... *E02F 9/265* (2013.01); *E02F 3/435* (2013.01); *E02F 3/439* (2013.01); *E02F 9/2203* (2013.01);
(Continued)

(58) Field of Classification Search
None
See application file for complete search history.

(56) References Cited

U.S. PATENT DOCUMENTS

| | | | |
|---|---|---|---|
| 5,835,874 A * | 11/1998 | Hirata | ............ E02F 3/435 414/4 |
| 7,979,181 B2 * | 7/2011 | Clark | ............ E02F 3/434 414/685 |

(Continued)

FOREIGN PATENT DOCUMENTS

| | | |
|---|---|---|
| CN | 1157020 A | 8/1997 |
| EP | 0790355 A1 | 8/1997 |

(Continued)

OTHER PUBLICATIONS

International Search Report and Written Opinion mailed Oct. 7, 2014, issued for PCT/JP2014/064543.

*Primary Examiner* — Helal A Algahaim
*Assistant Examiner* — Donald J Wallace
(74) *Attorney, Agent, or Firm* — Locke Lord LLP

(57) ABSTRACT

A work machine control method of controlling a work machine including a work unit with a working tool, the work machine control method includes: detecting a position of the work unit; obtaining the position of the work unit based on the detected position information item and generating a first target excavation ground shape information item as an information item of an intersection portion of at least one target construction face indicating a target shape with respect to a first cut face which intersects a work unit operation plane as an operation plane for the work unit and is parallel to a vertical direction; and controlling a velocity in a direction in which the work unit approaches an excavation target so that the velocity becomes equal to or less than a limitation velocity based on the first target excavation ground shape information item.

22 Claims, 29 Drawing Sheets

(51) Int. Cl.
*E02F 3/43* (2006.01)
*E02F 9/22* (2006.01)
*G01C 15/00* (2006.01)
*E02F 3/32* (2006.01)

(52) U.S. Cl.
CPC .......... *E02F 9/2292* (2013.01); *E02F 9/2296* (2013.01); *E02F 9/262* (2013.01); *G01C 15/00* (2013.01); *E02F 3/32* (2013.01)

(56) References Cited

U.S. PATENT DOCUMENTS

| | | |
|---|---|---|
| 2013/0302124 A1 | 11/2013 | Matsuyama |
| 2013/0315699 A1 | 11/2013 | Matsuyama |
| 2014/0200776 A1 | 7/2014 | Matsuyama et al. |

FOREIGN PATENT DOCUMENTS

| | | |
|---|---|---|
| JP | 2013-217137 A | 10/2013 |
| JP | 2013-217138 A | 10/2013 |
| WO | WO-2012/127913 A1 | 9/2012 |
| WO | WO-2012/127914 A1 | 9/2012 |

\* cited by examiner

WORK MACHINE CONTROL SYSTEM, WORK MACHINE, AND WORK MACHINE CONTROL METHOD

FIELD

The present invention relates to a work machine control system including a work unit, a work machine, and a work machine control method.

BACKGROUND

Conventionally, in a construction machine including a front device with a bucket, there is proposed a control in which a bucket is moved along a target ground shape of an excavation target so that the bucket does not erode the target ground shape (for example, Patent Literature 1).

CITATION LIST

Patent Literature

Patent Literature 1: Japanese Laid-open Patent Publication No. 2013-217137

SUMMARY

Technical Problem

Incidentally, when a work unit is controlled so that the target ground shape is not eroded, an unnecessarily target ground shape sometimes appears. In such a case, an operator sometimes feels uncomfortable with operation different from the operation of the work unit, such as a sudden upward movement of the work unit.

An object of the invention is to operate a work unit according to an operator's intension.

Solution to Problem

According to the present invention, a work machine control system that controls a work machine including a work unit with a working tool, the work machine control system comprises: a position detection unit that detects a position information item of the work machine; a generation unit that obtains a position of the work unit based on the position information item detected by the position detection unit and generates a first target excavation ground shape information item as an information item of an intersection portion of at least one target construction face which indicates a target shape with respect to a first cut face which intersects a work unit operation plane as an operation plane for the work unit and is parallel to a vertical direction, and a work unit control unit that performs an excavation control so that a velocity in a direction in which the work unit approaches an excavation target becomes equal to or less than a limitation velocity based on the first target excavation ground shape information item acquired from the generation unit.

In the present invention, it is preferable that wherein the generation unit generates a second target excavation ground shape information item as an information item of an intersection portion of the at least one target construction face with respect to the work unit operation plane or a second cut face which is parallel to the work unit operation plane, and wherein the work unit control unit performs the excavation control based on the first target excavation ground shape information item and the second target excavation ground shape information item acquired from the generation unit.

According to the present invention, a work machine control system that controls a work machine including a work unit with a working tool, the work machine control system comprises: a position detection unit that detects a position information item of the work machine; a generation unit that obtains a position of the work unit based on the position information item detected by the position detection unit and generates a first target excavation ground shape information item as an information item of an intersection portion of a first cut face, which intersects a work unit operation plane as an operation plane for the work unit and is parallel to a vertical direction, with respect to a first target construction face which indicates a target shape and a second target construction face which is continuous to a lateral side of the first target construction face; and a work unit control unit that performs an excavation control so that a velocity in a direction in which the work unit approaches an excavation target becomes equal to or less than a limitation velocity based on the first target excavation ground shape information item acquired from the generation unit.

In the present invention, it is preferable that wherein the generation unit generates a second target excavation ground shape information item as an information item of an intersection portion of the first target construction face with respect to the work unit operation plane or a second cut face which is parallel to the work unit operation plane, and wherein the work unit control unit performs the excavation control based on the first target excavation ground shape information item and the second target excavation ground shape information item acquired from the generation unit.

In the present invention, it is preferable that wherein the work unit control unit performs the excavation control based on the second target excavation ground shape information item, and stops the excavation control which is currently performed or resumes the excavation control which is currently stopped based on the first target excavation ground shape information item.

In the present invention, it is preferable that wherein the work unit control unit stops the excavation control when an angle of the first target excavation ground shape information item directly below the working tool with respect to a horizontal plane of the work machine is equal to or more than a predetermined magnitude.

In the present invention, it is preferable that wherein the work unit control unit performs the excavation control based on a shortest distance between a blade tip of the working tool and the first target excavation ground shape information item.

In the present invention, it is preferable that wherein the work unit control unit determines whether to perform the excavation control on the target construction face corresponding to the first target excavation ground shape information item based on a distance between a blade tip of the working tool and the first target excavation ground shape information item.

In the present invention, it is preferable that wherein the work machine includes a swing body that has the work unit attached thereto and that swings about a predetermined axis, and wherein the work unit control unit performs the excavation control when the work unit is swinging along with the swing body.

In the present invention, it is preferable that the work unit control unit performs the excavation control based on a velocity having a target velocity in a direction in which the work unit swings synthesized with a target velocity in a front to back direction of the working tool.

In the present invention, it is preferable that the work machine control system comprises: a detection device that is provided in the work machine and detects an angular velocity and acceleration, wherein a position of the work unit is predicted by using a swing velocity of the work unit detected by the detection device.

According to the present invention, a work machine comprises: the work machine control system.

According to the present invention, a work machine control method of controlling a work machine including a work unit with a working tool, the work machine control method comprises: detecting a position of the work unit; obtaining the position of the work unit based on the detected position information item and generating a first target excavation ground shape information item as an information item of an intersection portion of at least one target construction face indicating a target shape with respect to a first cut face which intersects a work unit operation plane as an operation plane for the work unit and is parallel to a vertical direction; and controlling a velocity in a direction in which the work unit approaches an excavation target so that the velocity becomes equal to or less than a limitation velocity based on the first target excavation ground shape information item.

In the present invention, it is preferable that wherein the controlling includes controlling the velocity in a direction in which the work unit approaches the excavation target so that the velocity becomes equal to or less than the limitation velocity based on the first target excavation ground shape information item and a second target excavation ground shape information item as an information item of an intersection portion of the at least one target construction face with respect to the work unit operation plane or a second cut face which is parallel to the work unit operation plane.

In the present invention, it is preferable that wherein in a case where a control is performed in which the velocity in a direction in which the work unit approaches the excavation target becomes equal to or less than the limitation velocity, it is determined whether to perform the excavation control on the target construction face corresponding to the first target excavation ground shape information item based on a distance between a blade tip of the working tool and the first target excavation ground shape information item.

In the present invention, it is preferable that the excavation control is performed when the work unit is swinging along with the swing body provided in the work machine.

According to the present invention, it is possible to operate a work unit according to an operator's intension.

DESCRIPTION OF EMBODIMENTS

A mode for carrying out the present invention (an embodiment) will be described in detail with reference to the drawings.

First Embodiment

Entire Configuration of Work Machine

Figure 1:
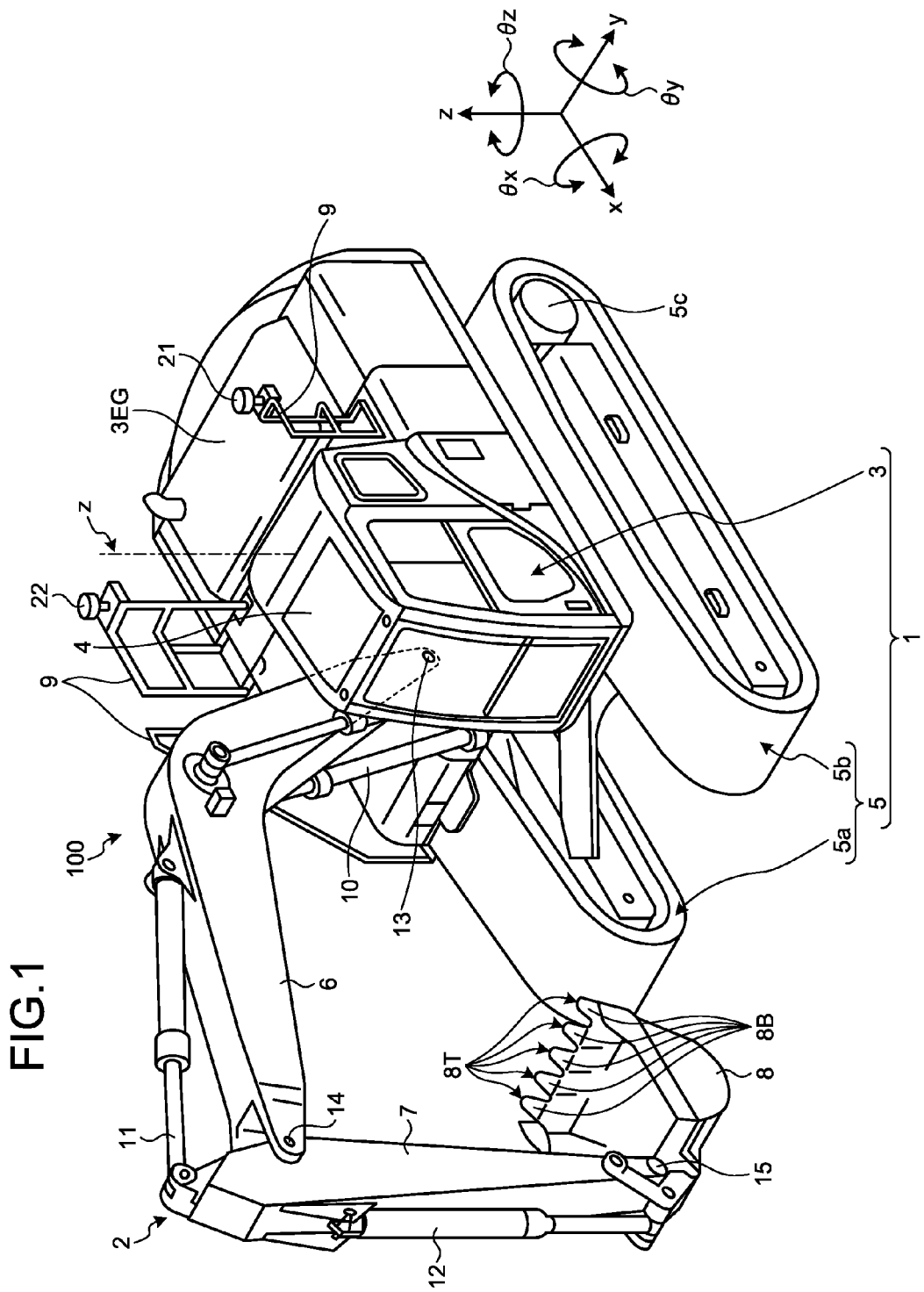
FIG. 1 is a perspective view of a work machine according to a first embodiment.
Figure 2:
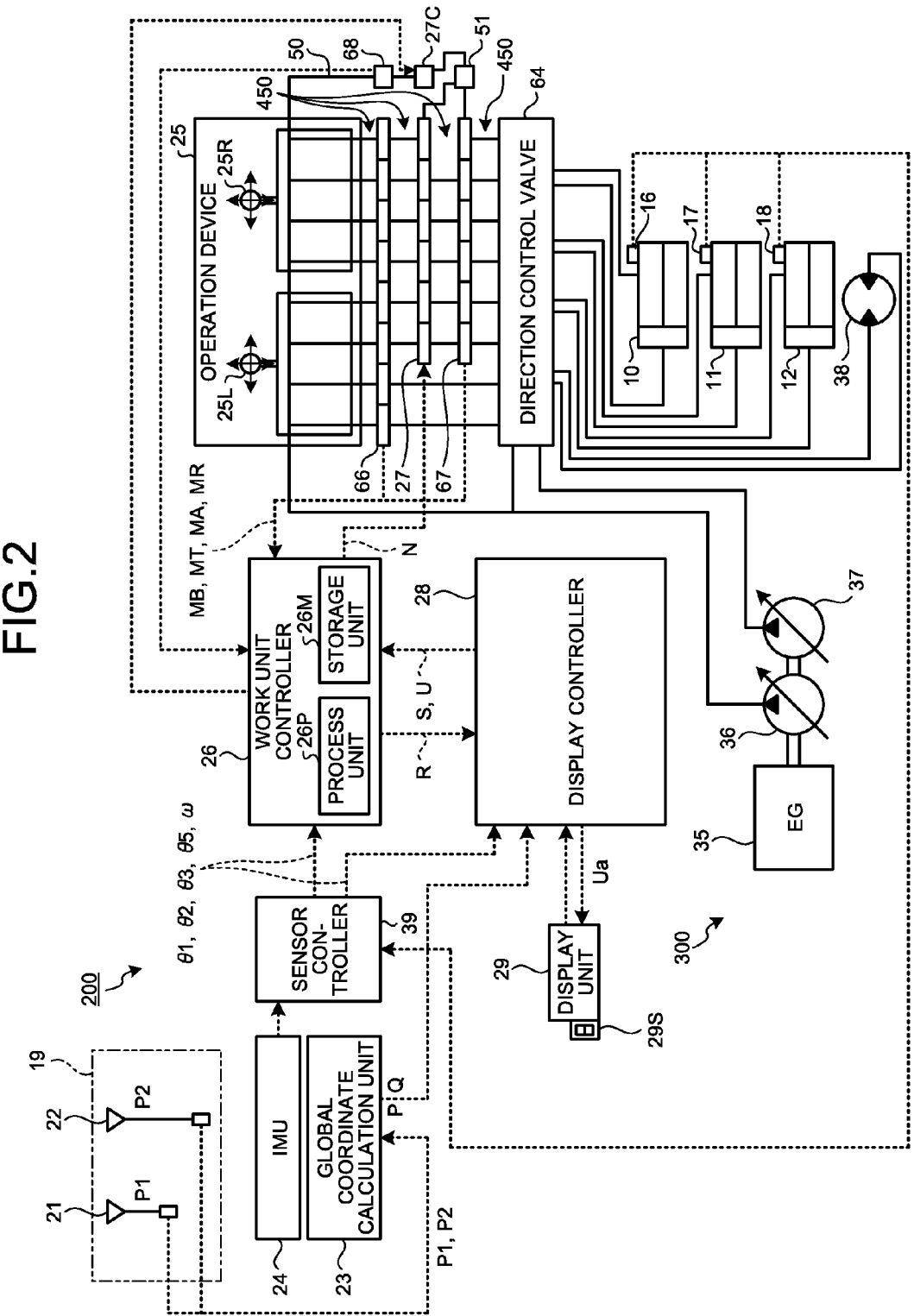
FIG. 2 is a block diagram illustrating configurations of a drive system and a control system of an excavator.

FIG. 1 is a perspective view of a work machine according to a first embodiment. FIG. 2 is a block diagram illustrating configurations of a hydraulic system 300 and a control system 200 of an excavator 100. The excavator 100 as the work machine includes a vehicle body 1 as a main body and a work unit 2. The vehicle body 1 includes an upper swing body 3 as a swing body and a traveling device 5 as a traveling body. The upper swing body 3 accommodates devices such as an engine and a hydraulic pump as a power generation device inside an engine room 3EG. The engine room 3EG is disposed at one end side of the upper swing body 3.

In the present embodiment, the excavator 100 uses, for example, an internal combustion engine such as a diesel engine for the engine as the power generation device, but the power generation device is not limited thereto. The power generation device of the excavator 100 may be, for example, a so-called hybrid-type device having a combination of an internal combustion engine, a generator motor, and an electrical storage device. Furthermore, the power generation device of the excavator 100 may be a device having a combination of the electrical storage device and the generator motor without the internal combustion engine.

The upper swing body 3 includes an operation room 4. The operation room 4 is installed at the other end side of the upper swing body 3. That is, the operation room 4 is installed at the opposite side to the side where the engine room 3EG is disposed. A display unit 29 and an operation device 25 illustrated in FIG. 2 are disposed inside the operation room 4. These will be described later. A handrail 9 is attached to the upper side of the upper swing body 3.

The traveling device 5 has the upper swing body 3 mounted thereon. The traveling device 5 includes crawler tracks 5a and 5b. The traveling device 5 causes the excavator 100 to travel in a manner such that one or both right and left traveling motors 5c are driven to rotate the crawler tracks 5a and 5b. The work unit 2 is attached to the lateral side of the operation room 4 of the upper swing body 3.

The excavator 100 may include a traveling device that includes tires instead of the crawler tracks 5a and 5b and that is capable of traveling by transmitting a drive force of an engine to the tires through a transmission. As the excavator 100 in such a mode, for example, there is a wheel-type excavator. Furthermore, the excavator 100 may be, for example, a backhoe loader which includes a traveling device with such tires, further has a work unit attached to a vehicle body (a main body) and has a structure that does not include the upper swing body 3 and a swing mechanism thereof illustrated in FIG. 1. That is, the backhoe loader is a backhoe loader having the work unit attached to the vehicle body and including the traveling device that forms a part of the vehicle body.

In the upper swing body 3, the side where the work unit 2 and the operation room 4 are disposed is the front side, and the side where the engine room 3EG is disposed is the rear side (the x direction). The left side in face of the front side is the left side of the upper swing body 3, and the right side in face of the front side is the right side of the upper swing body 3. The right and left direction of the upper swing body 3 will also be referred to as the width direction (the y direction). In the excavator 100 or the vehicle body 1, the traveling device 5 side based on the upper swing body 3 is the lower side, and the upper swing body 3 side based on the traveling device 5 is the upper side (the z direction). In the case where the excavator 100 is installed on the horizontal plane, the lower side is the side in the vertical direction, that is, the gravity action direction, and the upper side is the opposite side to the vertical direction.

The work unit 2 includes a boom 6, an arm 7, a bucket 8 as a working tool, a boom cylinder 10, an arm cylinder 11, and a bucket cylinder 12. A base end of the boom 6 is rotatably attached to the front portion of the vehicle body 1 through a boom pin 13. The base end of the arm 7 is rotatably attached to a front end of the boom 6 through an arm pin 14. The bucket 8 is attached to a front end of the arm 7 through a bucket pin 15. The bucket 8 rotates about the bucket pin 15. In the bucket 8, a plurality of blades 8B are attached to the opposite side to the bucket pin 15. Blade tips 8T are tips of the blades 8B.

The bucket 8 may not include the plurality of blades 8B. That is, the bucket 8 may be a bucket which does not include the blades 8B illustrated in FIG. 1 and which has the blade tips formed in a straight shape by a steel plate. The work unit 2 may include, for example, a tilting bucket with a single blade. The tilting bucket refers to a bucket which includes a bucket tilting cylinder and can shape and level an inclined or flat ground in a free fashion by tilting the bucket to the right and left even when the excavator is on an inclined ground surface and also can perform surface compaction work by using a bottom plate. In addition, the work unit 2 may include, for example, a slope finishing bucket or a rock drilling arm attachment with a rock drilling arm tip instead of the bucket 8.

Each of the boom cylinder 10, the arm cylinder 11, and the bucket cylinder 12 illustrated in FIG. 1 is a hydraulic cylinder which is driven by the pressure of the working oil (hereinafter, appropriately referred to as a hydraulic pressure). The boom cylinder 10 drives the boom 6 and moves the boom upward. The arm cylinder 11 drives the arm 7 and rotates the arm about the arm pin 14. The bucket cylinder 12 drives the bucket 8 and rotates the bucket about the bucket pin 15.

A direction control valve 64 illustrated in FIG. 2 is provided between the hydraulic cylinders such as the boom cylinder 10, the arm cylinder 11, and the bucket cylinder 12 and hydraulic pumps 36 and 37 illustrated in FIG. 2. The direction control valve 64 controls the flow amount of the working oil supplied from the hydraulic pumps 36 and 37 to the boom cylinder 10, the arm cylinder 11, the bucket cylinder 12 and the like and also changes the direction in which the working oil flows. The direction control valve 64 includes a traveling direction control valve which drives the traveling motor 5c and a work unit direction control valve which controls the boom cylinder 10, the arm cylinder 11, and the bucket cylinder 12 and controls a swing motor that causes the upper swing body 3 to swing.

When the working oil supplied from the operation device 25 and adjusted to a predetermined pilot pressure operates a spool of the direction control valve 64, the flow amount of the working oil flowing from the direction control valve 64 is adjusted, and the flow amount of the working oil supplied from the hydraulic pumps 36 and 37 to the boom cylinder 10, the arm cylinder 11, the bucket cylinder 12, the swing motor, or the traveling motor 5c is controlled. As a result, the operation of the boom cylinder 10, the arm cylinder 11, the bucket cylinder 12 and the like is controlled.

Furthermore, since the pilot pressure of the working oil supplied from the operation device 25 to the direction control valve 64 is controlled in a manner such that a work unit controller 26 illustrated in FIG. 2 controls a control valve 27 illustrated in FIG. 2, the flow amount of the working oil supplied from the direction control valve 64 to the boom cylinder 10, the arm cylinder 11, and the bucket cylinder 12 is controlled. As a result, the work unit controller 26 can control the operation of the boom cylinder 10, the arm cylinder 11, the bucket cylinder 12 and the like.

Antennas 21 and 22 are attached to an upper portion of the upper swing body 3. The antennas 21 and 22 are used to detect the current position of the excavator 100. As illustrated in FIG. 2, the antennas 21 and 22 are electrically connected to a position detection device 19 as a position detection unit that detects the current position of the excavator 100. The position detection device 19 detects the current position of the excavator 100 by using RTK-GNSS (RealTime Kinematic-Global Navigation Satellite Systems; GNSS refers to a global navigation satellite system). Hereinafter, the antennas 21 and 22 will be appropriately referred to as the GNSS antennas 21 and 22. A signal responding to the GNSS radio wave received by the GNSS antennas 21 and 22 is input to the position detection device 19. The position detection device 19 detects installation positions of the GNSS antennas 21 and 22. The position detection device 19 includes, for example, a three-dimensional position sensor.

As illustrated in FIG. 1, it is desirable to install the GNSS antennas 21 and 22 at both end positions separated from each other in the right and left direction of the excavator 100 on the upper swing body 3. In the present embodiment, the GNS antennas 21 and 22 are attached to the handrails 9 attached at both sides in the width direction of the upper swing body 3, respectively. The attachment positions of the GNS antennas 21 and 22 in the upper swing body 3 are not limited to the handrails 9, but it is desirable to install the GNS antennas 21 and 22 at positions separated from each other as much as possible because the detection precision of the current position of the excavator 100 improves. Furthermore, it is desirable to install the GNSS antennas 21 and 22 at positions where the eyesight of the operator is not disturbed as much as possible.

As illustrated in FIG. 2, the hydraulic system 300 of the excavator 100 includes an engine 35 and the hydraulic pumps 36 and 37 as the power generation source. The hydraulic pumps 36 and 37 are driven by the engine 35 and eject the working oil. The working oil which is ejected from the hydraulic pumps 36 and 37 is supplied to the boom cylinder 10, the arm cylinder 11, and the bucket cylinder 12. Furthermore, the excavator 100 includes a swing motor 38. The swing motor 38 is a hydraulic motor, and is driven by the working oil ejected from the hydraulic pumps 36 and 37. The swing motor 38 causes the upper swing body 3 to swing. Note that two hydraulic pumps 36 and 37 are illustrated in FIG. 2, but only one hydraulic pump may be provided. The swing motor 38 is not limited to the hydraulic motor, and may also be an electric motor.

The control system 200 as the work machine control system includes the position detection device 19, a global coordinate calculation unit 23, an IMU (Inertial Measurement Unit) 24 as a detection device that detects an angular velocity and acceleration, the operation device 25, the work unit controller 26 as a work unit control unit, a sensor controller 39, a display controller 28 as a generation unit, and the display unit 29. The operation device 25 is a device that operates the work unit 2 illustrated in FIG. 1. The operation device 25 receives operator's operation of driving the work unit 2 and outputs the working oil responding to the operation amount.

For example, the operation device 25 includes a left operation lever 25L which is installed at the left side of the operator and a right operation lever 25R which is disposed at the right side of the operator. In the left operation lever 25L and the right operation lever 25R, the operation in the front to back direction and the right and left direction corresponds to the operation of two shafts. For example, the operation in the front to back direction of the right operation lever 25R corresponds to the operation of the boom 6. The boom 6 moves downward when the right operation lever 25R is operated forward, and the boom 6 moves upward when the right operation lever is operated backward. The operation of upward and downward movement of the boom 6 is performed in response to the operation in the front to back direction. The operation in the right and left direction of the right operation lever 25R corresponds to the operation of the bucket 8. The bucket 8 excavates when the right operation lever 25R is operated leftward, and the bucket 8 dumps when the right operation lever is operated rightward. The excavation operation or the opening operation of the bucket 8 is performed in response to the operation in the right and left direction. The operation in the front to back direction of the left operation lever 25L corresponds to the swing of the arm 7. The arm 7 dumps when the left operation lever 25L is operated forward, and the arm 7 excavates when the left operation lever is operated backward. The operation in the right and left direction of the left operation lever 25L corresponds to the swing of the upper swing body 3. The upper swing body swings leftward when the left operation lever 25L is operated leftward, and the upper swing body swings rightward when the left operation lever is operated rightward.

In the present embodiment, the upward movement operation of the boom 6 is equivalent to the dumping operation. The downward movement operation of the boom 6 is equivalent to the excavation operation. The excavation operation of the arm 7 is equivalent to the downward movement operation. The dumping operation of the arm 7 is equivalent to the upward movement operation. The excavation operation of the bucket 8 is equivalent to the downward movement operation. The dumping operation of the bucket 8 is equivalent to the upward movement operation. Note that the downward movement operation of the arm 7 may also be referred to as bending operation. The upward movement operation of the arm 7 may also be referred to as extension operation.

In the present embodiment, a pilot hydraulic type is used in the operation device 25. The working oil which is depressurized to a predetermined pilot pressure by a depressurization valve (not illustrated) is supplied from the hydraulic pump 36 to the operation device 25 based on the boom operation, the bucket operation, the arm operation, and the swing operation.

A pilot hydraulic pressure can be supplied to a pilot passageway 450 in response to the operation in the front to back direction of the right operation lever 25R, and the operation of the boom 6 by the operator is received. The valve device that is included in the right operation lever 25R opens in response to the operation amount of the right operation lever 25R, and the working oil is supplied to the pilot passageway 450. Furthermore, a pressure sensor 66 detects the pressure of the working oil inside the pilot passageway 450 at that time as the pilot pressure. The pressure sensor 66 transmits the detected pilot pressure as a boom operation amount MB to the work unit controller 26. Hereinafter, the operation amount in the front to back direction of the right operation lever 25R will be appropriately referred to as the boom operation amount MB. A pressure sensor 68, a control valve (hereinafter, appropriately referred to as an interposition valve) 27C, and a shuttle valve 51 are provided in a pilot passageway 50 between the operation device 25 and the boom cylinder 10. The interposition valve 27C and the shuttle valve 51 will be described later.

A pilot hydraulic pressure can be supplied to the pilot passageway 450 in response to the operation in the right and left direction of the right operation lever 25R, and the operation of the bucket 8 by the operator is received. The valve device that is included in the right operation lever 25R opens in response to the operation amount of the right operation lever 25R, and the working oil is supplied to the pilot passageway 450. Furthermore, the pressure sensor 66 detects the pressure of the working oil inside the pilot passageway 450 at that time as the pilot pressure. The pressure sensor 66 transmits the detected pilot pressure as a bucket operation amount MT to the work unit controller 26. Hereinafter, the operation amount in the right and left direction of the right operation lever 25R will be appropriately referred to as the bucket operation amount MT.

A pilot hydraulic pressure can be supplied to the pilot passageway 450 in response to the operation in the front to back direction of the left operation lever 25L, and the operation of the arm 7 by the operator is received. The valve device that is included in the left operation lever 25L opens in response to the operation amount of the left operation lever 25L, and the working oil is supplied to the pilot passageway 450. Furthermore, the pressure sensor 66 detects the pressure of the working oil inside the pilot passageway 450 at that time as the pilot pressure. The pressure sensor 66 transmits the detected pilot pressure as an arm operation amount MA to the work unit controller 26. Hereinafter, the operation amount in the right and left direction of the left operation lever 25L will be appropriately referred to as the arm operation amount MA.

A pilot hydraulic pressure can be supplied to the pilot passageway 450 in response to the operation in the right and left direction of the left operation lever 25L, and the operation of the upper swing body 3 by the operator is received. The valve device that is included in the left operation lever 25L opens in response to the operation amount of the left operation lever 25L, and the working oil is supplied to the pilot passageway 450. Furthermore, the pressure sensor 66 detects the pressure of the working oil inside the pilot passageway 450 at that time as the pilot pressure. The pressure sensor 66 transmits the detected pilot pressure as a swing operation amount MR to the work unit controller 26. Hereinafter, the operation amount in the front to back direction of the left operation lever 25L will be appropriately referred to as the swing operation amount MR.

The operation device 25 supplies a pilot hydraulic pressure of a magnitude responding to the operation amount of the right operation lever 25R to the direction control valve 64 in a manner such that the right operation lever 25R is operated. The operation device 25 supplies a pilot hydraulic pressure of a magnitude responding to the operation amount of the left operation lever 25L to the control valve 27 in a manner such that the left operation lever 25L is operated. The spool of the direction control valve 64 is operated by the pilot hydraulic pressure.

The pilot passageway 450 is provided with the control valve 27. The operation amounts of the right operation lever 25R and the left operation lever 25L are detected by the pressure sensor 66 provided in the pilot passageway 450. The pilot hydraulic pressure detected by the pressure sensor 66 is input to the work unit controller 26. The work unit controller 26 outputs a control signal N of the pilot passageway 450 responding to the input pilot hydraulic pressure to the control valve 27, and opens and closes the pilot passageway 450.

The work unit 2 may be controlled in a manner such that the operation amounts of the left operation lever 25L and the right operation lever 25R are detected by for example, a potentiometer and a hall IC and the work unit controller 26 controls the direction control valve 64 and the control valve 27 based on the detection values. In this way, the left operation lever 25L and the right operation lever 25R may be of an electric type. The swing operation and the arm operation may be replaced. In this case, the extension operation or the bending operation of the arm 7 is performed in response to the operation in the right and left direction of the left operation lever 25L, and the swing operation in the right and left direction of the upper swing body 3 is performed in response to the operation in the front to back direction of the left operation lever 25L.

The control system 200 includes a first stroke sensor 16, a second stroke sensor 17, and a third stroke sensor 18. For example, the first stroke sensor 16 is provided in the boom cylinder 10, the second stroke sensor 17 is provided in the arm cylinder 11, and the third stroke sensor 18 is provided in the bucket cylinder 12. The first stroke sensor 16 detects a stroke length LS1 of the boom cylinder 10. The first stroke sensor 16 detects a displacement amount corresponding to the extension of the boom cylinder 10, and outputs the displacement amount to the sensor controller 39. The sensor controller 39 calculates a cylinder length of the boom cylinder 10 (hereinafter, appropriately referred to as a boom cylinder length) corresponding to the displacement amount of the first stroke sensor 16. The sensor controller 39 calculates a local coordinate system of the excavator 100, specifically, an inclination angle θ1 of the boom 6 with respect to the direction (the z direction) perpendicular to the horizontal plane in a local coordinate system of the vehicle body 1 from the boom cylinder length detected by the first stroke sensor 16, and outputs the inclination angle to the work unit controller 26 and the display controller 28.

The second stroke sensor 17 detects a stroke length LS2 of the arm cylinder 11. The second stroke sensor 17 detects a displacement amount corresponding to the extension of the arm cylinder 11, and outputs the displacement amount to the sensor controller 39. The sensor controller 39 calculates a cylinder length of the arm cylinder 11 (hereinafter, appropriately referred to as an arm cylinder length) corresponding to the displacement amount of the second stroke sensor 17. The sensor controller 39 calculates an inclination angle $\theta 2$ of the arm 7 with respect to the boom 6 from the arm cylinder length detected by the second stroke sensor 17, and outputs the inclination angle to the work unit controller 26 and the display controller 28. The third stroke sensor 18 detects a stroke length LS3 of the bucket cylinder 12. The third stroke sensor 18 detects a displacement amount corresponding to the extension of the bucket cylinder 12, and outputs the displacement amount to the sensor controller 39. The sensor controller 39 calculates a cylinder length of the bucket cylinder 12 (hereinafter, appropriately referred to as a bucket cylinder length) corresponding to the displacement amount of the third stroke sensor 18.

The sensor controller 39 calculates an inclination angle $\theta 3$ of the blade tip 8T of the bucket 8 included in the bucket 8 with respect to the arm 7 from the bucket cylinder length detected by the third stroke sensor 18, and outputs the inclination angle to the work unit controller 26 and the display controller 28. Other than the measurement of the inclination angle $\theta 1$, the inclination angle $\theta 2$, and the inclination angle $\theta 3$ of the boom 6, the arm 7, and the bucket 8 by the first stroke sensor 16 and the like, the inclination angles may be acquired by a rotary encoder which is attached to the boom 6 and measures the inclination angle of the boom 6, a rotary encoder which is attached to the arm 7 and measures the inclination angle of the arm 7, and a rotary encoder which is attached to the bucket 8 and measures the inclination angle of the bucket 8.

The work unit controller 26 includes a storage unit 26M such as a RAM (Random Access Memory) and a ROM (Read Only Memory) and a process unit 26P such as a CPU (Central Processing Unit). The work unit controller 26 controls the control valve 27 and the interposition valve 27C based on the detection value of the pressure sensor 66 illustrated in FIG. 2.

The direction control valve 64 illustrated in FIG. 2 is, for example, a proportional control valve, and is controlled by the working oil supplied from the operation device 25. The direction control valve 64 is disposed between the hydraulic actuators such as the boom cylinder 10, the arm cylinder 11, the bucket cylinder 12, and the swing motor 38 and the hydraulic pumps 36 and 37. The direction control valve 64 controls the flow amount of the working oil supplied from the hydraulic pumps 36 and 37 to the boom cylinder 10, the arm cylinder 11, the bucket cylinder 12, and the swing motor 38.

The position detection device 19 included in the control system 200 detects the position of the excavator 100. The position detection device 19 includes the above-described GNSS antennas 21 and 22. A signal responding to the GNSS radio wave received by the GNSS antennas 21 and 22 is input to the global coordinate calculation unit 23. The GNSS antenna 21 receives a reference position data item P1 indicating its own position from a positioning satellite. The GNSS antenna 22 receives a reference position data item P2 indicating its own position from the positioning satellite. The GNSS antennas 21 and 22 receive the reference position data items P1 and P2 at, for example, a frequency of 10 Hz. The reference position data items P1 and P2 are information items of the position where the GNSS antenna is installed. The GNSS antennas 21 and 22 are output to the global coordinate calculation unit 23 each time the reference position data items P1 and P2 are received.

The global coordinate calculation unit 23 acquires the two reference position data items P1 and P2 (a plurality of reference position data items) represented by the global coordinate system. The global coordinate calculation unit 23 generates a swing body arrangement data item indicating the arrangement of the upper swing body 3 based on the two reference position data items P1 and P2. In the present embodiment, the swing body arrangement data item includes one reference position data item P of the two reference position data items P1 and P2 and a swing body orientation data item Q generated based on the two reference position data items P1 and P2. The swing body orientation data item Q is determined based on an angle of the orientation determined from the reference position data item P acquired by the GNSS antennas 21 and 22 with respect to the reference orientation (for example, the north) of the global coordinate. The swing body orientation data item Q indicates the orientation in which the upper swing body 3, that is, the work unit 2 faces. The global coordinate calculation unit 23 updates the swing body arrangement data item, that is, the reference position data item P and the swing body orientation data item Q each time the two reference position data items P1 and P2 are acquired by the GNSS antennas 21 and 22 at, for example, a frequency of 10 Hz, and outputs the data item to the work unit controller 26 and the display controller 28.

The IMU 24 is attached to the upper swing body 3. The IMU 24 detects an operation data item indicating the operation of the upper swing body 3. The operation data item detected by the IMU 24 is, for example, acceleration and an angular velocity. In the present embodiment, the operation data item is a swing angular velocity $\omega$ at which the upper swing body 3 swings about a swing axis z of the upper swing body 3 illustrated in FIG. 1. For example, the swing angular velocity $\omega$ is obtained by differentiating the swing angle of the upper swing body 3 detected by the IMU 24 by time. The swing angle of the upper swing body 3 may be acquired from the position information items of the GNSS antennas 21 and 22.

Figure 3A:
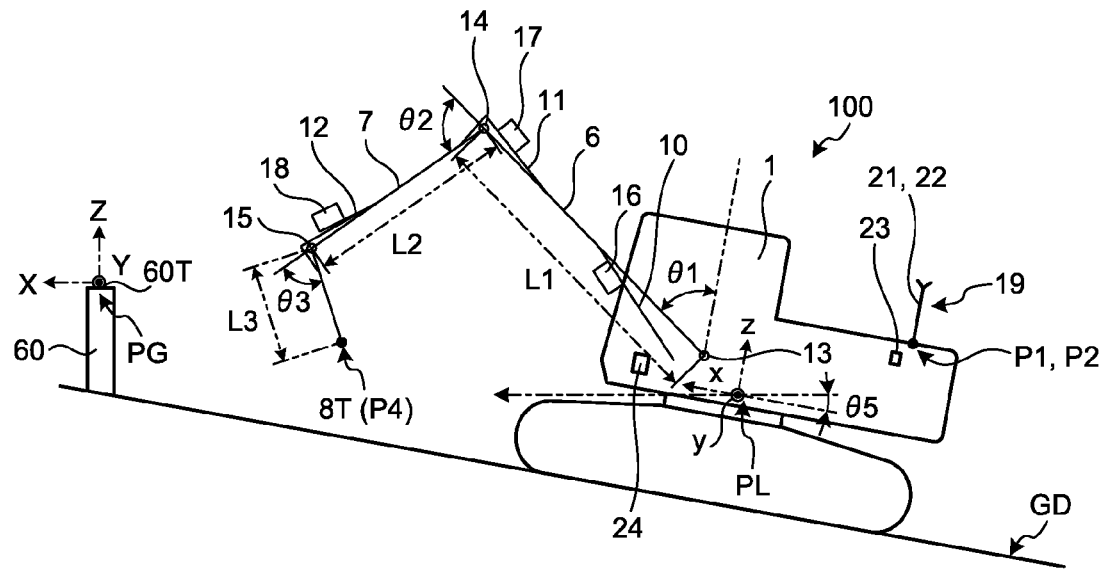
FIG. 3A is a side view of the excavator.
Figure 3B:
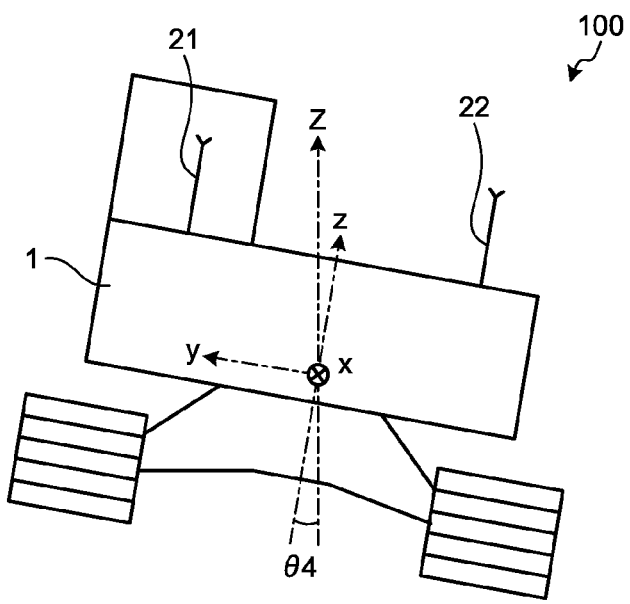
FIG. 3B is a rear view of the excavator.

FIG. 3A is a side view of the excavator 100. FIG. 3B is a rear view of the excavator 100. As illustrated in FIGS. 3A and 3B, the IMU 24 detects an inclination angle $\theta 4$ with respect to the right and left direction of the vehicle body 1, an inclination angle $\theta 5$ with respect to the front to back direction of the vehicle body 1, acceleration, and an angular velocity. The IMU 24 updates the swing angular velocity $\omega$, the inclination angle $\theta 4$, and the inclination angle $\theta 5$ at, for example, a frequency of 100 Hz. It is desirable that an updating cycle in the IMU 24 be shorter than an updating cycle in the global coordinate calculation unit 23. The swing angular velocity $\omega$ and the inclination angle $\theta 5$ detected by the IMU 24 are output to the sensor controller 39. The sensor controller 39 subjects the swing angular velocity $\omega$ and the inclination angle $\theta 5$ to a filter process or the like, and then outputs the swing angular velocity and the inclination angle to the work unit controller 26 and the display controller 28.

The display controller 28 acquires the swing body arrangement data item (the reference position data item P and the swing body orientation data item Q) from the global coordinate calculation unit 23. In the present embodiment, the display controller 28 generates a bucket blade tip position data item S indicating a three-dimensional position of the blade tip 8T of the bucket 8 as the work unit position data item. Then, the display controller 28 generates a target excavation ground shape data item U as an information item indicating a target shape of an excavation target by using the bucket blade tip position data item S and a target construction information item T to be described later. The display controller 28 derives a display target excavation ground shape data item Ua based on the target excavation ground shape data item U, and causes the display unit 29 to display a target excavation ground shape 43I based on the display target excavation ground shape data item Ua.

The display unit 29 is, for example, a liquid crystal display or the like, but is not limited thereto. In the present embodiment, a switch 29S is installed near the display unit 29. The switch 29S is an input device used to determine whether to perform an excavation control to be described below.

The work unit controller 26 acquires the swing angular velocity ω indicating the swing angular velocity ω at which the upper swing body 3 swings about the swing axis z illustrated in FIG. 1 from the sensor controller 39. Furthermore, the work unit controller 26 acquires a boom operation signal MB, a bucket operation signal MT, an arm operation signal MA, and a swing operation signal MR from the pressure sensor 66. The work unit controller 26 acquires the inclination angle θ1 of the boom 6, the inclination angle θ2 of the arm 7, and the inclination angle θ3 of the bucket 8 from the sensor controller 39.

The work unit controller 26 acquires the target excavation ground shape data item U from the display controller 28. The work unit controller 26 calculates a position of the blade tip 8T of the bucket 8 (hereinafter, appropriately referred to as a blade tip position) from the angle of the work unit 2 acquired from the sensor controller 39. The work unit controller 26 adjusts the boom operation amount MB, the bucket operation amount MT, and the arm operation amount MA input from the operation device 25 based on the distance between the target excavation ground shape data item U and the blade tip 8T of the bucket 8 and the velocity so that the blade tip 8T of the bucket 8 moves along the target excavation ground shape data item U. The work unit controller 26 generates the control signal N used for controlling the work unit 2 so that the blade tip 8T of the bucket 8 moves along the target excavation ground shape data item U, and outputs the control signal to the control valve 27 illustrated in FIG. 2. By such a process, the velocity at which the work unit 2 approaches the target excavation ground shape data item U is limited in response to the distance with respect to the target excavation ground shape data item U.

The two control valves 27 provided in each of the boom cylinder 10, the arm cylinder 11, and the bucket cylinder 12 open and close in response to the control signal N from the work unit controller 26. The spool of the direction control valve 64 is operated based on the operation of the left operation lever 25L or the right operation lever 25R and an opening/closing instruction of the control valve 27, and the working oil is supplied to the boom cylinder 10, the arm cylinder 11, and the bucket cylinder 12.

The global coordinate calculation unit 23 detects the reference position data items P1 and P2 of the GNSS antennas 21 and 22 in the global coordinate system. The global coordinate system is a three-dimensional coordinate system indicated by (X, Y, Z) which is based on, for example, a reference position PG of an alignment marker 60 serving as a reference installed in a working area GD of the excavator 100. As illustrated in FIG. 3A, the reference position PG is located at, for example, a tip 60T of the alignment marker 60 installed in the working area GD. In the present embodiment, the global coordinate system refers to, for example, a coordinate system in GNSS.

The display controller 28 illustrated in FIG. 2 calculates the position of the local coordinate system when viewed in the global coordinate system based on the detection result by the position detection device 19. The local coordinate system refers to a three-dimensional coordinate system indicated by (x, y, z) which is based on the excavator 100. In the present embodiment, a reference position PL of the local coordinate system is located on, for example, a swing circle used for the upper swing body 3 to swing. In the present embodiment, for example, the work unit controller 26 calculates the position of the local coordinate system when viewed in the global coordinate system as below.

The sensor controller 39 calculates the inclination angle θ1 of the boom 6 with respect to the direction (the z direction) perpendicular to the horizontal plane in the local coordinate system from the boom cylinder length detected by the first stroke sensor 16. The work unit controller 26 calculates the inclination angle θ2 of the arm 7 with respect to the boom 6 from the arm cylinder length detected by the second stroke sensor 17. The work unit controller 26 calculates the inclination angle θ3 of the bucket 8 with respect to the arm 7 from the bucket cylinder length detected by the third stroke sensor 18.

A storage unit 26M of the work unit controller 26 stores a data item of the work unit 2 (hereinafter, appropriately referred to as a work unit data item). The work unit data item includes a length L1 of the boom 6, a length L2 of the arm 7, and a length L3 of the bucket 8. As illustrated in FIG. 3A, the length L1 of the boom 6 is equivalent to the length from the boom pin 13 to the arm pin 14. The length L2 of the arm 7 is equivalent to the length from the arm pin 14 to the bucket pin 15. The length L3 of the bucket 8 is equivalent to the length from the bucket pin 15 to the blade tip 8T of the bucket 8. The blade tip 8T is the tip of the blade 8B illustrated in FIG. 1. Furthermore, the work unit data item includes the position information item to the boom pin 13 with respect to the reference position PL of the local coordinate system.

Figure 4:
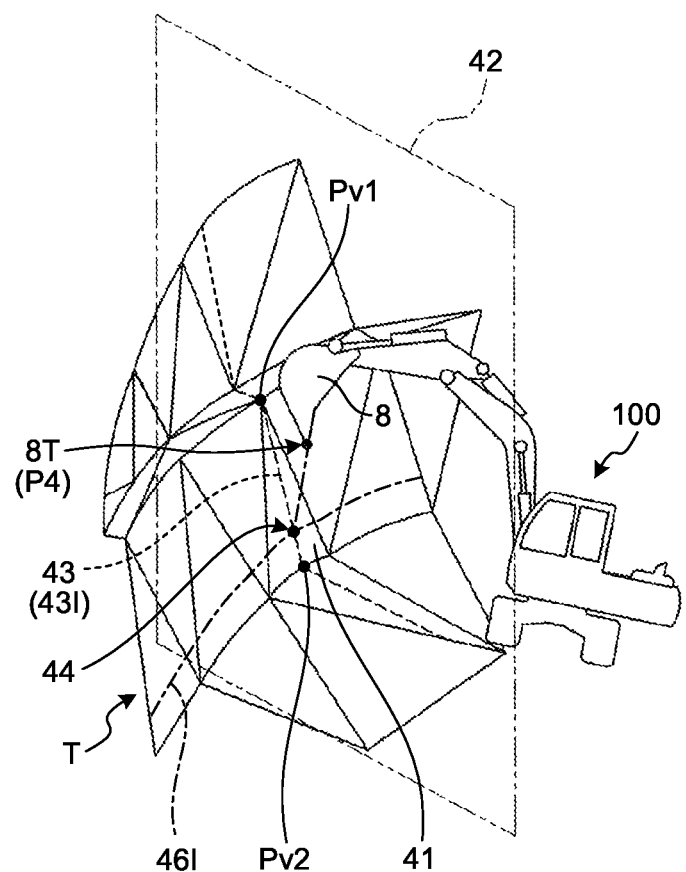
FIG. 4 is a schematic diagram illustrating an example of a target construction information item.

FIG. 4 is a schematic diagram illustrating an example of a target construction face. As illustrated in FIG. 4, the target construction information item T serving as a finish target after excavation of the excavation target of the work unit 2 included in the excavator 100 includes a plurality of target construction faces 41 respectively expressed by triangular polygons. In FIG. 4, only one of the plurality of target construction faces 41 is denoted by reference numeral 41, and the reference numerals of the other target construction faces 41 are omitted. The work unit controller 26 controls the velocity in a direction in which the work unit 2 approaches the excavation target so that the velocity is equal to or less than a limitation velocity in order to restrain the bucket 8 from eroding the target excavation ground shape 43I. This control will be appropriately referred to as an excavation control. Next, the excavation control that is performed by the work unit controller 26 will be described.

<Regarding Excavation Control>

Figure 5:
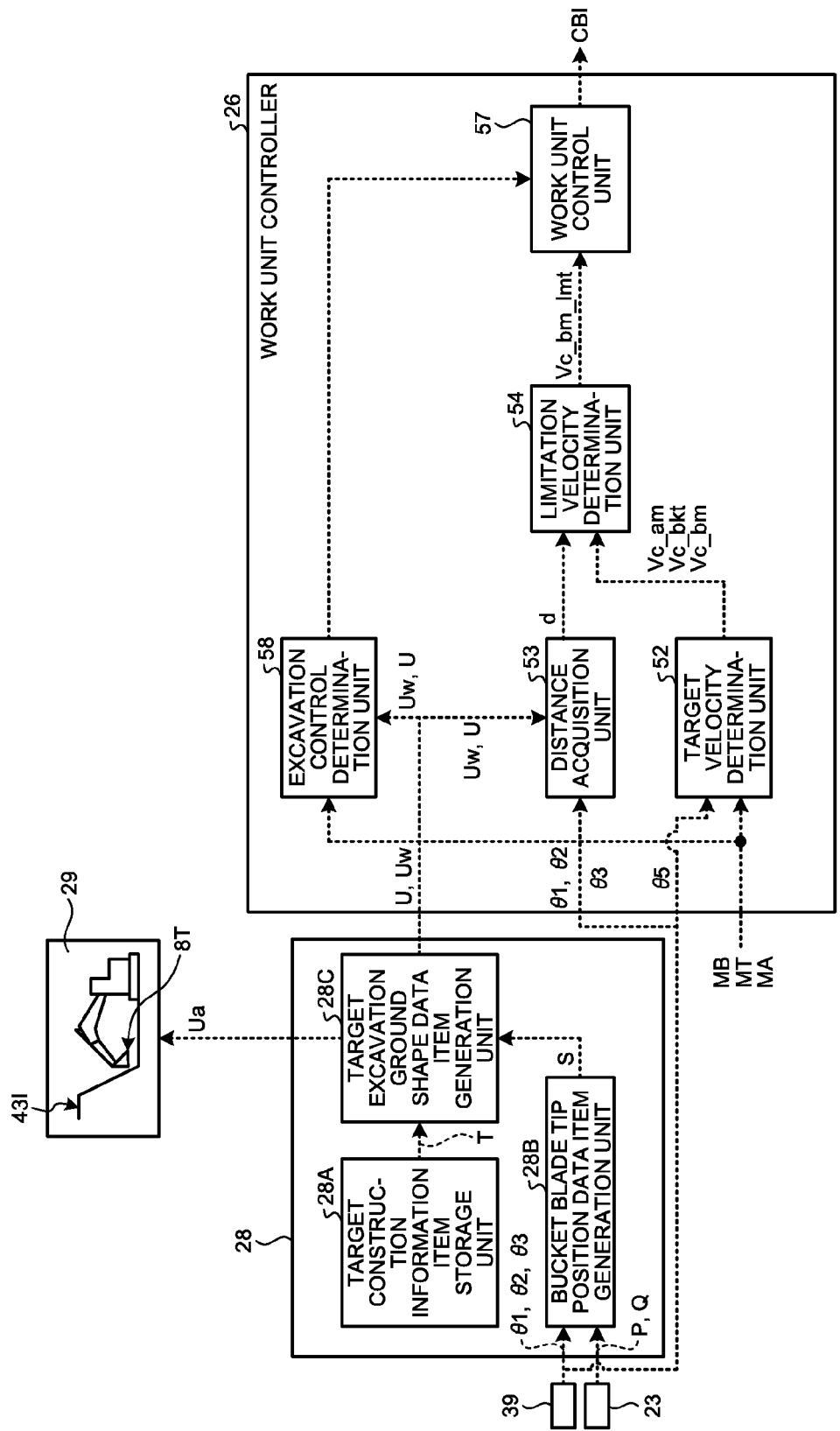
FIG. 5 is a block diagram illustrating a work unit controller and a display controller.
Figure 6:
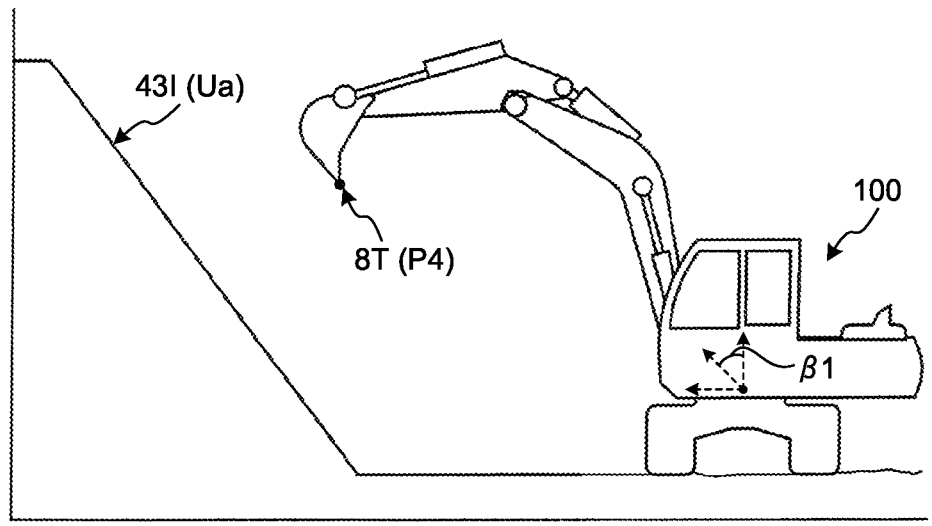
FIG. 6 is a diagram illustrating an example of a target excavation ground shape displayed on a display unit.
Figure 7:
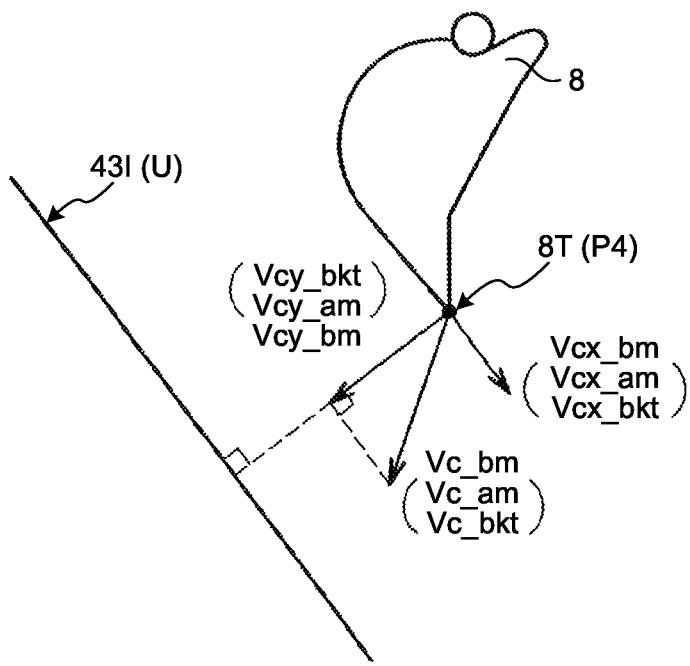
FIG. 7 is a schematic diagram illustrating a relation among a target velocity, a perpendicular velocity element, and a horizontal velocity element.
Figure 8:
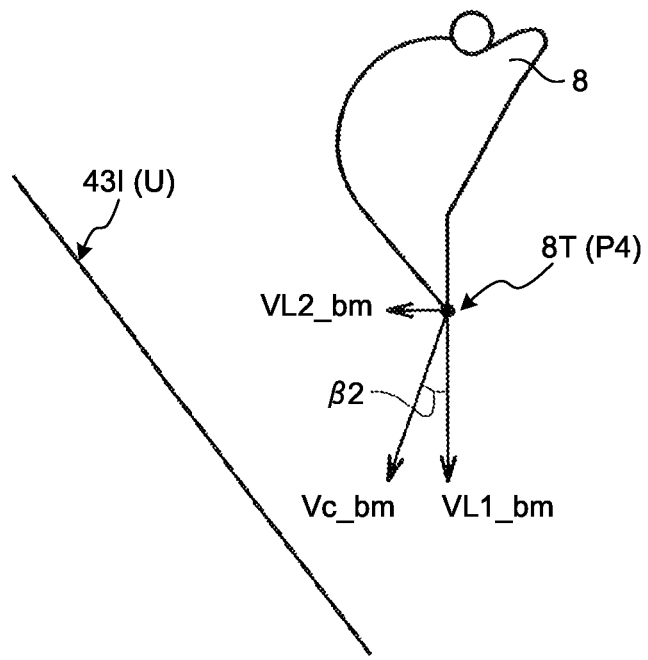
FIG. 8 is a diagram illustrating a calculation method of the perpendicular velocity element and the horizontal velocity element.
Figure 9:
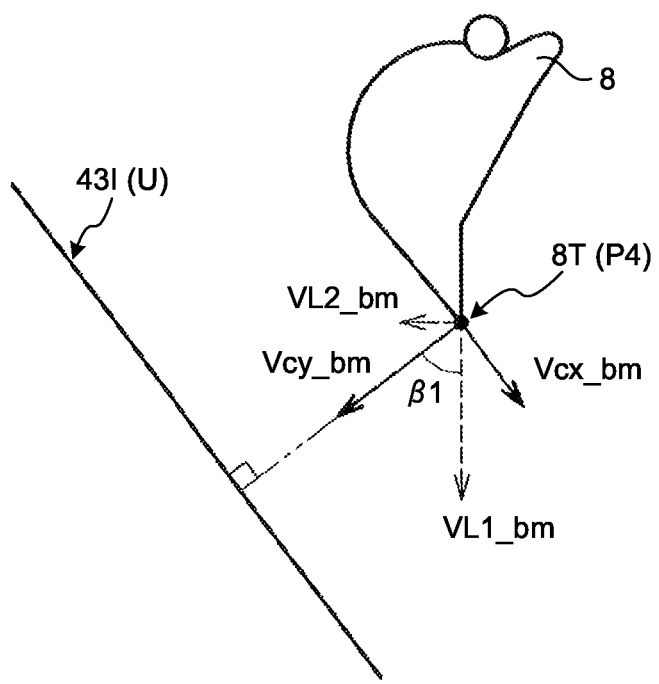
FIG. 9 is a diagram illustrating a calculation method of the perpendicular velocity element and the horizontal velocity element.
Figure 10:
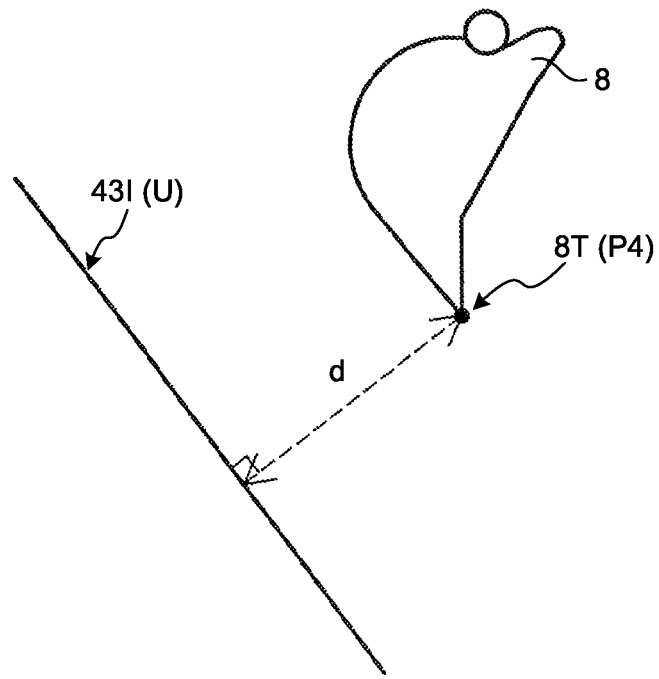
FIG. 10 is a schematic diagram illustrating a distance between a blade tip and a target excavation ground shape.
Figure 11:
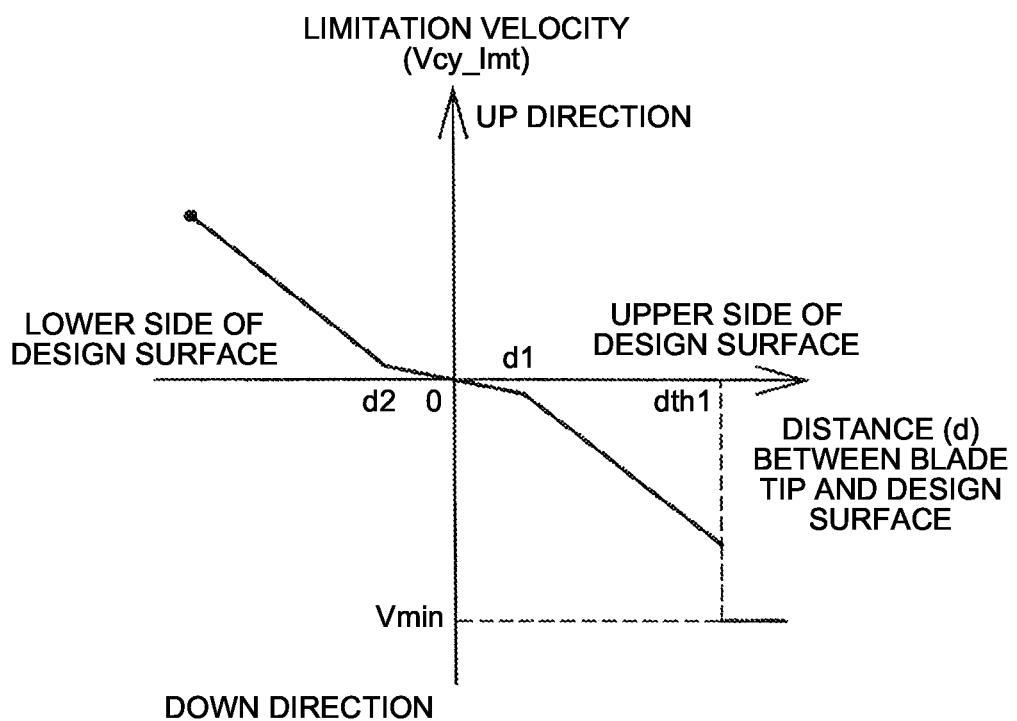
FIG. 11 is a graph illustrating an example of a limitation velocity information item.
Figure 12:
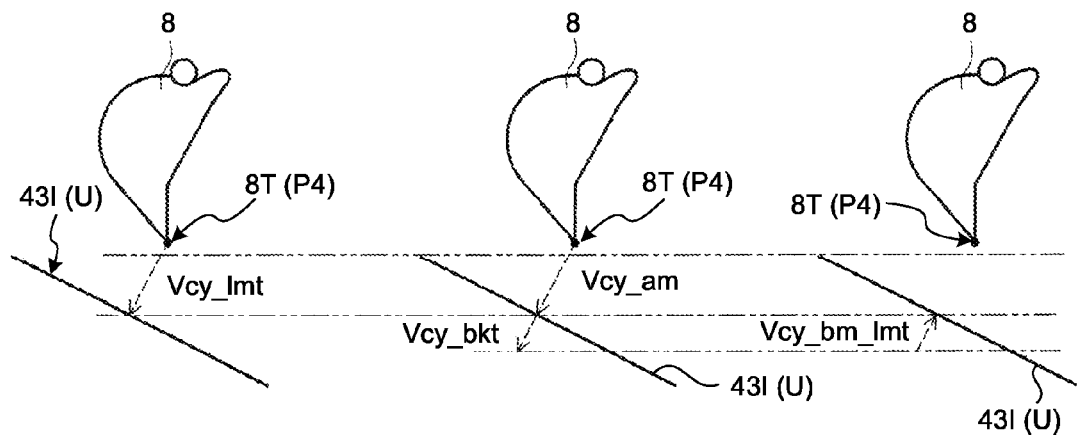
FIG. 12 is a schematic diagram illustrating a calculation method of a perpendicular velocity element of a limitation velocity of a boom.
Figure 13:
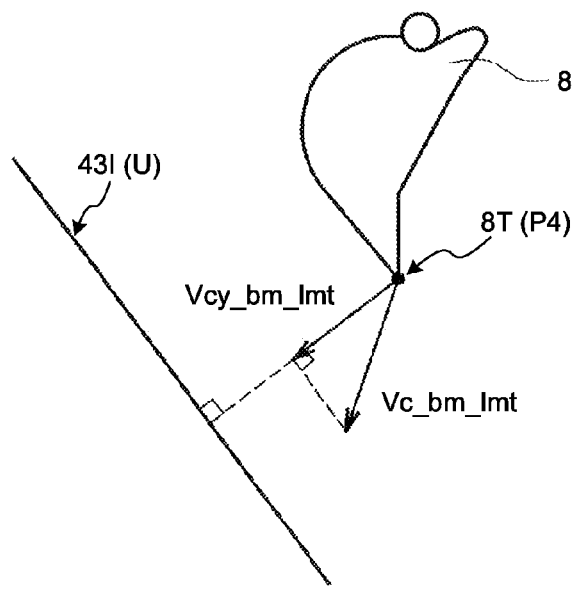
FIG. 13 is a schematic diagram illustrating a relation between the perpendicular velocity element of the limitation velocity of the boom and the limitation velocity of the boom.
Figure 14:
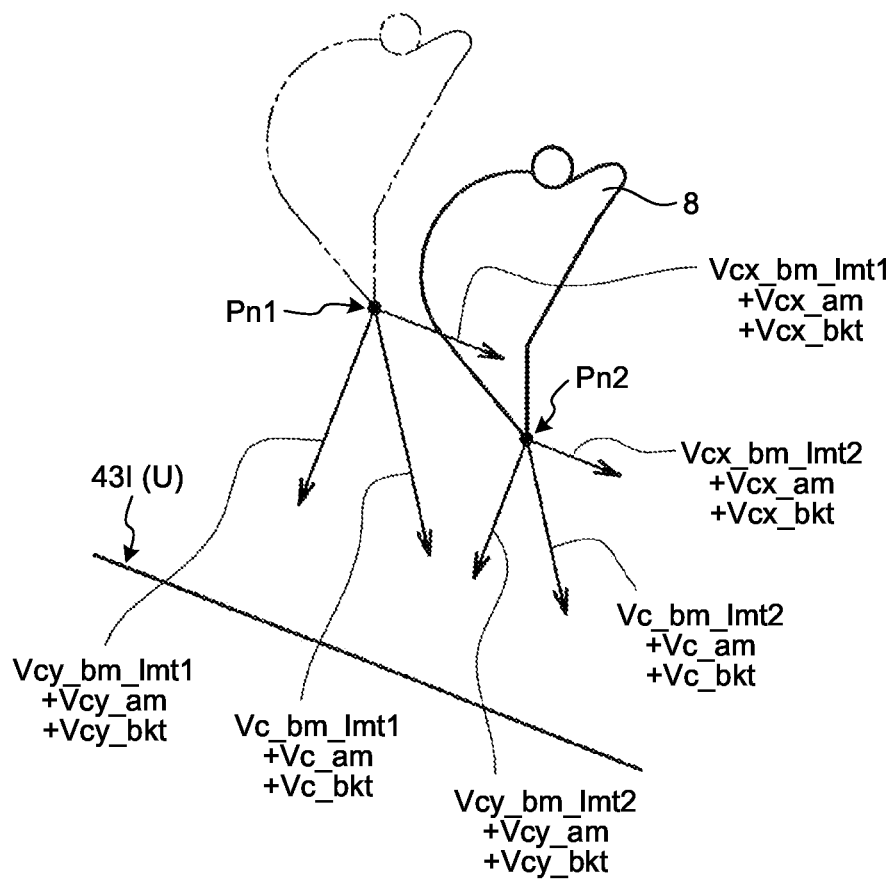
FIG. 14 is a diagram illustrating an example of a change in the limitation velocity of the boom due to the movement of the blade tip.

FIG. 5 is a block diagram illustrating the work unit controller 26 and the display controller 28. FIG. 6 is a diagram illustrating an example of the target excavation ground shape 43I displayed on the display unit. FIG. 7 is a schematic diagram illustrating a relation among a target velocity, a perpendicular velocity element, and a horizontal velocity element. FIG. 8 is a diagram illustrating a calculation method of the perpendicular velocity element and the horizontal velocity element. FIG. 9 is a diagram illustrating a calculation method of the perpendicular velocity element and the horizontal velocity element. FIG. 10 is a schematic diagram illustrating a distance between the blade tip and the target construction face. FIG. 11 is a graph illustrating an example of a limitation velocity information item. FIG. 12 is a schematic diagram illustrating a calculation method of the perpendicular velocity element of a limitation velocity of the boom. FIG. 13 is a schematic diagram illustrating a relation between the perpendicular velocity element of the limitation velocity of the boom and the limitation velocity of the boom. FIG. 14 is a diagram illustrating an example of a change in the limitation velocity of the boom due to the movement of the blade tip.

As illustrated in FIGS. 4 and 5, the display controller 28 generates the target excavation ground shape data item U, and outputs the data item to the work unit controller 26. The excavation control is performed, for example, when the operator of the excavator 100 selects a state where the excavation control is performed by the switch 29S illustrated in FIG. 2. When the excavation control is performed, the work unit controller 26 generates a boom instruction signal CBI necessary for the excavation control by using the boom operation amount MB, the arm operation amount MA, the bucket operation amount MT, the target excavation ground shape data item U acquired from the display controller 28, and the inclination angles $\theta1$, $\theta2$, $\theta3$, and $\theta5$ acquired from the sensor controller 39, furthermore generates an arm instruction signal and a bucket instruction signal if necessary, drives the control valve 27 and the interposition valve 27C, and controls the work unit 2.

First, the display controller 28 will be described. The display controller 28 includes a target construction information item storage unit 28A, a bucket blade tip position data item generation unit 28B, and a target excavation ground shape data item generation unit 28C. The target construction information item storage unit 28A stores the target construction information item T as an information item indicating the target shape in a working area. The target construction information item T includes a coordinate data item and an angle data item necessary for generating the target excavation ground shape data item U as an information item indicating the target shape of the excavation target. The target construction information item T includes a position information item of the plurality of target construction faces 41. The target construction information item T necessary for the excavation control work unit controller 26 to control the work unit 2 or necessary for displaying the target excavation ground shape data item Ua on the display unit 29 is downloaded to the target construction information item storage unit 28A via, for example, a wireless communication. Furthermore, the necessary target construction information item T may be downloaded to the target construction information item storage unit 28A by connecting a terminal device storing the target construction information item to the display controller 28, or may be transferred by connecting a separable storage device to the controller 28.

The bucket blade tip position data item generation unit 28B generates a swing center position data item XR indicating a position of the swing center of the excavator 100 passing through the swing axis z of the upper swing body 3 based on the reference position data item P and the swing body orientation data item Q acquired from the global coordinate calculation unit 23. In the swing center position data item XR, the reference position PL of the local coordinate system matches the xy coordinate.

The bucket blade tip position data item generation unit 28B generates the bucket blade tip position data item S indicating the current position of the blade tip 8T of the bucket 8 based on the swing center position data item XR and the inclination angles $\theta1$, $\theta2$, and $\theta3$ of the work unit 2.

As described above, the bucket blade tip position data item generation unit 28B acquires the reference position data item P and the swing body orientation data item Q from the global coordinate calculation unit 23 at, for example, a frequency of 10 Hz. Accordingly, the bucket blade tip position data item generation unit 28B can update the bucket blade tip position data item S at, for example, a frequency of 10 Hz. The bucket blade tip position data item generation unit 28B outputs the updated bucket blade tip position data item S to the target excavation ground shape data item generation unit 28C.

The target excavation ground shape data item generation unit 28C acquires the target construction information item T stored in the target construction information item storage unit 28A and the bucket blade tip position data item S from the bucket blade tip position data item generation unit 28B. The target excavation ground shape data item generation unit 28C sets an intersection point between the perpendicular line passing through a blade tip position P4 at the current time point of the blade tip 8T and the target construction face 41 in the local coordinate system as an excavation target position 44. The excavation target position 44 is a point directly below the blade tip position P4 of the bucket 8. As illustrated in FIG. 4, the target excavation ground shape data item generation unit 28C acquires an intersection line 43 between a plane 42 of the work unit 2 defined in the front to back direction of the upper swing body 3 and passing through the excavation target position 44 and the target construction information item T represented by the plurality of target construction faces 41 as a candidate line of the target excavation ground shape 43I based on the target construction information item T and the bucket blade tip position data item S. The excavation target position 44 is one point on the candidate line. The plane 42 is a plane parallel to a plane (a work unit operation plane) where the work unit 2 is operated or the work unit operation plane.

The work unit operation plane is a plane that is parallel to an xz plane of the excavator 100 when the boom 6 and the arm 7 do not rotate about the axis parallel to the z axis of the local coordinate system of the excavator 100. When at least one of the boom 6 and the arm 7 rotates about the axis parallel to the z axis of the local coordinate system of the excavator 100, the work unit operation plane is a plane perpendicular to the rotation axis of the arm, that is, a plane perpendicular to the axis of the arm pin 14 illustrated in FIG. 1. Hereinafter, the work unit operation plane will be appropriately referred to as an arm operation plane.

The target excavation ground shape data item generation unit 28C determines one or more inflection points around the excavation target position 44 of the target construction information item T and the lines therearound as the target excavation ground shape 43I serving as the excavation target. In the example illustrated in FIG. 4, two inflection points Pv1 and Pv2 and the lines therearound are determined as the target excavation ground shape 43I. Then, the target excavation ground shape data item generation unit 28C generates a position information item of one or more inflection points around the excavation target position 44 and an angle information item of the lines therearound as the target excavation ground shape data item U as an information item indicating the target shape of the excavation target. In the present embodiment, the target excavation ground shape 43I is defined by lines, but may be defined as a plane based on, for example, the width of the bucket 8 or the like. The target excavation ground shape data item U which is generated in this way includes an information item of a part of the plurality of target construction faces 41. The target excavation ground shape data item generation unit 28C outputs the generated target excavation ground shape data item U to the work unit controller 26. In the present embodiment, the display controller 28 and the work unit controller directly exchange signals, but may exchange signals via, for example, an in-vehicle signal line such as CAN (Controller Area Network).

In the present embodiment, the target excavation ground shape data item U is an information item at the intersection portion between the plane 42 as the work unit operation plane where the work unit 2 is operated and at least one target construction face (a first target construction face) 41 indicating the target shape. The plane 42 is the xz plane in the local coordinate system (x, y, z) illustrated in FIGS. 3A and 3B. In addition to the target excavation ground shape data item U obtained by cutting out the plurality of target construction faces 41 in the plane 42, there are also an information item at the intersection portion between the plane intersecting (or perpendicular to) the plane 42 and parallel to the vertical direction and the at least one target construction face 41 indicating the target shape. This information item is an information item indicating the target shape of the excavation target in the width direction (the y direction in the local coordinate system) of the work unit 2. This information will be appropriately referred to as a width-direction target excavation ground shape data item Uw. A target excavation ground shape 46I in the width direction is generated by the width-direction target excavation ground shape data item Uw. The width-direction target excavation ground shape data item Uw and the target excavation ground shape 46I will be described later in detail. Furthermore, the target excavation ground shape data item U obtained by cutting out the plurality of target construction faces 41 in the plane 42 will be appropriately referred to as a front-to-back-direction target excavation ground shape data item U.

The display controller 28 causes the display unit 29 to display the target excavation ground shape 43I based on the width-direction target excavation ground shape data item Uw as the first target excavation ground shape information item or the front-to-back-direction target excavation ground shape data item U as the second target excavation ground shape information item if necessary. As the display information item, the display target excavation ground shape data item Ua is used. The display unit 29 displays, for example, an image as illustrated in FIG. 5 indicating a positional relation between the target excavation ground shape 43I set as the excavation target of the bucket 8 and the blade tip 8T based on the display target excavation ground shape data item Ua. The display controller 28 causes the display unit 29 to display the target excavation ground shape (the display target excavation ground shape) 43I based on the display target excavation ground shape data item Ua. The front-to-back-direction target excavation ground shape data item U and the width-direction target excavation ground shape data item Uw output to the work unit controller 26 are used in the excavation control. The target excavation ground shape data item U and the width-direction target excavation ground shape data item Uw used in the excavation control will be appropriately referred to as a working target excavation ground shape data item.

As described above, the target excavation ground shape data item generation unit 28C acquires the bucket blade tip position data item S from the bucket blade tip position data item generation unit 28B at, for example, a frequency of 10 Hz. Accordingly, the target excavation ground shape data item generation unit 28C can update the front-to-back-direction target excavation ground shape data item U and the width-direction target excavation ground shape data item Uw at, for example, a frequency of 10 Hz and output the data items to the work unit controller 26. Next, the work unit controller 26 will be described.

The work unit controller 26 includes a target velocity determination unit 52, a distance acquisition unit 53, a limitation velocity determination unit 54, a work unit control unit 57, and an excavation control determination unit (hereinafter, appropriately referred to as a control determination unit) 58. The work unit controller 26 performs the excavation control using the target excavation ground shape 43I based on the above-described front-to-back-direction target excavation ground shape data item U or the width-direction target excavation ground shape data item Uw. In this way, in the present embodiment, there are the target excavation ground shape 43I used for display and the target excavation ground shape 43I used in the excavation control. The former will be referred to as a display target excavation ground shape, and the latter will be referred to as an excavation control target excavation ground shape.

In the present embodiment, functions of the target velocity determination unit 52, the distance acquisition unit 53, the limitation velocity determination unit 54, the work unit control unit 57, and the control determination unit 58 are realized by the process unit 26P illustrated in FIG. 2. Next, the excavation control by the work unit controller 26 will be described. The excavation control is an example of the excavation control in the front to back direction of the work unit 2, but the excavation control is also possible in the width direction of the work unit 2. The excavation control in the width direction of the work unit 2 will be described later.

The target velocity determination unit 52 determines a boom target velocity Vc_bm, an arm target velocity Vc_am, and a bucket target velocity Vc_bkt. The boom target velocity Vc_bm is a velocity of the blade tip 8T when only the boom cylinder 10 is driven. The arm target velocity Vc_am is a velocity of the blade tip 8T when only the arm cylinder 11 is driven. The bucket target velocity Vc_bkt is a velocity of the blade tip 8T when only the bucket cylinder 12 is driven. The boom target velocity Vc_bm is calculated in response to the boom operation amount MB. The arm target velocity Vc_am is calculated in response to the arm operation amount MA. The bucket target velocity Vc_bkt is calculated in response to the bucket operation amount MT.

The storage unit 26M stores a target velocity information item of defining a relation between the boom operation amount MB and the boom target velocity Vc_bm. The target velocity determination unit 52 determines the boom target velocity Vc_bm corresponding to the boom operation amount MB by referring to the target velocity information item. The target velocity information item is a graph in which, for example, a magnitude of the boom target velocity Vc_bm with respect to the boom operation amount MB is described. The target velocity information item may be in the form of a table or an equation. The target velocity information item includes an information item of defining a relation between the arm operation amount MA and the arm target velocity Vc_am. The target velocity information item includes an information item of defining a relation between the bucket operation amount MT and the bucket target velocity Vc_bkt. The target velocity determination unit 52 determines the arm target velocity Vc_am corresponding to the arm operation amount MA by referring to the target velocity information item. The target velocity determination unit 52 determines the bucket target velocity Vc_bkt corresponding to the bucket operation amount MT by referring to the target velocity information item. As illustrated in FIG. 7, the target velocity determination unit 52 converts the boom target velocity Vc_bm into a velocity element (hereinafter, appropriately referred to as a perpendicular velocity element) Vcy_bm in a direction perpendicular to the target excavation ground shape 43I (the target excavation ground shape data item U) and a velocity element (hereinafter, appropriately referred to as a horizontal velocity element) Vcx_bm in a direction parallel to the target excavation ground shape 43I (the target excavation ground shape data item U).

For example, the target velocity determination unit 52 first acquires the inclination angle θ5 from the sensor controller 39, and obtains an inclination in the direction perpendicular to the target excavation ground shape 43I with respect to the perpendicular axis of the global coordinate system. Then, the target velocity determination unit 52 obtains an angle β2 (see FIG. 8) representing an inclination between the perpendicular axis of the local coordinate system and the direction perpendicular to the target excavation ground shape 43I from such an inclination.

Next, as illustrated in FIG. 8, the target velocity determination unit 52 converts the boom target velocity Vc_bm into a velocity element VL1_bm in the perpendicular axis direction of the local coordinate system and a velocity element VL2_bm in the horizontal axis direction by a trigonometric function from the angle β2 formed between the perpendicular axis of the local coordinate system and the direction of the boom target velocity Vc_bm. Then, as illustrated in FIG. 9, the target velocity determination unit 52 converts the velocity element VL1_bm in the perpendicular axis direction of the local coordinate system and the velocity element VL2_bm in the horizontal axis direction into the perpendicular velocity element Vcy_bm and the horizontal velocity element Vcx_bm with respect to the above-described target excavation ground shape 43I by a trigonometric function from an inclination β1 formed between the perpendicular axis of the above-described local coordinate system and the direction perpendicular to the target excavation ground shape 43I. Similarly, the target velocity determination unit 52 converts the arm target velocity Vc_am into a perpendicular velocity element Vcy_am in the perpendicular axis direction of the local coordinate system and a horizontal velocity element Vcx_am. The target velocity determination unit 52 converts the bucket target velocity Vc_bkt into a perpendicular velocity element Vcy_bkt in the perpendicular axis direction of the local coordinate system and a horizontal velocity element Vcx_bkt.

As illustrated in FIG. 10, the distance acquisition unit 53 acquires a distance d between the blade tip 8T of the bucket 8 and the target excavation ground shape 43I. In particular, the distance acquisition unit 53 calculates the distance d serving as the shortest distance between the blade tip 8T of the bucket 8 and the target excavation ground shape 43I from the position information item of the blade tip 8T acquired as described above and the target excavation ground shape data item U indicating the position of the target excavation ground shape 43I. In the present embodiment, the excavation control is performed based on the distance d serving as the shortest distance between the blade tip 8T of the bucket 8 and the target excavation ground shape 43I.

The limitation velocity determination unit 54 calculates a limitation velocity Vcy_lmt of the entire work unit 2 illustrated in FIG. 1 based on the distance d between the blade tip 8T of the bucket 8 and the target excavation ground shape 43I. The limitation velocity Vcy_lmt of the entire work unit 2 is a movement velocity of the blade tip 8T allowable in a direction in which the blade tip 8T of the bucket 8 approaches the target excavation ground shape 43I. The storage unit 26M illustrated in FIG. 2 stores a limitation velocity information item of defining a relation between the distance d and the limitation velocity Vcy_lmt.

FIG. 11 illustrates an example of the limitation velocity information item. In FIG. 11, the horizontal axis is the distance d, and the vertical axis is the limitation velocity Vcy. In the present embodiment, the distance d when the blade tip 8T is located outside the target excavation ground shape 43I, that is, at the work unit 2 side of the excavator 100, is a positive value, and the distance d when the blade tip 8T is located inside the target excavation ground shape 43I, that is, inside the excavation target in relation to the target excavation ground shape 43I, is a negative value. For example, as illustrated in FIG. 10, it can also be said that the distance d when the blade tip 8T is located above the target excavation ground shape 43I is a positive value and the distance d when the blade tip 8T is located below the target excavation ground shape 43I is a negative value. Furthermore, it can also be said that the distance d when the blade tip 8T is at a position of not eroding the target excavation ground shape 43I is a positive value and the distance d when the blade tip 8T is at a position of eroding the target excavation ground shape 43I is a negative value. The distance d when the blade tip 8T is located on the target excavation ground shape 43I, that is, when the blade tip 8T is in contact with the target excavation ground shape 43I, is zero.

In the present embodiment, it is assumed that the velocity when the blade tip 8T proceeds from the inside of the target excavation ground shape 43I to the outside thereof is a positive value and the velocity when the blade tip 8T proceeds from the outside of the target excavation ground shape 43I to the inside thereof is a negative value. That is, it is assumed that the velocity when the blade tip 8T proceeds to the upside of the target excavation ground shape 43I is a positive value and the velocity when the blade tip 8T proceeds to the downside is a negative value.

In the limitation velocity information item, the inclination of the limitation velocity Vcy_lmt when the distance d is between d1 and d2 is smaller than the inclination when the distance d is equal to or more than d1 or equal to or less than d2. d1 is larger than zero. d2 is smaller than zero. In order to more particularly set the limitation velocity in the operation near the target excavation ground shape 43I, the inclination when the distance d is between d1 and d2 is set to be smaller than the inclination when the distance d is equal to or more than d1 or equal to or less than d2. When the distance d is equal to or more than d1, the limitation velocity Vcy_lmt is a negative value, and the limitation velocity Vcy_lmt decreases as the distance d increases. That is, when the distance d is equal to or more than d1, the velocity toward the downside of the target excavation ground shape 43I increases and the absolute value of the limitation velocity Vcy_lmt increases as the blade tip 8T above the target excavation ground shape 43I moves away from the target excavation ground shape 43I. When the distance d is equal to or less than zero, the limitation velocity Vcy_lmt is a positive value, and the limitation velocity Vcy_lmt increases as the distance d decreases. That is, when the distance d in which the blade tip 8T of the bucket 8 moves away from the target excavation ground shape 43I is equal to or less than zero, the velocity toward the upside of the target excavation ground shape 43I increases and the absolute value of the limitation velocity Vcy_lmt increases as the blade tip 8T below the target excavation ground shape 43I moves away from the target excavation ground shape 43I.

When the distance d is equal to or more than a first predetermined value dth1, the limitation velocity Vcy_lmt becomes Vmin. The first predetermined value dth1 is a positive value and is larger than d1. Vmin is smaller than the minimum value of the target velocity. That is, when the distance d is equal to or more than the first predetermined value dth1, the operation of the work unit 2 is not limited. Accordingly, when the blade tip 8T above the target excavation ground shape 43I largely moves away from the target excavation ground shape 43I, the limitation of the operation of the work unit 2, that is, the excavation control is not performed. When the distance d is smaller than the first predetermined value dth1, the operation of the work unit 2 is limited. In particular, as will be described later, the operation of the boom 6 is limited when the distance d is smaller than the first predetermined value dth1.

The limitation velocity determination unit 54 calculates the perpendicular velocity element (hereinafter, appropriately referred to as a limitation perpendicular velocity element of the boom 6) Vcy_bm_lmt of the limitation velocity of the boom 6 from the limitation velocity Vcy_lmt of the entire work unit 2, the arm target velocity Vc_am, and the bucket target velocity Vc_bkt. As illustrated in FIG. 12, the limitation velocity determination unit 54 calculates a limitation perpendicular velocity element Vcy_bm_lmt of the boom 6 by subtracting the perpendicular velocity element Vcy_am of the arm target velocity and the perpendicular velocity element Vcy_bkt of the bucket target velocity from the limitation velocity Vcy_lmt of the entire work unit 2.

As illustrated in FIG. 13, the limitation velocity determination unit 54 converts the limitation perpendicular velocity element Vcy_bm_lmt of the boom 6 into a limitation velocity (a boom limitation velocity) Vc_bm_lmt of the boom 6. The limitation velocity determination unit 54 obtains a relation between the direction perpendicular to the target excavation ground shape 43I and the direction of the boom limitation velocity Vc_bm_lmt from the inclination angle θ1 of the boom 6, the inclination angle θ2 of the arm 7, the inclination angle θ3 of the bucket 8, the reference position data item of the GNSS antennas 21 and 22, the target excavation ground shape data item U and the like as described above, and converts the limitation perpendicular velocity element Vcy_bm_lmt of the boom 6 into the boom limitation velocity Vc_bm_lmt. The calculation in this case is performed according to an opposite procedure to the calculation of obtaining the perpendicular velocity element Vcy_bm in the direction perpendicular to the target excavation ground shape 43I from the boom target velocity Vc_bm as described above.

The shuttle valve 51 illustrated in FIG. 2 selects a larger one from among the pilot pressure generated based on the operation of the boom 6 and the pilot pressure generated by the interposition valve 27C based on the boom interposition instruction CBI, and supplies the pilot pressure to the direction control valve 64. When the pilot pressure based on the boom interposition instruction CBI is larger than the pilot pressure generated based on the operation of the boom 6, the direction control valve 64 corresponding to the boom cylinder 10 is operated by the pilot pressure based on the boom interposition instruction CBI. As a result, drive of the boom 6 based on the boom limitation velocity Vc_bm_lmt is realized.

The work unit control unit 57 controls the work unit 2. The work unit control unit 57 controls the boom cylinder 10, the arm cylinder 11, and the bucket cylinder 12 by outputting the arm instruction signal, the boom instruction signal, the boom interposition instruction CBI, and the bucket instruction signal to the control valve 27 and the interposition valve 27C illustrated in FIG. 2. The arm instruction signal, the boom instruction signal, the boom interposition instruction CBI, and the bucket instruction signal respectively include current values responding to the boom instruction velocity, the arm instruction velocity, and the bucket instruction velocity.

When the pilot pressure generated based on the upward movement operation of the boom 6 is larger than the pilot pressure based on the boom interposition instruction CBI, the shuttle valve 51 selects the pilot pressure based on the lever operation. The direction control valve 64 corresponding to the boom cylinder 10 is operated by the pilot pressure selected by the shuttle valve 51 based on the operation of the boom 6. That is, since the boom 6 is driven based on the boom target velocity Vc_bm, the boom is not driven based on the boom limitation velocity Vc_bm_lmt.

When the pilot pressure generated based on the operation of the boom 6 is larger than the pilot pressure based on the boom interposition instruction CBI, the work unit control unit 57 respectively selects the boom target velocity Vc_bm, the arm target velocity Vc_am, and the bucket target velocity Vc_bkt as the boom instruction velocity, the arm instruction velocity, and the bucket instruction velocity. The work unit control unit 57 determines the velocities (a cylinder velocity) of the boom cylinder 10, the arm cylinder 11, and the bucket cylinder 12 in response to the boom target velocity Vc_bm, the arm target velocity Vc_am, and the bucket target velocity Vc_bkt. Then, the work unit control unit 57 operates the boom cylinder 10, the arm cylinder 11, and the bucket cylinder 12 by controlling the control valve 27 based on the determined cylinder velocity.

In this way, in the normal operation, the work unit control unit 57 operates the boom cylinder 10, the arm cylinder 11, and the bucket cylinder 12 in response to the boom operation amount MB, the arm operation amount MA, and the bucket operation amount MT. Accordingly, the boom cylinder 10 is operated at the boom target velocity Vc_bm, the arm cylinder 11 is operated at the arm target velocity Vc_am, and the bucket cylinder 12 is operated at the bucket target velocity Vc_bkt.

When the pilot pressure based on the boom interposition instruction CBI is larger than the pilot pressure generated based on the operation of the boom 6, the shuttle valve 51 selects the pilot pressure output from the interposition valve 27C based on the interposition instruction. As a result, the boom 6 is operated at the boom limitation velocity Vc_bm_lmt, while the arm 7 is operated at the arm target velocity Vc_am. Furthermore, the bucket 8 is operated at the bucket target velocity Vc_bkt.

As described above, the limitation perpendicular velocity element Vcy_bm_lmt of the boom 6 is calculated by subtracting the perpendicular velocity element Vcy_am of the arm target velocity and the perpendicular velocity element Vcy_bkt of the bucket target velocity from the limitation velocity Vcy_lmt of the entire work unit 2. Accordingly, when the limitation velocity Vcy_lmt of the entire work unit 2 is smaller than the sum of the perpendicular velocity element Vcy_am of the arm target velocity and the perpendicular velocity element Vcy_bkt of the bucket target velocity, the limitation perpendicular velocity element Vcy_bm_lmt of the boom 6 becomes a negative value at which the boom moves upward.

Accordingly, the boom limitation velocity Vc_bm_lmt becomes a negative value. In this case, the work unit control unit 57 moves the boom 6 downward, but decreases the speed thereof to be smaller than the boom target velocity Vc_bm. For this reason, it is possible to restrain the bucket 8 from eroding the target excavation ground shape 43I while keeping the operator's uncomfortable feeling small.

When the limitation velocity Vcy_lmt of the entire work unit 2 is larger than the sum of the perpendicular velocity element Vcy_am of the arm target velocity and the perpendicular velocity element Vcy_bkt of the bucket target velocity, the limitation perpendicular velocity element Vcy_bm_lmt of the boom 6 becomes a positive value. Accordingly, the boom limitation velocity Vc_bm_lmt becomes a positive value. In this case, even when the operation device 25 is operated in a direction in which the boom 6 moves downward, the boom 6 moves upward based on the instruction signal from the interposition valve 27C illustrated in FIG. 2. For this reason, it is possible to promptly restrain the expansion of the erosion of the target excavation ground shape 43I.

When the blade tip 8T is located above the target excavation ground shape 43I, the absolute value of the limitation perpendicular velocity element Vcy_bm_lmt of the boom 6 decreases and the absolute value of the velocity element (hereinafter, appropriately referred to as a limitation horizontal velocity element) Vcx_bm_lmt of the limitation velocity of the boom 6 in a direction parallel to the target excavation ground shape 43I also decreases as the blade tip 8T approaches the target excavation ground shape 43I. Accordingly, when the blade tip 8T is located above the target excavation ground shape 43I, the velocity in the direction perpendicular to the target excavation ground shape 43I of the boom 6 and the velocity in a direction parallel to the target excavation ground shape 43I of the boom 6 decrease together as the blade tip 8T approaches the target excavation ground shape 43I. The arm 7, and the bucket 8 are operated at the same time in a manner such that the left operation lever 25L and the right operation lever 25R are operated at the same time by the operator of the excavator, the boom 6. At this time, assuming that the target velocity Vc_bm, Vc_am, Vc_bkt of the boom 6, the arm 7, and the bucket 8 are input, the above-described control is as described below.

FIG. 14 illustrates an example of a change in the limitation velocity of the boom 6 when the distance d between the target excavation ground shape 43I and the blade tip 8T of the bucket 8 is smaller than the first predetermined value dth1 and the blade tip of the bucket 8 moves from a position Pn1 to a position Pn2. The distance between the blade tip 8T at the position Pn2 and the target excavation ground shape 43I is smaller than the distance between the blade tip 8T at the position Pn1 and the target excavation ground shape 43I. For this reason, a limitation perpendicular velocity element Vcy_bm_lmt2 of the boom 6 at the position Pn2 is smaller than a limitation perpendicular velocity element Vcy_bm_lmt1 of the boom 6 at the position Pn1. Accordingly, a boom limitation velocity Vc_bm_lmt2 at the position Pn2 is smaller than a boom limitation velocity Vc_bm_lmt1 at the position Pn1. Furthermore, a limitation horizontal velocity element Vcx_bm_lmt2 of the boom 6 at the position Pn2 is smaller than a limitation horizontal velocity element Vcx_bm_lmt1 of the boom 6 at the position Pn1. However, at this time, the arm target velocity Vc_am and the bucket target velocity Vc_bkt are not limited. For this reason, the perpendicular velocity element Vcy_am and the horizontal velocity element Vcx_am of the arm target velocity and the perpendicular velocity element Vcy_bkt and the horizontal velocity element Vcx_bkt of the bucket target velocity are not limited.

As described above, a change in the arm operation amount corresponding to the operator's excavation intension is reflected as a change in the velocity of the blade tip 8T of the bucket 8 in a manner such that the arm 7 is not limited. For this reason, the present embodiment can restrain the uncomfortable feeling during the excavation operation of the operator while restraining the expansion of the erosion of the target excavation ground shape 43I.

The control determination unit 58 illustrated in FIG. 5 determines whether to perform the excavation control based on the width-direction target excavation ground shape data item Uw. The control determination unit 58 stops the excavation control which is currently performed, for example, when the width-direction target excavation ground shape data item Uw directly below the bucket 8 has a predetermined angle or more with respect to the horizontal plane. The process performed by the control determination unit 58 will be described below.

The blade tip position P4 of the blade tip 8T may be measured by other positioning device instead of the GNSS. Accordingly, the distance d between the blade tip 8T and the target excavation ground shape 43I may be measured by other positioning device instead of the GNSS. The absolute value of the bucket limitation velocity is smaller than the absolute value of the bucket target velocity. The bucket limitation velocity may be calculated by, for example, the same method as the arm limitation velocity. Note that the arm 7 and the bucket 8 may be limited together. Next, the details of the hydraulic system 300 illustrated in FIG. 2 and the operation of the hydraulic system 300 during the excavation control will be described.

Figure 15:
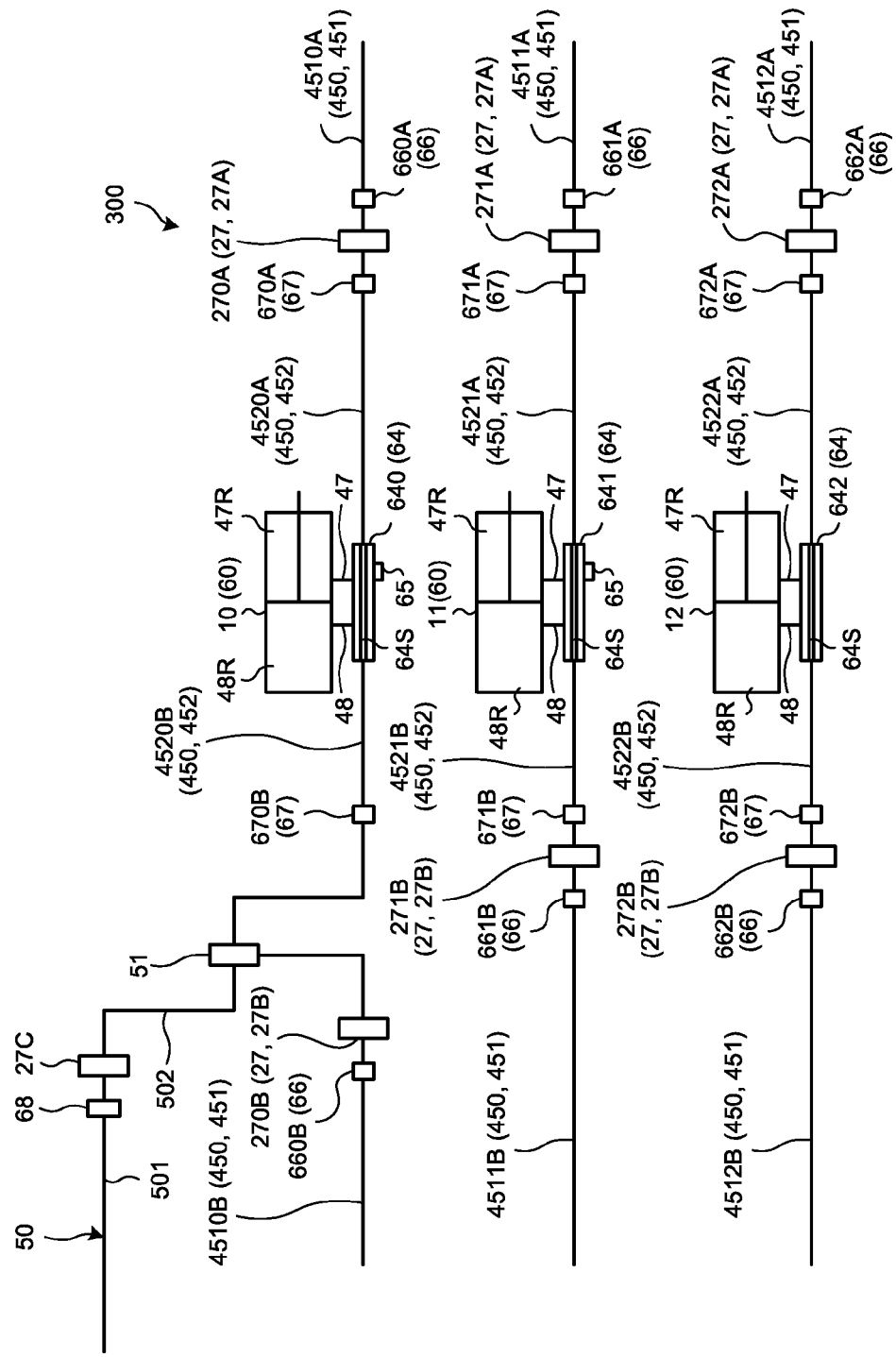
FIG. 15 is a diagram illustrating a detailed structure of a hydraulic system 300 that is included in an excavator 100.

FIG. 15 is a diagram illustrating a detailed structure of the hydraulic system 300 that is included in the excavator 100. As illustrated in FIG. 15, the hydraulic system 300 includes a hydraulic cylinder 60 with the boom cylinder 10, the arm cylinder 11, and the bucket cylinder 12. The hydraulic cylinder 60 is operated by the working oil supplied from the hydraulic pumps 36 and 37 illustrated in FIG. 2.

In the present embodiment, the direction control valve 64 that controls the direction in which the working oil flows is provided. The direction control valve 64 is disposed in each of the boom cylinder 10, the arm cylinder 11, and the bucket cylinder 12. Hereinafter, the boom cylinder 10, the arm cylinder 11, and the bucket cylinder 12 will be referred to as the hydraulic cylinder 60 when the cylinders are not distinguished from one another. The direction control valve 64 is a spool type which moves a spool 64S in a rod shape and changes the direction in which the working oil flows. The spool 64S moves by the pilot oil of the working oil supplied from the operation device 25 illustrated in FIG. 2. The direction control valve 64 supplies the working oil (hereinafter, appropriately referred to as the pilot oil) to the hydraulic cylinder 60 by the movement of the spool and operates the hydraulic cylinder 60.

The working oil supplied from the hydraulic pumps 36 and 37 illustrated in FIG. 2 is supplied to the hydraulic cylinder 60 through the direction control valve 64. The spool 64S moves in the axis direction, and thus the supply of the working oil to a cap side oil chamber 48R of the hydraulic cylinder 60 and the supply of the working oil to a rod side oil chamber 47R are switched. Furthermore, the spool 64S moves in the axis direction, and thus a supply amount (a supply amount per unit time) of the working oil to the hydraulic cylinder 60 is adjusted. The supply amount of the working oil to the hydraulic cylinder 60 is adjusted, and thus the cylinder velocity of the hydraulic cylinder 60 is adjusted. A spool stroke sensor 65 which detects a movement amount (a movement distance) of the spool 64S is provided in a direction control valve 640 to be described later which supplies the working oil to the boom cylinder 10 and a direction control valve 641 to be described later which supplies the working oil to the arm cylinder 11.

The operation of the direction control valve 64 is adjusted by the operation device 25. The working oil which is supplied from the hydraulic pump 36 and is depressurized by the depressurization valve is supplied as the pilot oil to the operation device 25. The pilot oil which is supplied from a pilot hydraulic pump different from the hydraulic pump 36 may be supplied to the operation device 25. The operation device 25 is adjusted to a pilot hydraulic pressure based on the operation of each operation lever. The direction control valve 64 is driven by the pilot hydraulic pressure. Since the pilot hydraulic pressure is adjusted by the operation device 25, the movement amount of the spool 64S with respect to the axis direction is adjusted.

The direction control valve 64 is provided in each of the boom cylinder 10, the arm cylinder 11, and the bucket cylinder 12. In the description below, the direction control valve 64 which is connected to the boom cylinder 10 will be appropriately referred to as the direction control valve 640. The direction control valve 64 which is connected to the arm cylinder 11 will be appropriately referred to as the direction control valve 641. The direction control valve 64 which is connected to the bucket cylinder 12 will be appropriately referred to as a direction control valve 642.

The operation device 25 and the direction control valve 64 are connected to each other through the pilot passageway 450. The pilot oil used for moving the spool 64S of the direction control valve 64 flows through the pilot passageway 450. In the present embodiment, the control valve 27, the pressure sensor 66, and a pressure sensor 67 are disposed in the pilot passageway 450.

The pilot passageway 450 is connected to the direction control valve 64. The pilot oil is supplied to the direction control valve 64 through the pilot passageway 450. The direction control valve 64 includes a first pressure receiving chamber and a second pressure receiving chamber. The pilot passageway 450 is connected to the first pressure receiving chamber and the second pressure receiving chamber. When the pilot oil is supplied to the first pressure receiving chamber of the direction control valve 64 through pilot passageways 4520B, 4521B, and 4522B to be described later, the spool 64S moves in response to the pilot hydraulic pressure, and the working oil is supplied to the cap side oil chamber 48R of the hydraulic cylinder 60 through the direction control valve 64. The supply amount of the working oil to the cap side oil chamber 48R is adjusted by the operation amount of the operation device 25 (the movement amount of the spool 64S).

When the pilot oil is supplied to the second pressure receiving chamber of the direction control valve 64 through pilot passageways 4520A, 4521A, and 4522A to be described later, the spool moves in response to the pilot hydraulic pressure, and the working oil is supplied to the rod side oil chamber 47R of the hydraulic cylinder 60 through the direction control valve 64. The supply amount of the working oil to the rod side oil chamber 47R is adjusted by the operation amount of the operation device 25 (the movement amount of the spool 64S).

That is, the spool 64S moves toward one side in the axis direction, and thus the pilot oil having the pilot hydraulic pressure adjusted by the operation device 25 is supplied to the direction control valve 64. The spool 64S moves toward the other side in the axis direction, and thus the pilot oil having the pilot hydraulic pressure adjusted by the operation device 25 is supplied to the direction control valve 64. As a result, the position of the spool 64S with respect to the axis direction is adjusted.

In the description below, the pilot passageway 450 which is connected to the direction control valve 640 supplying the working oil to the boom cylinder 10 will be appropriately referred to as boom adjustment passageways 4520A and 4520B. The pilot passageway 450 which is connected to the direction control valve 641 supplying the working oil to the arm cylinder 11 will be appropriately referred to as arm adjustment passageways 4521A and 4521B. The pilot passageway 450 which is connected to the direction control valve 642 supplying the working oil to the bucket cylinder 12 will be appropriately referred to as bucket adjustment passageways 4522A and 4522B.

In the description below, the pilot passageway 450 connected to the boom adjustment passageway 4520A will be appropriately referred to as a boom operation passageway 4510A, and the pilot passageway 450 connected to the boom adjustment passageway 4520B will be appropriately referred to as a boom operation passageway 4510B. The pilot passageway 450 connected to the arm adjustment passageway 4521A will be appropriately referred to as an arm operation passageway 4511A, and the pilot passageway 450 connected to the arm adjustment passageway 4521B will be appropriately referred to as an arm operation passageway 4511B. The pilot passageway 450 connected to the bucket adjustment passageway 4522A will be appropriately referred to as a bucket operation passageway 4512A, and the pilot passageway 450 connected to the bucket adjustment passageway 4522B will be appropriately referred to as a bucket operation passageway 4512B.

The boom operation passageway (4510A, 4510B) and the boom adjustment passageway (4520A, 4520B) are connected to the pilot hydraulic type operation device 25. The pilot oil having the pressure adjusted in response to the operation amount of the operation device 25 flows to the boom operation passageway (4510A, 4510B). The arm operation passageway (4511A, 4511B) and the arm adjustment passageway (4521A, 4521B) are connected to the pilot hydraulic type operation device 25. The pilot oil having the pressure adjusted in response to the operation amount of the operation device 25 flows to the arm operation passageway (4511A, 4511B). The bucket operation passageway (4512A, 4512B) and the bucket adjustment passageway (4522A, 4522B) are connected to the pilot hydraulic type operation device 25. The pilot oil having the pressure adjusted in response to the operation amount of the operation device 25 flows to the bucket operation passageway (4512A, 4512B).

The boom operation passageway 4510A, the boom operation passageway 4510B, the boom adjustment passageway 4520A, and the boom adjustment passageway 4520B are boom passageways through which the pilot oil used for operating the boom 6 flows. The arm operation passageway 4511A, the arm operation passageway 4511B, the arm adjustment passageway 4521A, and the arm adjustment passageway 4521B are arm passageways through which the pilot oil used for operating the arm 7 flows. The bucket operation passageway 4512A, the bucket operation passageway 4512B, the bucket adjustment passageway 4522A, and the bucket adjustment passageway 4522B are bucket passageways through which the pilot oil used for operating the bucket 8 flows.

As described above, the boom 6 performs two kinds of operation of downward movement operation and upward movement operation by the operation of the operation device 25. The operation device 25 is operated so that the downward movement operation of the boom 6 is performed, and thus the pilot oil is supplied to the direction control valve 640 connected to the boom cylinder 10 through the boom operation passageway 4510A and the boom adjustment passageway 4520A. The direction control valve 640 is operated based on the pilot hydraulic pressure. As a result, the working oil is supplied from the hydraulic pumps 36 and 37 to the boom cylinder 10, and the downward movement operation of the boom 6 is performed.

The operation device 25 is operated so that the upward movement operation of the boom 6 is performed, and thus the pilot oil is supplied to the direction control valve 640 connected to the boom cylinder 10 through the boom operation passageway 4510B and the boom adjustment passageway 4520B. The direction control valve 640 is operated based on the pilot hydraulic pressure. As a result, the working oil is supplied from the hydraulic pumps 36 and 37 to the boom cylinder 10, and the upward movement operation of the boom 6 is performed.

That is, in the present embodiment, the boom operation passageway 4510A and the boom adjustment passageway 4520A are downward boom moving passageways which are connected to the second pressure receiving chamber of the direction control valve 640 and through which the pilot oil used for moving the boom 6 downward flows. The boom operation passageway 4510B and the boom adjustment passageway 4520B are upward boom moving passageways which are connected to the first pressure receiving chamber of the direction control valve 640 and through which the pilot oil used for moving the boom 6 upward flows.

Furthermore, the arm 7 performs two kinds of operation of downward movement operation and upward movement operation by the operation of the operation device 25. The operation device 25 is operated so that the upward movement operation of the arm 7 is performed, and thus the pilot oil is supplied to the direction control valve 641 connected to the arm cylinder 11 through the arm operation passageway 4511A and the arm adjustment passageway 4521A. The direction control valve 641 is operated based on the pilot hydraulic pressure. As a result, the working oil is supplied from the hydraulic pumps 36 and 37 to the arm cylinder 11, and the upward movement operation of the arm 7 is performed.

The operation device 25 is operated so that the downward movement operation of the arm 7 is performed, and thus the pilot oil is supplied to the direction control valve 641 connected to the arm cylinder 11 through the arm operation passageway 4511B and the arm adjustment passageway 4521B. The direction control valve 641 is operated based on the pilot hydraulic pressure. As a result, the working oil is supplied from the hydraulic pumps 36 and 37 to the arm cylinder 11, and the downward movement operation of the arm 7 is performed.

That is, in the present embodiment, the arm operation passageway 4511A and the arm adjustment passageway 4521A are upward arm moving passageways which are connected to the second pressure receiving chamber of the direction control valve 641 and through which the pilot oil used for moving the arm 7 upward flows. The arm operation passageway 4511B and the arm adjustment passageway 4521B are downward arm moving passageways which are connected to the first pressure receiving chamber of the direction control valve 641 and through which the pilot oil used for moving the arm 7 downward flows.

The bucket 8 performs two kinds of operation of downward movement operation and upward movement operation by the operation of the operation device 25. The operation device 25 is operated so that the upward movement operation of the bucket 8 is performed, and thus the pilot oil is supplied to the direction control valve 642 connected to the bucket cylinder 12 through the bucket operation passageway 4512A and the bucket adjustment passageway 4522A. The direction control valve 642 is operated based on the pilot hydraulic pressure. As a result, the working oil is supplied from the hydraulic pumps 36 and 37 to the bucket cylinder 12, and the upward movement operation of the bucket 8 is performed.

The operation device 25 is operated so that the downward movement operation of the bucket 8 is performed, and thus the pilot oil is supplied to the direction control valve 642 connected to the bucket cylinder 12 through the bucket operation passageway 4512B and the bucket adjustment passageway 4522B. The direction control valve 642 is operated based on the pilot hydraulic pressure. As a result, the working oil is supplied from the hydraulic pumps 36 and 37 to the bucket cylinder 12, and the downward movement operation of the bucket 8 is performed.

That is, in the present embodiment, the bucket operation passageway 4512A and the bucket adjustment passageway 4522A are upward bucket moving passageways which are connected to the second pressure receiving chamber of the direction control valve 642 and through which the pilot oil used for moving the bucket 8 upward flows. The bucket operation passageway 4512B and the bucket adjustment passageway 4522B are downward bucket moving passageways which are connected to the first pressure receiving chamber of the direction control valve 642 and through which the pilot oil used for moving the bucket 8 downward flows.

The control valve 27 adjusts the pilot hydraulic pressure, based on the control signal (current) from the work unit controller 26. The control valve 27 is, for example, an electromagnetic proportional control valve and is controlled based on the control signal from the work unit controller 26. The control valve 27 includes a control valve 27A and a control valve 27B. The control valve 27B adjusts the pilot hydraulic pressure of the pilot oil to be supplied to the first pressure receiving chamber of the direction control valve 64, and adjusts the amount of the working oil to be supplied through the direction control valve 64 to the cap side oil chamber 48R of the hydraulic cylinder 60. The control valve 27A adjusts the pilot hydraulic pressure of the pilot oil to be supplied to the second pressure receiving chamber of the direction control valve 64, and adjusts the amount of the working oil to be supplied through the direction control valve 64 to the rod side oil chamber 47R of the hydraulic cylinder 60.

The pressure sensor 66 and the pressure sensor 67 which detect the pilot hydraulic pressure are provided at both sides of the control valve 27. In the present embodiment, the pressure sensor 66 is disposed between the operation device 25 and the control valve 27 in a pilot passageway 451. The pressure sensor 67 is disposed between the control valve 27 and the direction control valve 64 in a pilot passageway 452.

The pressure sensor 66 is capable of detecting the pilot hydraulic pressure that is not adjusted by the control valve 27. The pressure sensor 67 is capable of detecting the pilot hydraulic pressure adjusted by the control valve 27. The pressure sensor 66 is capable of detecting the pilot hydraulic pressure to be adjusted by the operation of the operation device 25. The detection results of the pressure sensor 66 and the pressure sensor 67 are output to the work unit controller 26.

In the description below, the control valve 27 which is capable of adjusting the pilot hydraulic pressure for the direction control valve 640 supplying the working oil to the boom cylinder 10 will be appropriately referred to as boom depressurization valves 270A and 270B. The boom depressurization valves 270A and 270B are disposed in the boom operation passageway. In the description below, the control valve 27 which is capable of adjusting the pilot hydraulic pressure for the direction control valve 641 supplying the working oil to the arm cylinder 11 will be appropriately referred to as arm depressurization valves 271A and 271B. The arm depressurization valves 271A and 271B are disposed in the arm operation passageway. In the description below, the control valve 27 which is capable of adjusting the pilot hydraulic pressure for the direction control valve 642 supplying the working oil to the bucket cylinder 12 will be appropriately referred to as a bucket depressurization valve 272. Bucket depressurization valves 272A and 272B are disposed in the bucket operation passageway.

In the description below, the pressure sensor 66 which detects the pilot hydraulic pressure of the pilot passageway 451 connected to the direction control valve 640 supplying the working oil to the boom cylinder 10 will be appropriately referred to as a boom pressure sensor 660B, and the pressure sensor 67 which detects the pilot hydraulic pressure of the pilot passageway 452 connected to the direction control valve 640 will be appropriately referred to as a boom pressure sensor 670A.

Furthermore, in the description below, a boom pressure sensor 660 which is disposed in the boom operation passageway 4510A will be appropriately referred to as a boom pressure sensor 660A, and the boom pressure sensor 660 which is disposed in the boom operation passageway 4510B will be appropriately referred to as the boom pressure sensor 660B. Furthermore, the boom pressure sensor 670 which is disposed in the boom adjustment passageway 4520A will be appropriately referred to as the boom pressure sensor 670A, and the boom pressure sensor 670 which is disposed in the boom adjustment passageway 4520B will be appropriately referred to as a boom pressure sensor 670B.

In the description below, the pressure sensor 66 which detects the pilot hydraulic pressure of the pilot passageway 451 connected to the direction control valve 641 supplying the working oil to the arm cylinder 11 will be appropriately referred to as an arm pressure sensor 661, and the pressure sensor 67 which detects the pilot hydraulic pressure of the pilot passageway 452 connected to the direction control valve 641 will be appropriately referred to as an arm pressure sensor 671.

Furthermore, in the description below, the arm pressure sensor 661 which is disposed in the arm operation passageway 4511A will be appropriately referred to as an arm pressure sensor 661A, and the arm pressure sensor 661 which is disposed in the arm operation passageway 4511B will be appropriately referred to as an arm pressure sensor 661B. Furthermore, the arm pressure sensor 671 which is disposed in the arm adjustment passageway 4521A will be appropriately referred to as an arm pressure sensor 671A, and the arm pressure sensor 671 which is disposed in the arm adjustment passageway 4521B will be appropriately referred to as an arm pressure sensor 671B.

In the description below, the pressure sensor 66 which detects the pilot hydraulic pressure of the pilot passageway 451 connected to the direction control valve 642 supplying the working oil to the bucket cylinder 12 will be appropriately referred to as a bucket pressure sensor 662, and the pressure sensor 67 which detects the pilot hydraulic pressure of the pilot passageway 452 connected to the direction control valve 642 will be appropriately referred to as a bucket pressure sensor 672.

Furthermore, in the description below, the bucket pressure sensor 661 which is disposed in the bucket operation passageway 4512A will be appropriately referred to as a bucket pressure sensor 661A, and the bucket pressure sensor 661 which is disposed in the bucket operation passageway 4512B will be appropriately referred to as a bucket pressure sensor 661B. Furthermore, the bucket pressure sensor 672 which is disposed in the bucket adjustment passageway 4522A will be appropriately referred to as a bucket pressure sensor 672A, and the bucket pressure sensor 672 which is disposed in the bucket adjustment passageway 4522B will be appropriately referred to as a bucket pressure sensor 672B.

When the excavation control is not performed, the work unit controller 26 controls the control valve 27 and opens the pilot passageway 450 (fully opened). The pilot passageway 450 opens, and thus the pilot hydraulic pressure of the pilot passageway 451 and the pilot hydraulic pressure of the pilot passageway 452 become equal to each other. In the state where the pilot passageway 450 is opened by the control valve 27, the pilot hydraulic pressure is adjusted based on the operation amount of the operation device 25.

When the pilot passageway 450 is fully opened by the control valve 27, the pilot hydraulic pressure acting on the pressure sensor 66 and the pilot hydraulic pressure acting on the pressure sensor 67 are equal to each other. The pilot hydraulic pressure acting on the pressure sensor 66 and the pilot hydraulic pressure acting on the pressure sensor 67 are different from each other in a manner such that the opening degree of the control valve 27 decreases.

When the work unit 2 is controlled by the work unit controller 26 as in the excavation control or the like, the work unit controller 26 outputs the control signal to the control valve 27. The pilot passageway 451 has a predetermined pressure (a pilot hydraulic pressure) by, for example, an action of a pilot relief valve. When the control signal is output from the work unit controller 26 to the control valve 27, the control valve 27 is operated based on the control signal. The pilot oil of the pilot passageway 451 is supplied to the pilot passageway 452 through the control valve 27. The pilot hydraulic pressure of the pilot passageway 452 is adjusted (depressurized) by the control valve 27. The pilot hydraulic pressure of the pilot passageway 452 acts on the direction control valve 64. Thus, the direction control valve 64 is operated based on the pilot hydraulic pressure controlled by the control valve 27. In the present embodiment, the pressure sensor 66 detects the pilot hydraulic pressure that is not adjusted by the control valve 27. The pressure sensor 67 detects the pilot hydraulic pressure adjusted by the control valve 27.

The pilot oil having the pressure adjusted by the depressurization valve 27A is supplied to the direction control valve 64, and thus the spool 64S moves toward one side in the axis direction. The pilot oil having the pressure adjusted by the depressurization valve 27B is supplied to the direction control valve 64, and thus the spool 64S moves toward the other side in the axis direction. As a result, the position of the spool 64S with respect to the axis direction is adjusted.

For example, the work unit controller 26 can output the control signal to at least one of the boom depressurization valve 270A and the boom depressurization valve 270B, and adjust the pilot hydraulic pressure for the direction control valve 640 connected to the boom cylinder 10.

Furthermore, the work unit controller 26 can output the control signal to at least one of the arm depressurization valve 271A and the arm depressurization valve 271B, and adjust the pilot hydraulic pressure for the direction control valve 641 connected to the arm cylinder 11.

Furthermore, the work unit controller 26 can output the control signal to at least one of the bucket depressurization valve 272A and the bucket depressurization valve 272B, and adjust the pilot hydraulic pressure for the direction control valve 642 connected to the bucket cylinder 12.

As described above, in the excavation control, the work unit controller 26 limits the velocity of the boom 6 so as to decrease the velocity at which the bucket 8 approaches the target excavation ground shape 43I in response to the distance d between the target excavation ground shape 43I and the bucket 8 based on the target excavation ground shape 43I (the target excavation ground shape data item U) indicating a design ground shape as the target shape of the excavation target and the bucket blade tip position data item S indicating the position of the bucket 8.

In the present embodiment, the work unit controller 26 includes a boom limitation unit which outputs a control signal used for limiting the velocity of the boom 6. In the present embodiment, in the case where the work unit 2 is driven based on the operation of the operation device 25, the movement of the boom 6 is controlled (the boom interposition control) based on the control signal output from the boom limitation unit of the work unit controller 26 so that the blade tip 8T of the bucket 8 does not enter the target excavation ground shape 43I. Specifically, in the excavation control, the upward movement operation of the boom 6 is performed by the work unit controller 26 so that the blade tip 8T does not enter the target excavation ground shape 43I.

In the present embodiment, in order to realize the boom interposition control, the interposition valve 27C which is operated based on the control signal related to the boom interposition control and output from the work unit controller 26 is provided in the pilot passageway 50. In the boom interposition control, the pilot oil having the pressure adjusted to the pilot hydraulic pressure flows through the pilot passageway 50. The interposition valve 27C is disposed in the pilot passageway 50 and is capable of adjusting the pilot hydraulic pressure of the pilot passageway 50.

In the description below, the pilot passageway 50 through which the pilot oil having a pressure adjusted in the boom interposition control flows will be appropriately referred to as interposition passageways 501 and 502.

The pilot oil to be supplied to the direction control valve 640 connected to the boom cylinder 10 flows to the interposition passageway 501. The interposition passageway 501 is connected through the shuttle valve 51 to the boom operation passageway 4510B and the boom adjustment passageway 4520B connected to the direction control valve 640.

The shuttle valve 51 includes two inlets and one outlet. One inlet is connected to the interposition passageway 501. The other inlet is connected to the boom operation passageway 4510B. The outlet is connected to the boom adjustment passageway 4520B. The shuttle valve 51 connects the passageway having the higher pilot hydraulic pressure among the interposition passageway 501 and the boom operation passageway 4510B to the boom adjustment passageway 4520B. For example, when the pilot hydraulic pressure of the interposition passageway 501 is higher than the pilot hydraulic pressure of the boom operation passageway 4510B, the shuttle valve 51 operates so as to connect the interposition passageway 501 and the boom adjustment passageway 4520B to each other and so as not to connect the boom operation passageway 4510B and the boom adjustment passageway 4520B to each other. As a result, the pilot oil of the interposition passageway 501 is supplied to the boom adjustment passageway 4520B through the shuttle valve 51. When the pilot hydraulic pressure of the boom operation passageway 4510B is higher than the pilot hydraulic pressure of the interposition passageway 501, the shuttle valve 51 operates so as to connect the boom operation passageway 4510B and the boom adjustment passageway 4520B to each other and so as not to connect the interposition passageway 501 and the boom adjustment passageway 4520B to each other. Thus, the pilot oil of the boom operation passageway 4510B is supplied to the boom adjustment passageway 4520B through the shuttle valve 51.

The interposition valve 27C and the pressure sensor 68 which detects the pilot hydraulic pressure of the pilot oil of the interposition passageway 501 are provided in the interposition passageway 501. The interposition passageway 501 includes the interposition passageway 501 through which the pilot oil flows before passing through the interposition valve 27C and the interposition passageway 502 through which the pilot oil flows after having passed through the interposition valve 27C. The interposition valve 27C is controlled based on the control signal output from the work unit controller 26 in order to perform the boom interposition control.

When the boom interposition control is not performed, the direction control valve 64 is driven based on the pilot hydraulic pressure adjusted by the operation of the operation device 25. For example, the work unit controller 26 opens (fully opens) the boom operation passageway 4510B by the boom depressurization valve 270B and closes the interposition passageway 501 by the interposition valve 27C so as to drive the direction control valve 640 based on the pilot hydraulic pressure adjusted by the operation of the operation device 25.

When the boom interposition control is performed, the work unit controller 26 controls each control valve 27 so that the direction control valve 640 is driven based on the pilot hydraulic pressure adjusted by the interposition valve 27C. For example, when the boom interposition control of limiting the movement of the boom 6 is performed in the excavation control, the work unit controller 26 controls the interposition valve 27C so that the pilot hydraulic pressure of the interposition passageway 50 adjusted by the interposition valve 27C becomes higher than the pilot hydraulic pressure of the boom operation passageway 4510B to be adjusted by the operation device 25. In this way, the pilot oil from the interposition valve 27C is supplied to the direction control valve 640 through the shuttle valve 51.

When the boom 6 is moved upward at a high speed by the operation device 25 so that the bucket 8 does not enter the target excavation ground shape 43I, the boom interposition control is not performed. In this case, the operation device 25 is operated so that the boom 6 moves upward at a high speed and the pilot hydraulic pressure is adjusted based on the operation amount, and thus the pilot hydraulic pressure of the boom operation passageway 4510B to be adjusted by the operation of the operation device 25 becomes higher than the pilot hydraulic pressure of the interposition passageway 501 to be adjusted by the interposition valve 27C. As a result, the pilot oil of the boom operation passageway 4510B having the pilot hydraulic pressure adjusted by the operation of the operation device 25 is supplied to the direction control valve 640 through the shuttle valve 51.

In the boom interposition control, the work unit controller 26 determines whether the limitation condition is satisfied. The limitation condition includes a condition in which the distance d is smaller than the above-described first predetermined value dth1 and a condition in which the boom limitation velocity Vc_bm_lmt is larger than the boom target velocity Vc_bm. For example, when the magnitude of the boom limitation velocity Vc_bm_lmt in the downward direction of the boom 6 is smaller than the magnitude of the boom target velocity Vc_bm in the downward direction in the case where the boom 6 moves downward, the work unit controller 26 determines that the limitation condition is satisfied. Furthermore, when the magnitude of the boom limitation velocity Vc_bm_lmt in the upward direction of the boom 6 is larger than the magnitude of the boom target velocity Vc_bm in the upward direction in the case where the boom 6 moves upward, the work unit controller 26 determines that the limitation condition is satisfied.

When the limitation condition is satisfied, the work unit controller 26 generates the boom interposition instruction CBI so that the boom moves upward at the boom limitation velocity Vc_bm_lmt, and controls the control valve 27 of the boom cylinder 10. In this way, since the direction control valve 640 of the boom cylinder 10 supplies the working oil to the boom cylinder 10 so that the boom moves upward at the boom limitation velocity Vc_bm_lmt, the boom cylinder 10 moves the boom 6 upward at the boom limitation velocity Vc_bm_lmt.

In the first embodiment, the limitation condition may include a condition in which the absolute value of the arm limitation velocity Vc_am_lmt is smaller than the absolute value of the arm target velocity Vc_am. The limitation condition may further include other condition. For example, the limitation condition may further include a condition in which the arm operation amount is zero. The limitation condition may not include the condition in which the distance d is smaller than the first predetermined value dth1. For example, the limitation condition may only be the condition in which the limitation velocity of the boom 6 is larger than the boom target velocity.

The second predetermined value dth2 may be larger than zero as long as the second predetermined value is smaller than the first predetermined value dth1. In this case, both the boom 6 and the arm 7 are limited before the blade tip 8T of the boom 6 reaches the target excavation ground shape 43I. For this reason, when the blade tip 8T of the boom 6 moves beyond the target excavation ground shape 43I even before the blade tip 8T of the boom 6 reaches the target excavation ground shape 43I, both the boom 6 and the arm 7 can be limited.

(Case where Operation Lever is of Electric Type)

When the left operation lever 25L and the right operation lever 25R are of an electric type, the work unit controller 26 acquires an electric signal of a potentiometer or the like corresponding to the operation lever 25L and the right operation lever 25R. The electric signal will be referred to as an operation instruction current value. The work unit controller 26 outputs the opening/closing instruction based on the operation instruction current value to the control valve 27. Since the working oil of the pressure responding to the opening/closing instruction is supplied from the control valve 27 to the spool of the direction control valve and moves the spool, the working oil is supplied to the boom cylinder 10, the arm cylinder 11, or the bucket cylinder 12 through the direction control valve and the cylinders move in a telescopic manner.

In the excavation control, the work unit controller 26 outputs the opening/closing instruction based on an instruction value of the excavation control and the operation instruction current value to the control valve 27. The instruction value of the excavation control is, for example, the above-described boom interposition instruction CBI, and is an instruction value used for performing the boom interposition control in the excavation control. In the control valve 27 that receives the opening/closing instruction, the working oil of the pressure responding to the opening/closing instruction is supplied to the spool of the direction control valve and moves the spool. Since the working oil of the pressure responding to the instruction value of the excavation control is supplied to the spool of the direction control valve of the boom cylinder 10, the boom cylinder 10 extends to move the boom 6 upward. Next, the excavation control when the work unit 2 of the excavator 100 excavates the abyss will be described.

<Regarding Abyss Excavation>

Figure 16:
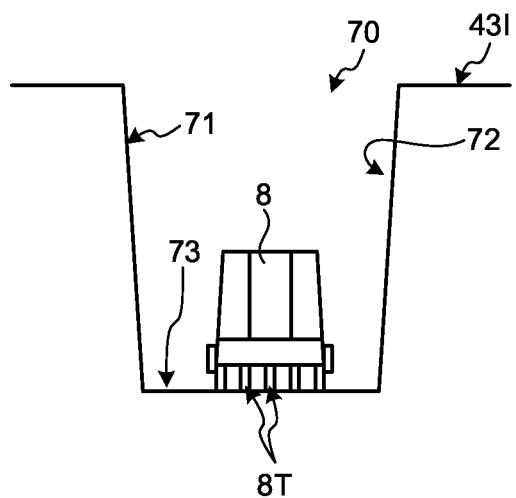
FIG. 16 is a diagram illustrating a relation between a bucket and an abyss when the abyss is excavated.
Figure 17:
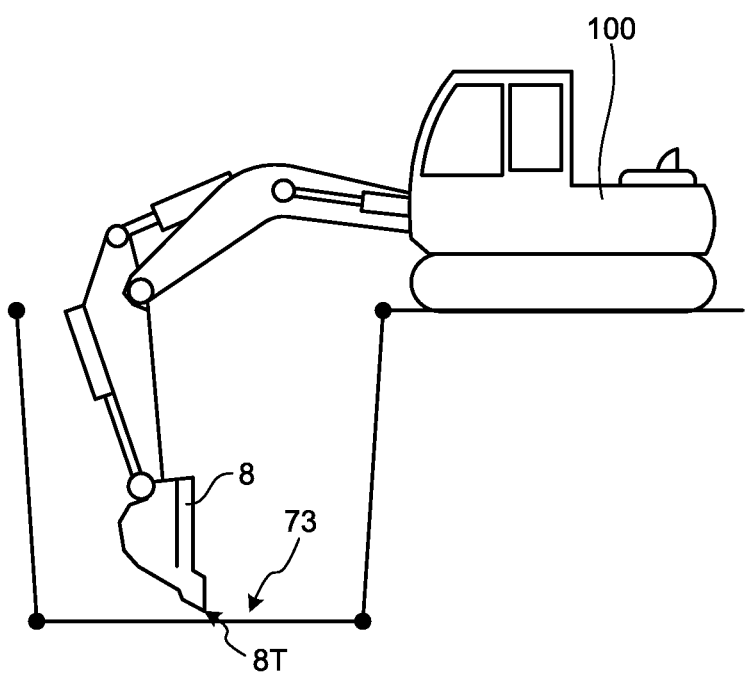
FIG. 17 is a diagram illustrating a relation between the bucket and the abyss when the abyss is excavated.
Figure 18:
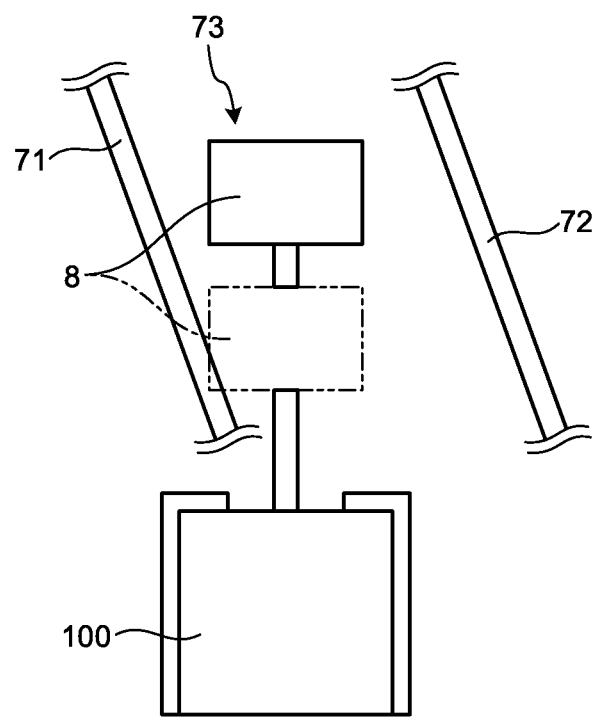
FIG. 18 is a diagram illustrating a relation between the bucket and the abyss when the abyss is excavated.
Figure 19A:
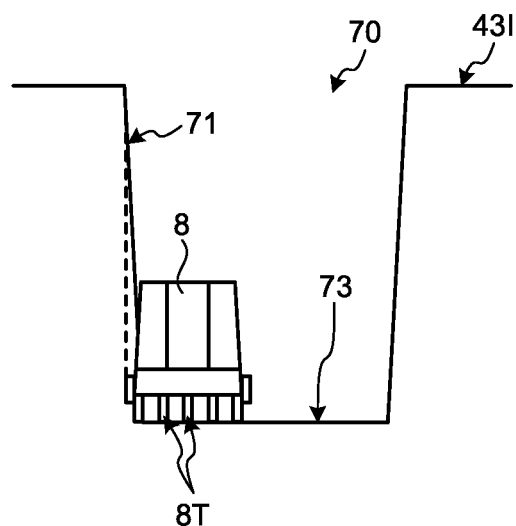
FIG. 19A is a diagram illustrating a relation between the bucket and the abyss when the abyss is excavated.
Figure 19B:
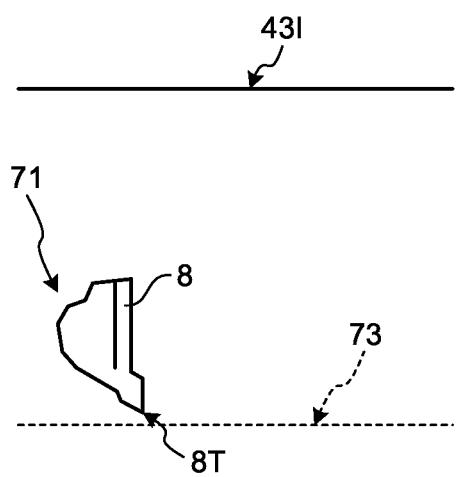
FIG. 19B is a diagram illustrating a relation between the bucket and the abyss when the abyss is excavated.

FIGS. 16, 17, 18, 19A, and 19B are diagrams illustrating a relation between the bucket 8 and an abyss 70 when the abyss 70 is excavated. FIGS. 16 and 19A illustrate a state when viewed from the rear side of the excavator 100, and FIGS. 17 and 19B illustrate a state when viewed from the lateral side of the excavator 100. The abyss 70 includes abyss walls 71 and 72 which face each other and an abyss bottom 73 which is located between the abyss walls 71 and 72. The abyss 70 is excavated for the purpose of burying, for example, a buried object such as a water pipe, and is filled when the buried object is installed therein. For this reason, generally in the abyss 70, the position precision of the abyss bottom 73 is important, and the position precision of the abyss walls 71 and 72 is not required so much. For this reason, the abyss walls 71 and 72 may be excavated to a certain extent in the excavation of the abyss 70. In the excavation of the abyss 70, the work unit controller 26 illustrated in FIG. 5 performs the excavation control based on the target excavation ground shape 43I (the target excavation ground shape data item U) of the abyss bottom 73 and the position information item of the blade tip 8T so that the blade tip 8T of the bucket 8 does not excavate the abyss bottom 73 too much.

In the present embodiment, the excavation control is performed based on, for example, the distance d serving as the shortest distance between the blade tip 8T of the bucket 8 and the target excavation ground shape 43I. For this reason, as illustrated in FIGS. 18 and 19A, for example, when the bucket 8 approaches the one abyss wall 71 by the excavation and the outer portion in the width direction of the bucket 8 performs excavation, the distance between the blade tip 8T at the portion and the abyss 70 (more specifically, the abyss wall 71) becomes shortest. In this case, since the distance d is a negative value, that is, the blade tip 8T is located below the target excavation ground shape 43I of the abyss wall 71 as illustrated in FIG. 19B, the work unit controller 26 moves the bucket 8 upward by controlling the boom 6 of the excavator 100 so that the bucket 8 moves away from the abyss wall 71 when the excavation control is currently performed. As a result, the excavator 100 is not operated according to the operator's intension, and hence the operator feels uncomfortable. The same applies to, for example, the case where the excavation control is performed based on the distance between the outermost blade tip 8T in the width direction of the bucket 8 and the target excavation ground shape 43I.

Figure 20:
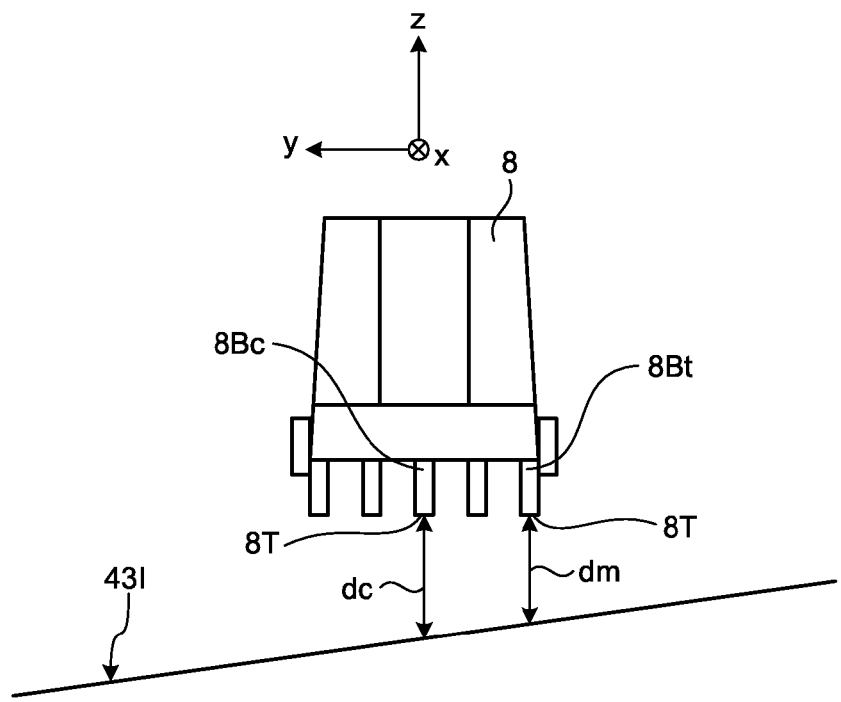
FIG. 20 is a diagram illustrating a position where a front-to-back-direction target excavation ground shape data item is cut out from a target excavation ground shape.
Figure 21:
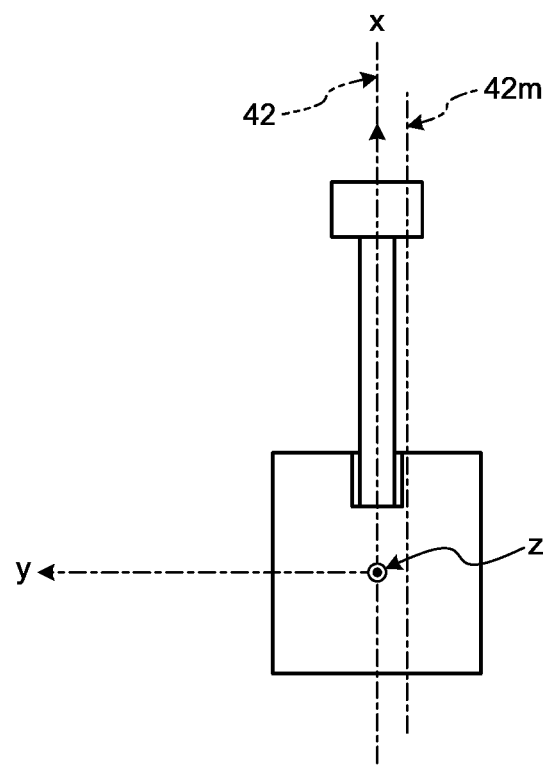
FIG. 21 is a diagram illustrating a plane where the front-to-back-direction target excavation ground shape data item is cut out from the target excavation ground shape.

FIG. 20 is a diagram illustrating a position where the front-to-back-direction target excavation ground shape data item U is cut out from the target excavation ground shape 43I. FIG. 21 is a diagram illustrating a plane where the front-to-back-direction target excavation ground shape data item U is cut out from the target excavation ground shape 43I. In the example illustrated in FIG. 20, the bucket 8 and the target excavation ground shape 43I are inclined within the yz plane. In this case, a distance dm between the blade tip 8T of an outermost blade 8Bt in the width direction (the y direction) and the target excavation ground shape 43I becomes shortest. A plane 42m illustrated in FIG. 21 is parallel to the xz plane, and passes through the blade tip 8T of the outermost blade 8Bt in the width direction of the bucket 8 illustrated in FIG. 20. Accordingly, an information item of an intersection portion between the plane 42m and the target construction face 41 becomes the front-to-back-direction target excavation ground shape data item U at the position of the distance d serving as the shortest distance between the blade tip 8T of the bucket 8 and the target excavation ground shape 43I.

The front-to-back-direction target excavation ground shape data item U may be cut out from the target excavation ground shape 43I at the center position in the width direction of the bucket 8. In the example illustrated in FIG. 20, the excavation control is performed based on a distance dc between the blade tip 8T of a blade 8Bc at the center in the width direction and the target excavation ground shape 43I and the front-to-back-direction target excavation ground shape data item U cut out at the position of the blade tip 8T of the blade 8Bc at the center in the width direction. The plane 42 illustrated in FIG. 21 is parallel to the xz plane, and passes through the blade tip 8T of the blade 8Bt at the center in the width direction of the bucket 8 illustrated in FIG. 20. Accordingly, an information item of the intersection portion between the plane 42 and the target excavation ground shape 43I becomes the front-to-back-direction target excavation ground shape data item U at the center position in the width direction of the bucket 8.

In the present embodiment there are the excavation control based on the distance d serving as the shortest distance between the blade tip 8T of the bucket 8 and the target excavation ground shape 43I, the excavation control based on the distance dc between the blade tip 8T of the blade 8Bc at the center in the width direction of the bucket 8 and the target excavation ground shape 43I, and the excavation control based on the distance between the outermost blade tip 8T in the width direction of the bucket 8 and the target excavation ground shape 43I. The operator of the excavator 100 can switch the excavation controls by operating, for example, the switch 29S illustrated in FIG. 2.

In the excavation control, when the work unit controller 26 uses the front-to-back-direction target excavation ground shape data item U at the center position in the width direction of the bucket 8, the upward movement of the bucket 8 which is not intended by the operator is restrained even when the outer side in the width direction of the bucket 8 excavates the abyss wall 71 or the abyss wall 72 illustrated in FIGS. 18 and 19A. Since the front-to-back-direction target excavation ground shape data item U at the center position in the width direction of the bucket 8 is used, the front-to-back-direction target excavation ground shape data item U is generated from the target construction information item T corresponding to the abyss bottom 73 even when the outer side in the width direction of the bucket 8 excavates the abyss wall 71 or the abyss wall 72. In this way, the work unit controller 26 can operate the work unit 2 according to the operator's intension.

In the present embodiment, for example, when a mode of using the front-to-back-direction target excavation ground shape data item U at the center position in the width direction of the bucket 8 is selected in the case where the abyss 70 is excavated by using the excavation control, it is possible to avoid an operation which is not intended by the operator to a certain extent when the abyss 70 is excavated. However, when work other than the excavation of the abyss 70 is continuously performed, there is a case in which the operator forgets to select the mode of using the front-to-back-direction target excavation ground shape data item U at the center position in the width direction of the bucket 8. In such a case, there is a possibility that operation which is not intended by the operator occur. In the present embodiment, the above-described width-direction target excavation ground shape data item Uw is used because the operation of the bucket 8 which is not intended by the operator is restrained even when the abyss 70 is excavated by using the excavation control in the state where a mode of using the distance d serving as the shortest distance between the blade tip 8T of the bucket 8 and the target excavation ground shape 43I is maintained.

<Excavation Control when Abyss 70 is Excavated>

Figure 22:
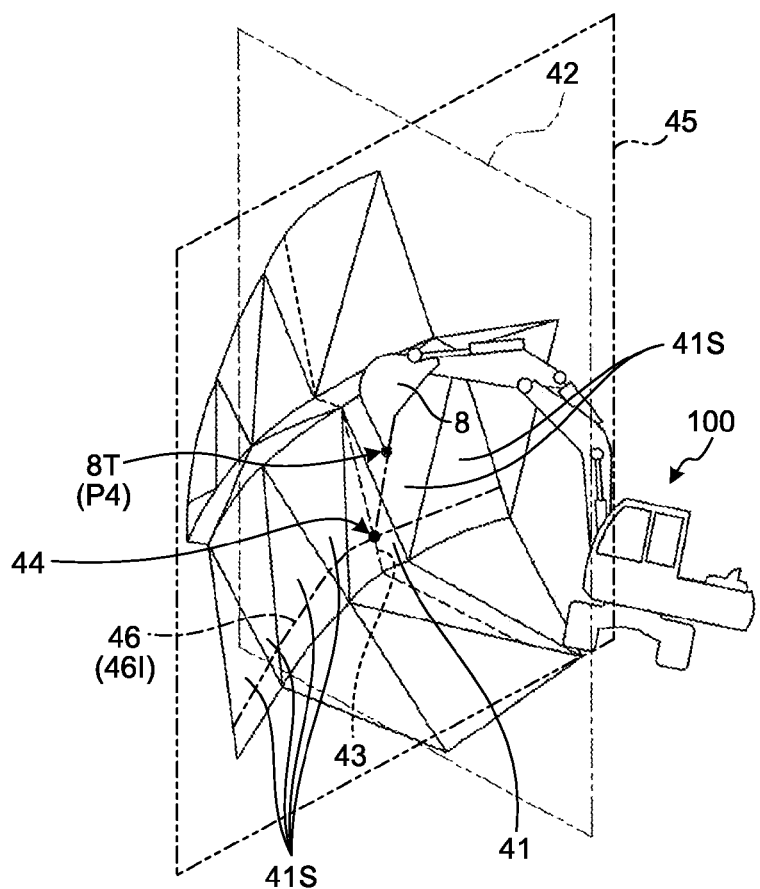
FIG. 22 is a diagram illustrating a plane where a width-direction target excavation ground shape data item is cut out.
Figure 23:
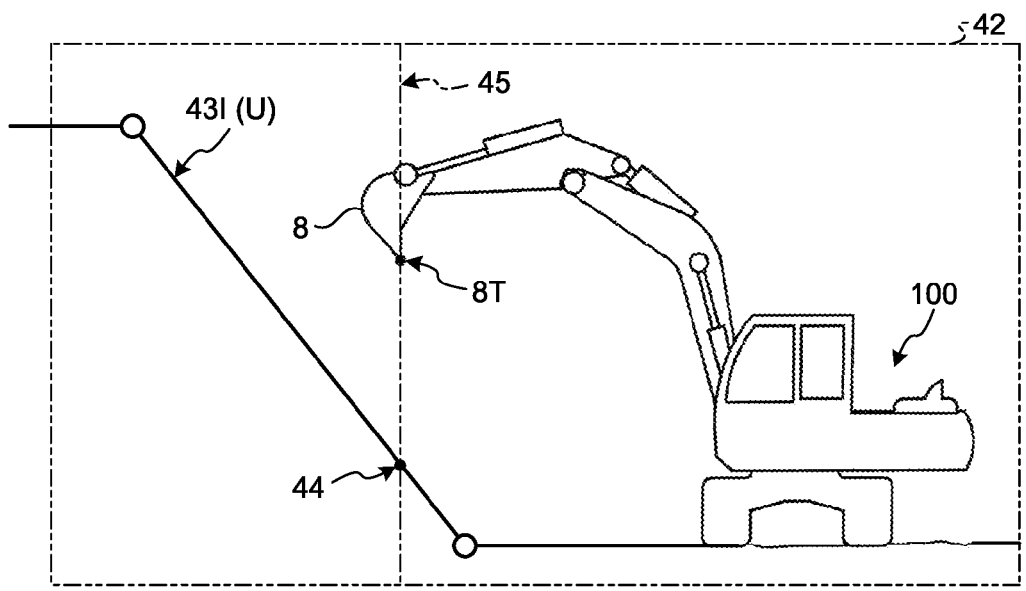
FIG. 23 is a diagram illustrating a plane where the width-direction target excavation ground shape data item is cut out.

FIGS. 22 and 23 are diagrams illustrating a plane 45 where the width-direction target excavation ground shape data item Uw is cut out. In the plane 45 as a first cut face, the width-direction target excavation ground shape data item Uw is cut out from the target construction face 41 as the first target construction face indicating the target shape and a target construction face 41S as a second target construction face continuous to the lateral side of the target construction face 41. In the plane 42 as a second cut face, the front-to-back-direction target excavation ground shape data item U is cut out from the target construction face 41 as the first target construction face indicating the target shape. The plane 45 is a plane which intersects (in the present embodiment, is perpendicular to) the work unit operation plane and which is parallel to the vertical direction in the global coordinate system. The plane 42 is an operation plane of the work unit 2 or a plane parallel to the operation plane. In the present embodiment, a predetermined plane where the arm 2 is operated in the work unit 2 illustrated in FIG. 1, that is, the above-described arm operation plane or a plane parallel to the arm operation plane becomes the plane 42.

When in the plane 42 and the plane 45 the target excavation ground shape 43I is cut out from the target construction face 41, both the plane 42 and the plane 45 pass through the excavation target position 44. The excavation target position 44 is an intersection point between the target construction face 41 and the perpendicular line falling in the vertical direction and passing through the blade tip position P4 of the blade tip 8T in the global coordinate system at the current time point. At the blade tip position P4, the position of the bucket 8 in the width direction changes depending on cutting out the target excavation ground shape 43I from the target construction face 41 at the center in the width direction of the bucket 8, cutting out the target excavation ground shape 43I at the outer side in the width direction, or cutting out the target excavation ground shape 43I at the position where the distance between the blade tip 8T and the target excavation ground shape 43I becomes shortest.

The position information item of the target construction face 41 at the intersection portion between the plane 42 and the target construction face 41, that is, the position information item of the intersection line 43 is the front-to-back-direction target excavation ground shape data item U. The target excavation ground shape 43I in the front to back direction is generated by the front-to-back-direction target excavation ground shape data item U. As illustrated in FIG. 23, the position information item of the intersection portion between the plane 45 and the target construction face 41 illustrated in FIG. 22 when viewed from the side of the excavator 100 based on the intersection line 43, that is, the position information item of an intersection line 46 is the width-direction target excavation ground shape data item Uw. The target excavation ground shape 46I in the width direction is generated by the width-direction target excavation ground shape data item Uw.

Figure 24:
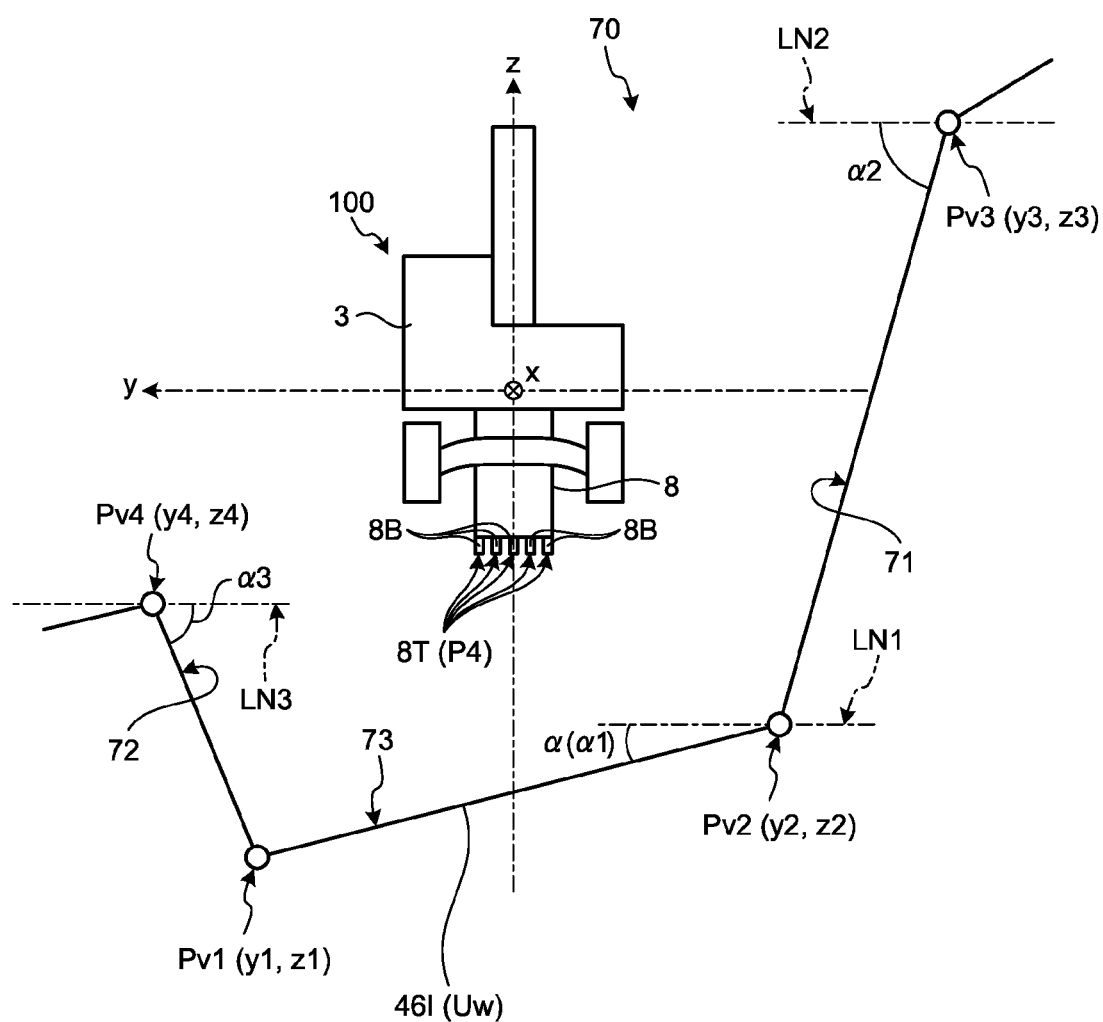
FIG. 24 is a diagram illustrating a relation between the target excavation ground shape and the bucket of the excavator when the abyss is excavated.

FIG. 24 is a diagram illustrating a relation between the target excavation ground shape 46I and the bucket 8 of the excavator 100 when the abyss 70 is excavated. The abyss 70 illustrated in FIG. 24 is represented by a first inflection point Pv1, a second inflection point Pv2, a third inflection point Pv3, a fourth inflection point Pv4, and a line connecting the points among the information item included in the target excavation ground shape 46I, that is, the width-direction target excavation ground shape data item Uw. The portion between the first inflection point Pv1 and the second inflection point Pv2 is the abyss bottom 73, the portion between the second inflection point Pv2 and the third inflection point Pv3 is the abyss wall 71, and the portion between the first inflection point Pv1 and the third inflection point Pv3 is the abyss wall 72.

The lines LN1, LN2, and LN3 in FIG. 24 are horizontal lines in the yz plane in the local coordinate system (x, y, z), that is, lines parallel to the y axis. The plane which includes the line LN1, the line LN2, or the line LN3 and is perpendicular to the z axis in the local coordinate system (x, y, z) is a plane parallel to the xy plane in the local coordinate system (x, y, z), that is, the horizontal plane in the local coordinate system (x, y, z). The relation of the horizontal plane in the local coordinate system (x, y, z) with the vertical direction changes depending on the posture of the excavator 100.

The coordinate of the first inflection point Pv1 is (y1, z1), the coordinate of the second inflection point Pv2 is (y2, z2), the coordinate of the third inflection point Pv3 is (y3, z3), and the coordinate of the fourth inflection point Pv4 is (y4, z4). An angle $\alpha$ of the target excavation ground shape 46I with respect to the horizontal plane of the local coordinate system (x, y, z) can be obtained by using the coordinates of the first inflection point Pv1, the second inflection point Pv2 and the like. For example, in the example illustrated in FIG. 24, the angle of the target excavation ground shape 46I directly below the bucket 8 with respect to the horizontal plane of the local coordinate system (x, y, z), that is, an angle $\alpha 1$ formed between the line connecting the first inflection point Pv1 and the second inflection point Pv2 and the line LN1 can be obtained by arctan$((z2-z1)/(y2-y1))$. An angle $\alpha 2$ of the target excavation ground shape 46I at the right side when viewed from the rear side of the excavator 100 with respect to the horizontal plane of the local coordinate system (x, y, z) can be obtained by arctan$((z3-z2)/(y3-y2))$. An angle $\alpha 3$ of the target excavation ground shape 46I at the left side when viewed from the rear side of the excavator 100 with respect to the horizontal plane of the local coordinate system (x, y, z) can be obtained by arctan$((z1-z4)/(y1-y4))$. In this way, the angle $\alpha$ of the target excavation ground shape 46I with respect to the horizontal plane of the local coordinate system (x, y, z) can be obtained from the coordinates of at least two inflection points. The target excavation ground shape 43I in the front to back direction is also obtained in the same manner.

The work unit controller 26 performs the excavation control based on the position of the work unit 2 acquired from the display controller 28, more specifically, the blade tip position P4 of the bucket 8, the front-to-back-direction target excavation ground shape data item U, and the width-direction target excavation ground shape data item Uw. More specifically, the work unit controller 26 performs the excavation control in the front to back direction of the work unit 2 based on the front-to-back-direction target excavation ground shape data item U, and the control determination unit 58 of the work unit controller 26 illustrated in FIG. 5 stops the excavation control which is currently performed or resumes the excavation control which is currently stopped, based on the width-direction target excavation ground shape data item Uw. In this way, in the present embodiment, the control amount of the boom 6 in the excavation control is obtained based on the front-to-back-direction target excavation ground shape data item U. The width-direction target excavation ground shape data item Uw is used for determining whether to stop or perform the excavation control.

In the present embodiment, the control determination unit 58 of the work unit controller 26 acquires the width-direction target excavation ground shape data item Uw from the display controller 28. The control determination unit 58 stops the excavation control when the angle $\alpha$ of the width-direction target excavation ground shape data item Uw directly below the bucket 8 with respect to the horizontal plane is equal to or more than a predetermined magnitude (hereinafter, appropriately referred to as an inclination angle threshold value) $\alpha c$. In the present embodiment, the inclination angle threshold value $\alpha c$ is 70 degrees, but is not limited thereto. In the example illustrated in FIG. 24, the angle $\alpha 1$ of the width-direction target excavation ground shape data item Uw directly below the bucket 8 with respect to the horizontal plane corresponding to the line LN1 is smaller than the inclination angle threshold value $\alpha c$. In this case, the control determination unit 58 continues the excavation control which is currently performed.

In the example illustrated in FIG. 24, it is assumed that the upper swing body 3 swings, for example, rightward when viewed from the rear side of the excavator 100 and the abyss wall 71 is located directly below the bucket 8. The angle $\alpha 2$ of the width-direction target excavation ground shape data item Uw corresponding to the abyss wall 71 with respect to the horizontal plane corresponding to the line LN2 is equal to or more than the inclination angle threshold value $\alpha c$. In this case, the control determination unit 58 stops the excavation control which is currently performed. As a result, the work unit controller 26 controls the boom 6, the arm 7, and the bucket 8 based on the boom target velocity Vc_bm, the arm target velocity Vc_am, and the bucket target velocity Vc_bkt, respectively without moving the bucket 8 in a direction moving away from the abyss wall 71 even when the bucket 8 excavates the abyss wall 71. In this way, when the bucket 8 excavates the abyss walls 71 and 72 in the case where the excavator 100 excavates the abyss 70 while performing the excavation control, the work unit 2 is operated according to the operator's operation. As a result, since the work unit 2 is operated according to the operator's intension, the uncomfortable feeling of the operator is reduced.

It is assumed that the upper swing body 3 swings leftward when viewed from the rear side of the excavator 100 and the abyss bottom 73 is located again directly below the bucket 8 from the state where the bucket 8 is located above the abyss wall 71. In this case, the angle α1 of the width-direction target excavation ground shape data item Uw directly below the bucket 8 with respect to the horizontal plane corresponding to the line LN1 becomes smaller than the inclination angle threshold value αc. Then, the control determination unit 58 resumes the excavation control which is currently stopped. Since the excavation control is performed when the excavator 100 excavates the abyss bottom 73 by such a control, the blade tip 8T of the bucket 8 is restrained from excavating beyond the target excavation ground shapes 43I and 46I of the abyss bottom 73, and hence degradation in the precision of the dimension and the position of the abyss bottom 73 is restrained. The work unit controller 26 may perform the excavation control based on the target excavation ground shape in the width direction. In the present embodiment, the case has been described in which the mode of setting the front-to-back-direction target excavation ground shape data item U at the center position in the width direction of the bucket 8 is not used, but the present embodiment may include a case where the mode setting is used or a case where there is no mode setting. Next, a control example when the abyss 70 is excavated by using the work machine control method according to the present embodiment will be described.

(Control Example of Work Machine Control Method According to Present Embodiment)

Figure 25:
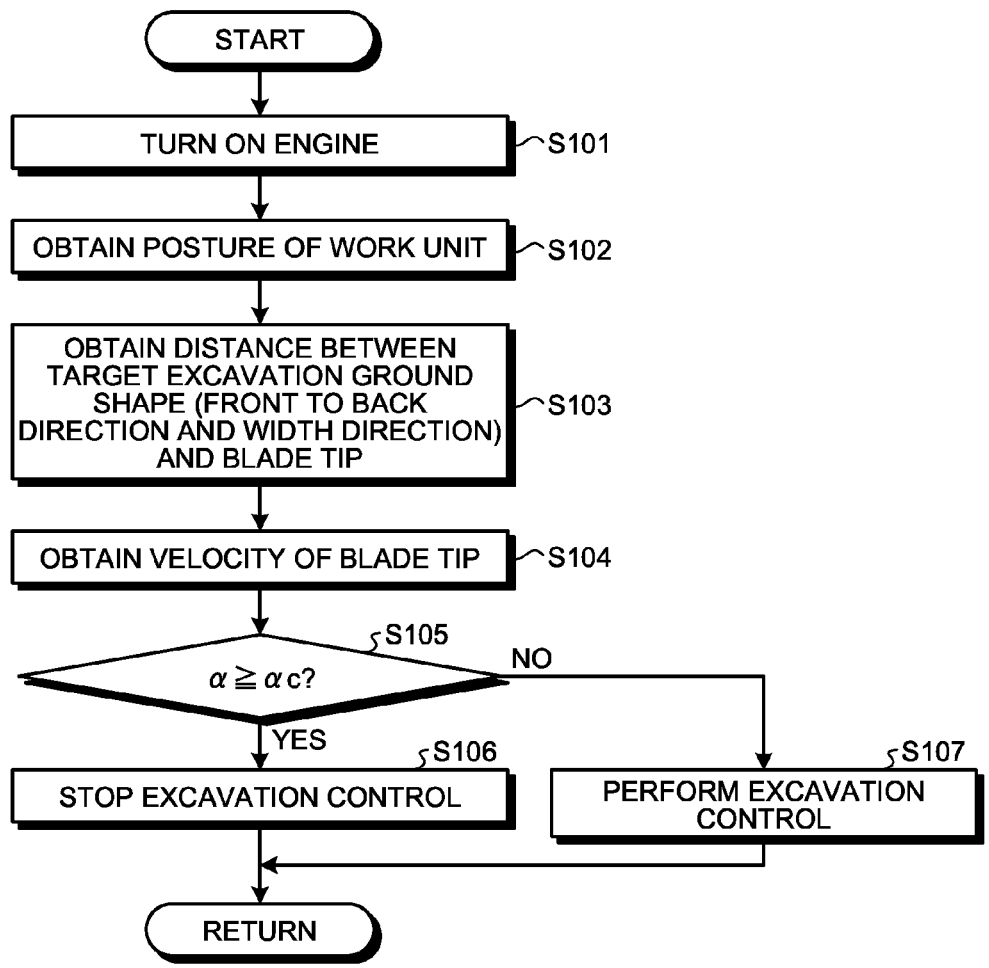
FIG. 25 is a flowchart illustrating a control example when the abyss is excavated.

FIG. 25 is a flowchart illustrating a control example when the abyss 70 is excavated. When the excavation control is started with the operator's operation on the switch 29S illustrated in FIG. 2 in step S101, the display controller 28 illustrated in FIG. 5 acquires the inclination angles θ1, θ2, and θ3 from the sensor controller 39 and generates the bucket blade tip position data item S from the inclination angles θ1, θ2, and θ3 and the swing center position data item XR of the excavator 100 in step S102. In step S103, the work unit controller 26 illustrated in FIG. 5 obtains the distance d between the target excavation ground shape 43I and the blade tip 8T of the bucket 8.

In step S104, the work unit controller 26 obtains the blade tip velocity, specifically, the boom target velocity Vc_bm in the direction of the target excavation ground shape 43I by the operation of the operator of the excavator 100 on the work unit 2. Next, in step S105, the control determination unit 58 of the work unit controller 26 illustrated in FIG. 5 acquires the target excavation ground shape 46I (the width-direction target excavation ground shape data item Uw) directly below the bucket 8 and the blade tip position P4 from the work unit controller 26, and obtains the angle α of the target excavation ground shape 46I with respect to the horizontal plane. Then, the control determination unit 58 compares the obtained angle α with the inclination angle threshold value αc. When α≥αc as a result of the comparison (YES in step S105), the abyss walls 71 and 72 of the abyss 70 are located directly below the bucket 8. For this reason, in step S106, the control determination unit 58 stops the excavation control. In this case, the work unit 2 is operated according to the operation of the work unit controller 26 by the operator.

When α<αc (step S105, No), the abyss walls 71 and 72 of the abyss 70 are not located directly below the bucket 8, and hence there is a state where the excavation control may be performed. In this case, in step S107, the control determination unit 58 performs the excavation control. For this reason, when the blade tip 8T of the bucket 8 attempts to excavate the excavation target beyond the target excavation ground shape 46I, the work unit controller 26 moves, for example, the boom 6 upward and restrains the bucket 8 from excavating the target excavation ground shape 46I.

Second Embodiment

Figure 26:
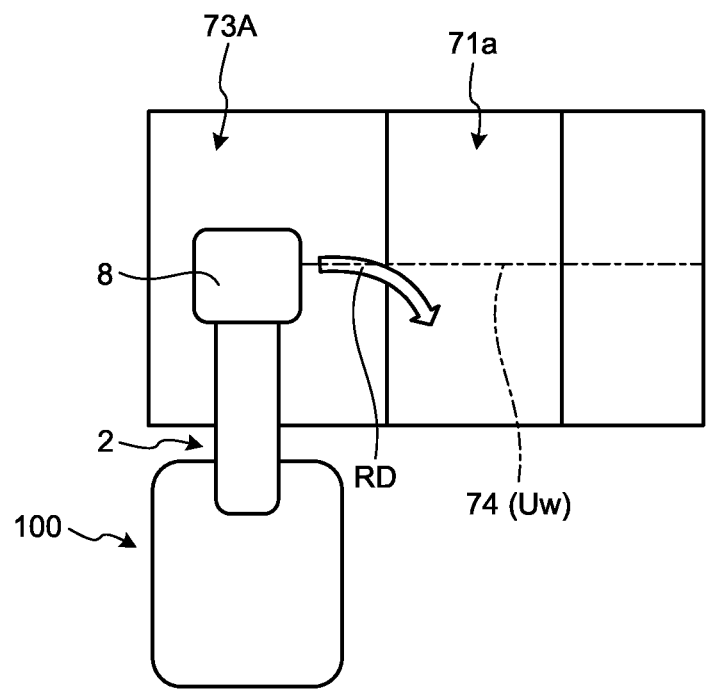
FIG. 26 is a diagram illustrating a state where a bucket of an excavator proceeds to an abyss wall when an abyss is being excavated.
Figure 27:
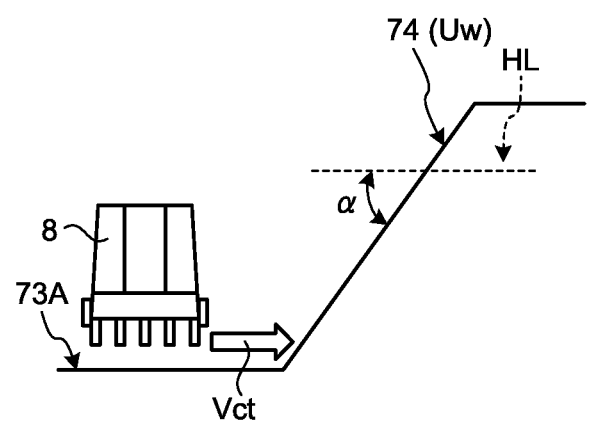
FIG. 27 is a diagram illustrating a state where the bucket is viewed from the rear side of the excavator.
Figure 28:
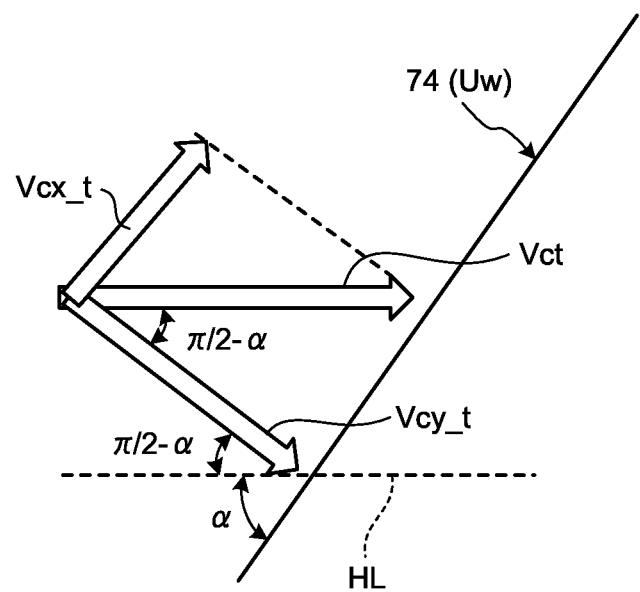
FIG. 28 is a diagram illustrating a velocity element when the bucket approaches the abyss wall.
Figure 29:
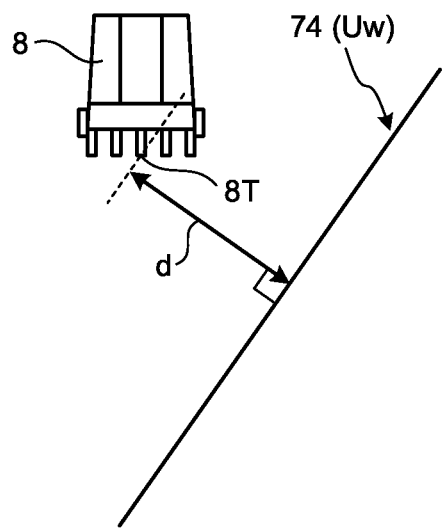
FIG. 29 is a diagram illustrating a distance between a blade tip of the bucket and the abyss wall.
Figure 30:
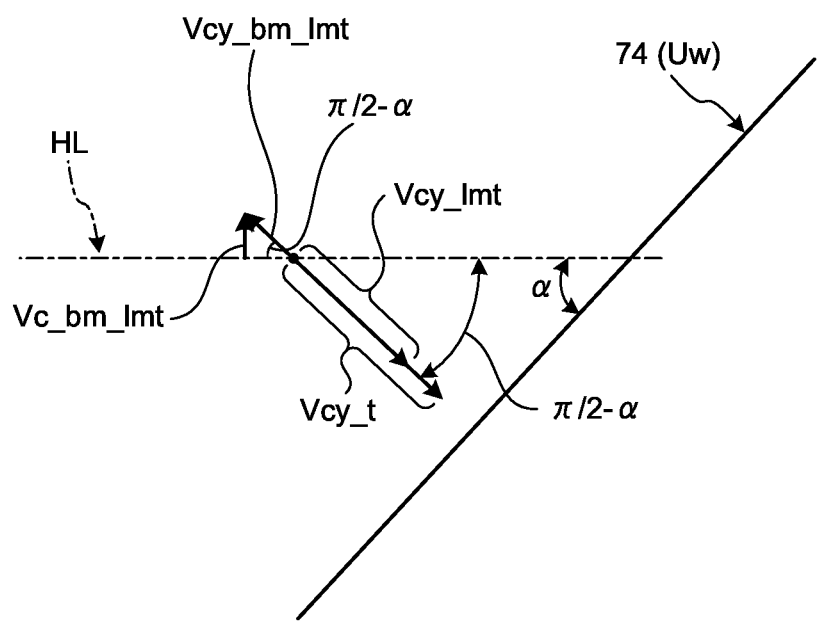
FIG. 30 is a diagram illustrating a limitation velocity of a boom.

FIG. 26 is a diagram illustrating a state where a bucket 8 of an excavator 100 proceeds to a side wall 71a when an abyss 70 is being excavated. FIG. 27 is a diagram illustrating a state where the bucket 8 is viewed from the rear side of the excavator 100. FIG. 28 is a diagram illustrating a velocity element when the bucket 8 approaches the side wall 71a. FIG. 29 is a diagram illustrating a distance d between a blade tip 8T of the bucket 8 and the side wall 71a. FIG. 30 is a diagram illustrating a boom limitation velocity Vc_bm_lmt.

In a second embodiment, an excavation control is performed based on a target excavation ground shape 46I (a width-direction target excavation ground shape data item Uw) in the width direction of a work unit 2 when the work unit 2, more specifically, the bucket 8 has a velocity element in the width direction thereof. For example, when the excavator 100 excavates a ground surface 73A as illustrated in FIG. 26, there is a case where the work unit 2 moves toward the side wall 71a by causing, for example, an upper swing body 3 to swing (in this example, a direction indicated by an arrow RD of FIG. 26). In this case, in the first embodiment in which the abyss is the excavation target, the excavation control is stopped; however, in the present embodiment, the excavation control is also performed in the width direction of the work unit 2 so that the bucket 8 does not excavate beyond a target excavation ground shape 74 of the side wall 71a. Specifically, for example, when a work unit controller 26 determines that there is a possibility that the bucket 8 excavate beyond the target excavation ground shape 74 of the side wall 71a in the case where the bucket 8 approaches the side wall 71a at a velocity Vct as illustrated in FIG. 27, the work unit controller moves, for example, the boom 6 illustrated in FIG. 1 upward, and avoids such a possibility.

In the present embodiment, the work unit controller 26 performs the excavation control in the width direction when the velocity element in the width direction of the work unit is generated in the work unit 2. The velocity element in the width direction of the work unit 2 is generated by the swing of the upper swing body 3 illustrated in FIG. 1. Furthermore, even when the work unit 2 is inclined with respect to the direction where a traveling device 5 advances in the xy plane in a local coordinate system of the excavator 100, the velocity element in the width direction of the work unit 2 is generated. In the present embodiment, an example will be described in which the excavation control in the width direction is performed when the upper swing body 3 swings, but the excavation control in the width direction may be performed when the velocity element in the width direction of the work unit 2 is generated by the traveling of the traveling device 5. Furthermore, the excavation control in the width direction may be stopped when the traveling device 5 is traveling.

Figure 31:
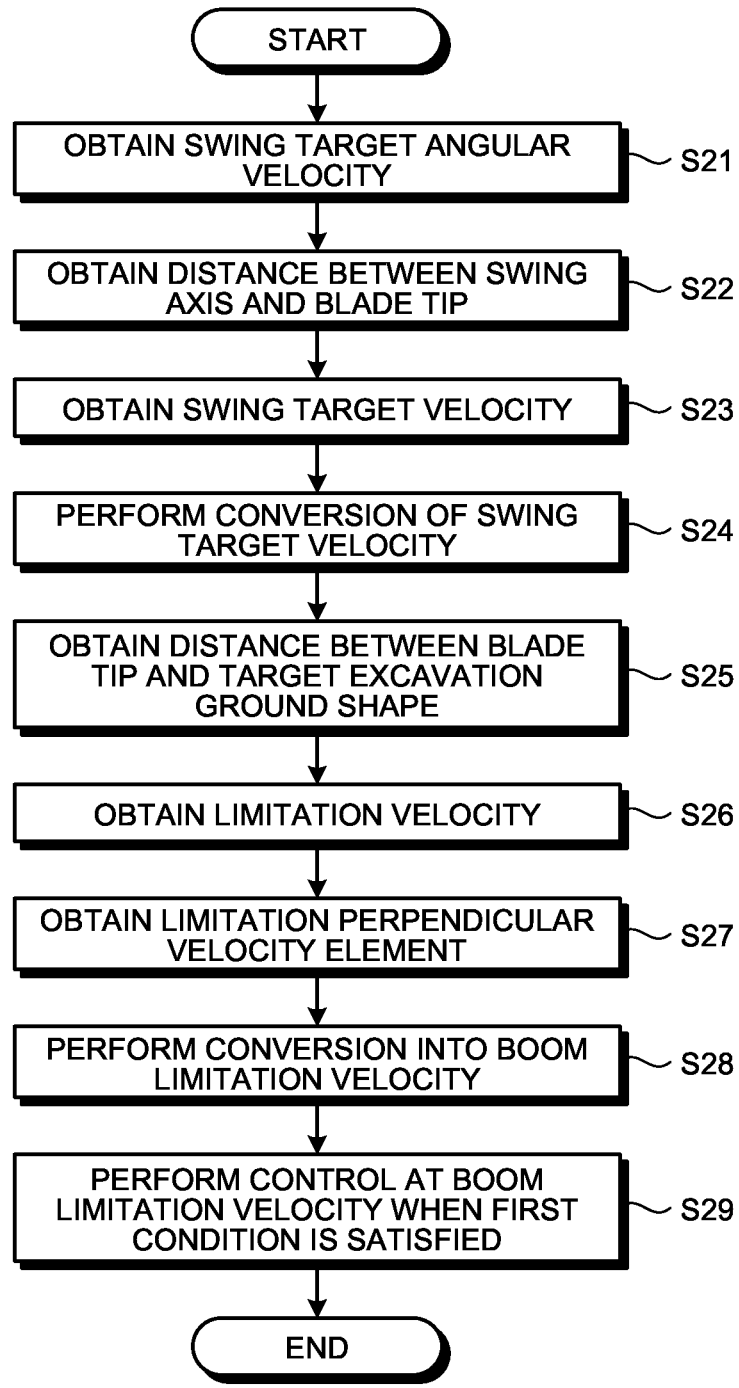
FIG. 31 is a flowchart illustrating a process example of the excavation control in the width direction.

FIG. 31 is a flowchart illustrating a process example of the excavation control in the width direction. In the next description, an example will be described in which the excavation control in the width direction is performed so that the bucket 8 does not excavate the side wall 71a of the abyss 70 too much, but the excavation target may be, for example, a slope other than the side wall 71a. The target excavation ground shape 74 in the width direction is acquired in the same method as the case where the target excavation ground shape 46I (the width-direction target excavation ground shape data item Uw) is acquired based on the excavation target position 44 in the width direction illustrated in FIG. 22.

When the excavation control in the width direction is performed, the storage unit 26M of the work unit controller 26 illustrated in FIG. 5 stores an information item of defining a relation between a swing operation amount MR and a swing target angular velocity ωct as a target velocity information item. In step S21, The target velocity determination unit 52 illustrated in FIG. 5 acquires the swing operation amount MR from an operation device 25 and obtains the swing target angular velocity ωct by the obtained swing operation amount MR. Next, in step S22, the target velocity determination unit 52 obtains a distance LR between the swing axis z illustrated in FIG. 3A and the blade tip 8T of the bucket 8 from inclination angles θ1, θ2, and θ3, the length L1 of a boom 6, the length L2 of an arm 7, and the length L3 of the bucket 8. The distance LR is a swing radius of the blade tip 8T. In step S23, the target velocity determination unit 52 obtains the swing target velocity Vct of the blade tip 8T by multiplying the swing target angular velocity ωct by the swing radius (the distance LR) of the blade tip 8T.

Next, in step S24, as illustrated in FIG. 28, the target velocity determination unit 52 converts the swing target velocity Vct into a velocity element (hereinafter, appropriately referred to as a perpendicular velocity element) Vcy_t in a direction perpendicular to the target excavation ground shape 74 (the width-direction target excavation ground shape data item Uw) and a velocity element (hereinafter, appropriately referred to as a horizontal velocity element) Vcx_t in a direction parallel to the target excavation ground shape 74 (the width-direction target excavation ground shape data item Uw). In the example illustrated in FIG. 28, the perpendicular velocity element Vcy_t and the horizontal velocity element Vcx_t are obtained with respect to the target excavation ground shape 74 corresponding to the side wall 71a. In the example illustrated in FIG. 28, the side wall 71a is inclined by an angle α with respect to a horizontal plane HL of the local coordinate system (x, y, z) of the excavator 100, that is, a plane parallel to the xy plane. For this reason, the perpendicular velocity element Vcy_t can be obtained by Vct×cos(π/2−α), and the horizontal velocity element Vcx_t can be obtained by Vct×sin(π/2−α).

In step S25, as illustrated in FIG. 29, the distance acquisition unit 53 of the work unit controller 26 illustrated in FIG. 5 acquires the distance d between the blade tip 8T of the bucket 8 and the target excavation ground shape 74 corresponding to the side wall 71a. In particular, the distance acquisition unit 53 calculates the distance d between the blade tip 8T at the center in the width direction of the bucket 8 and the target excavation ground shape 74 from the position information item of the blade tip 8T acquired as described above and the width-direction target excavation ground shape data item Uw indicating a position of the target excavation ground shape 74. In this case, the distance acquisition unit 53 may calculate a distance serving as the shortest distance between the blade tip 8T of the bucket 8 and the target excavation ground shape 74, and the work unit controller 26 may perform the excavation control in the width direction based on the shortest distance.

In step S26, the limitation velocity determination unit 54 of the work unit controller 26 illustrated in FIG. 5 calculates a limitation velocity Vcy_lmt of the entire work unit 2 illustrated in FIG. 1 based on the distance d between the blade tip 8T of the bucket 8 and the target excavation ground shape 74. Since the limitation velocity Vcy_lmt of the entire work unit 2 is the same as that of the first embodiment, the description thereof will be omitted. In step S27, as illustrated in FIG. 30, the limitation velocity determination unit 54 calculates a limitation perpendicular velocity element Vcy_bm_lmt of the boom 6 by subtracting the perpendicular velocity element Vcy_t of the swing target velocity Vct from the limitation velocity Vcy_lmt of the entire work unit 2.

In step S28, as illustrated in FIG. 30, the limitation velocity determination unit 54 converts the limitation perpendicular velocity element Vcy_bm_lmt of the boom 6 into the limitation velocity (the boom limitation velocity) Vc_b-m_lmt of the boom 6. Specifically, the boom limitation velocity Vc_bm_lmt is obtained by multiplying the limitation perpendicular velocity element Vcy_bm_lmt by sin(π/2−α). In step S29, when a pilot pressure based on a boom interposition instruction CBI is larger than a pilot pressure generated based on the operation of the boom 6, a work unit control unit 57 of the work unit controller 26 generates a boom instruction signal CB so that the velocity of the boom 6 becomes the boom limitation velocity Vc_bm_lmt and controls the interposition valve 27C illustrated in FIGS. 2 and 15.

In the present embodiment, a situation such that the bucket is brought into contact with the slope or the like when the upper swing body 3 swings after the excavation can be avoided by performing the excavation control in the width direction. In the present embodiment, a work unit controller 26a may concurrently perform both the excavation control in the width direction and the excavation control in the front to back direction. Furthermore, the work unit controller 26 may switch the excavation control in the front to back direction and the excavation control in the width direction according to the presence or absence of the swing of the work unit 2. For example, when the work unit 2 swings in the excavation control in the front to back direction, the work unit controller 26 may stop the excavation control in the front to back direction and perform only the excavation control in the width direction, and when the swing of the work unit 2 stops, the work unit controller may stop the excavation control in the width direction and resume the excavation control in the front to back direction. The work unit controller 26 may perform the excavation control based on the target excavation ground shape in the width direction. Next, an excavation control based on a velocity having the swing target velocity Vct synthesized with a target velocity Vft in the front to back direction will be described.

(Excavation Control Based on Synthesized Velocity)

Figure 32:
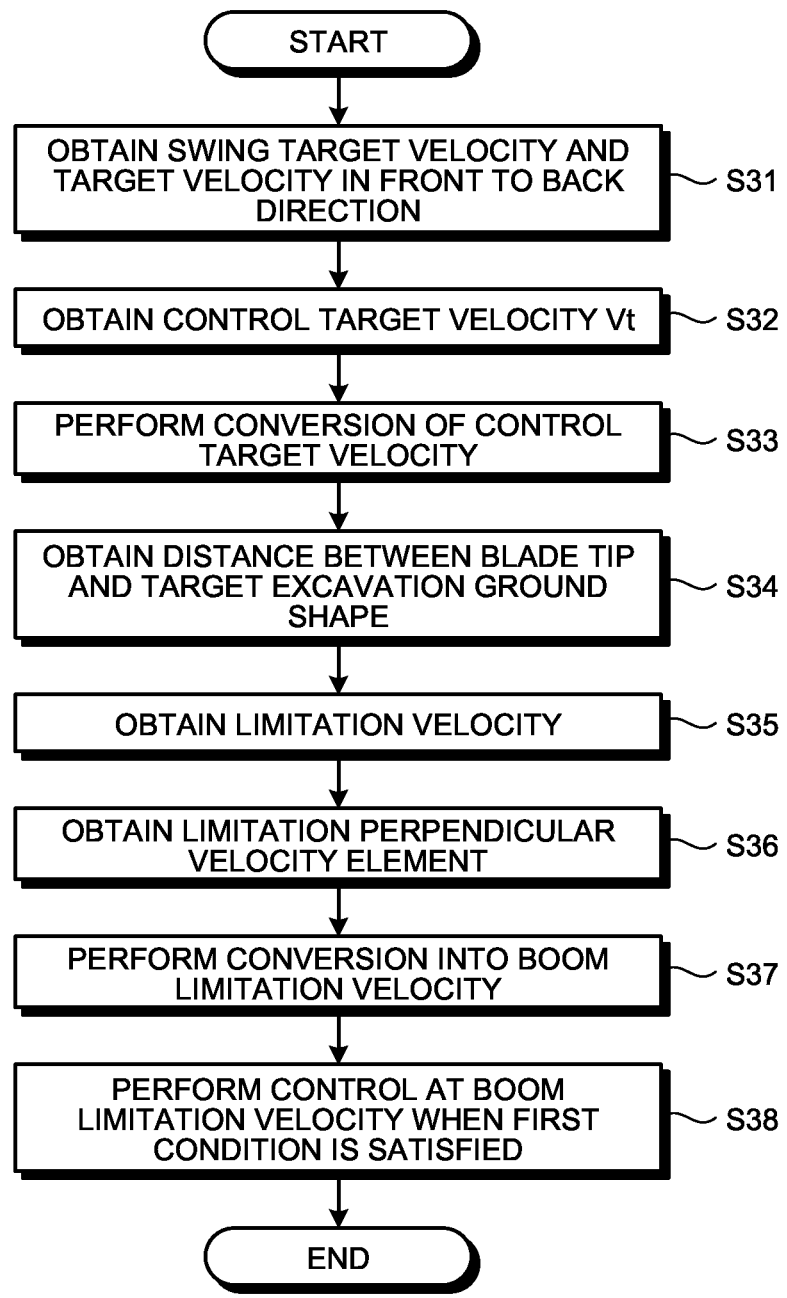
FIG. 32 is a flowchart illustrating a process of the excavation control based on a velocity having a swing target velocity synthesized with a target velocity in the front to back direction.
Figure 33:
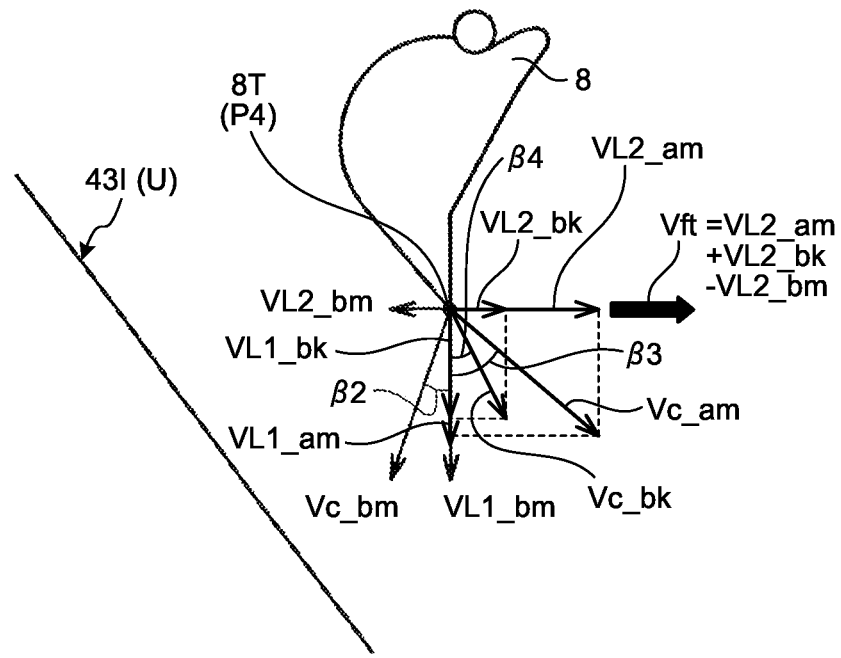
FIG. 33 is a diagram illustrating a method of obtaining the target velocity in the front to back direction.
Figure 34:
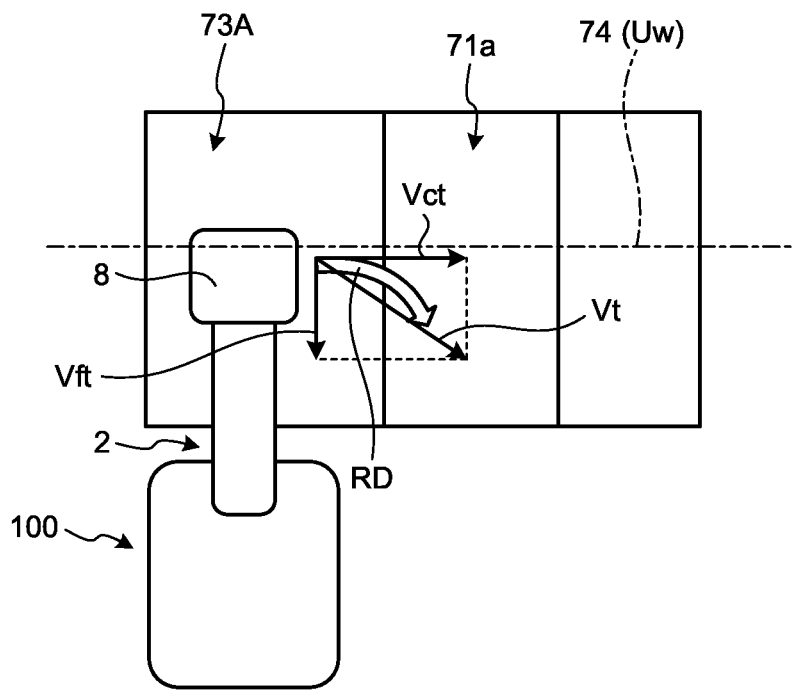
FIG. 34 is a diagram illustrating a method of obtaining the velocity having the swing target velocity synthesized with the target velocity in the front to back direction.
Figure 35:
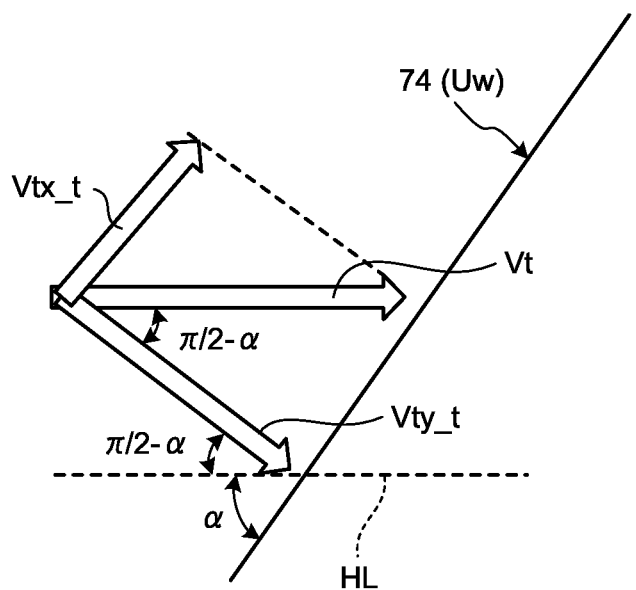
FIG. 35 is a diagram illustrating a velocity element when the bucket approaches the target excavation ground shape corresponding to a side wall.
Figure 36:
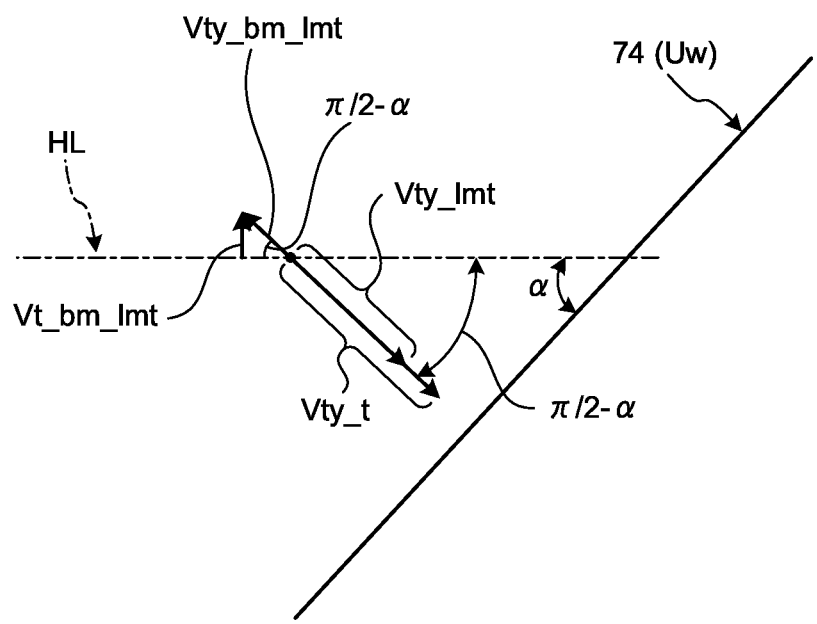
FIG. 36 is a diagram illustrating a boom limitation velocity.

FIG. 32 is a flowchart illustrating a process of the excavation control based on the velocity having the swing target velocity Vct synthesized with the target velocity Vft in the front to back direction. FIG. 33 is a diagram illustrating a method of obtaining the target velocity Vft in the front to back direction. FIG. 34 is a diagram illustrating a method of obtaining a velocity Vt having the swing target velocity Vct synthesized with the target velocity Vft in the front to back direction. FIG. 35 is a diagram illustrating a velocity element when the bucket 8 approaches the target excavation ground shape 74 corresponding to the side wall 71a. FIG. 36 is a diagram illustrating a boom limitation velocity Vt_bm_lmt. In step S31, the target velocity determination unit 52 illustrated in FIG. 5 obtains the swing target velocity Vct and the target velocity Vft in the front to back direction of the work unit 2. Since the method of obtaining the swing target velocity Vct is the same as the above-described method, the description thereof will be omitted.

The target velocity Vft in the front to back direction of the work unit 2 is obtained as below. As illustrated in FIG. 33, the target velocity determination unit 52 converts a boom target velocity Vc_bm into a velocity element VL1_bm in the perpendicular axis direction and a velocity element VL2_bm in the horizontal axis direction of the local coordinate system by a trigonometric function from an angle β2 formed between the perpendicular axis of the local coordinate system and the direction of the boom target velocity Vc_bm. The target velocity determination unit 52 converts an arm target velocity Vc_am into a velocity element VL1_am in the perpendicular axis direction and a velocity element VL2_am in the horizontal axis direction of the local coordinate system by a trigonometric function from an angle β3 formed between the perpendicular axis of the local coordinate system and the direction of the arm target velocity Vc_am. The target velocity determination unit 52 converts a bucket target velocity Vc_bk into a velocity element VL1_bk in the perpendicular axis direction and a velocity element VL2_bk in the horizontal axis direction of the local coordinate system by a trigonometric function from an angle β4 formed between the perpendicular axis of the local coordinate system and the direction of the bucket target velocity Vc_bk.

The target velocity determination unit 52 subtracts the velocity element VL2_bm in the horizontal axis direction of the boom from the velocity element VL2_am in the horizontal axis direction of the arm and the velocity element VL2_bk in the horizontal axis direction of the bucket. This value is the target velocity Vft in the front to back direction.

When the swing target velocity Vct and the target velocity Vft in the front to back direction are obtained, the target velocity determination unit 52 obtains the velocity Vt having those velocities synthesized in step S32 (see FIG. 34). Hereinafter, the velocity Vt having the swing target velocity Vct synthesized with the target velocity Vft in the front to back direction will be referred to as a control target velocity Vt. The control target velocity Vt can be obtained by $\sqrt{(Vct^2+Vft^2)}$.

Next, in step S33, as illustrated in FIG. 35, the target velocity determination unit 52 converts the control target velocity Vt into a velocity element (hereinafter, appropriately referred to as a perpendicular velocity element) Vty_t in the direction perpendicular to the target excavation ground shape 74 (the width-direction target excavation ground shape data item Uw) and a velocity element (hereinafter, appropriately referred to as a horizontal velocity element) Vtx_t in a direction parallel to the target excavation ground shape 74 (the width-direction target excavation ground shape data item Uw). In the example illustrated in FIG. 35, the perpendicular velocity element Vty_t and the horizontal velocity element Vtx_t are obtained for the target excavation ground shape 74 corresponding to the side wall 71*a* illustrated in FIG. 34. In the example illustrated in FIG. 35, the side wall 71*a* is inclined by an angle α with respect to a horizontal plane HL of the local coordinate system (x, y, z) of the excavator 100, that is, a plane parallel to the xy plane. For this reason, the perpendicular velocity element Vty_t can be obtained by Vt×cos(π/2−α), and the horizontal velocity element Vtx_t can be obtained by Vt×sin(π/2−α).

In step S34, the distance acquisition unit 53 of the work unit controller 26 illustrated in FIG. 5 acquires the distance d between the blade tip 8T of the bucket 8 and the target excavation ground shape 74 corresponding to the side wall 71*a* as illustrated in FIG. 29 described above. In particular, the distance acquisition unit 53 calculates the distance d between the blade tip 8T at the center in the width direction of the bucket 8 and the target excavation ground shape 46I from the position information item of the blade tip 8T acquired as described above and the width-direction target excavation ground shape data item Uw indicating the position of the target excavation ground shape 46I. In this case, the distance acquisition unit 53 may calculate a distance serving as the shortest distance between the blade tip 8T of the bucket 8 and the target excavation ground shape 46I and the work unit controller 26 may perform the excavation control in the width direction based on the shortest distance.

In step S35, the limitation velocity determination unit 54 of the work unit controller 26 illustrated in FIG. 5 calculates the limitation velocity Vty_lmt of the entire work unit 2 illustrated in FIG. 1 based on the distance d between the blade tip 8T of the bucket 8 and the target excavation ground shape 46I. Since the limitation velocity Vty_lmt of the entire work unit 2 is the same as that of the first embodiment, the description thereof will be omitted. In step S36, as illustrated in FIG. 36, the limitation velocity determination unit 54 calculates a limitation perpendicular velocity element Vty_bm_lmt of the boom 6 by subtracting the perpendicular velocity element Vty_t of the swing target velocity Vct from the limitation velocity Vty_lmt of the entire work unit 2.

In step S37, as illustrated in FIG. 30, the limitation velocity determination unit 54 converts the limitation perpendicular velocity element Vty_bm_lmt of the boom 6 into the limitation velocity (the boom limitation velocity) Vt_bm_lmt of the boom 6. Specifically, the boom limitation velocity Vt_bm_lmt is obtained by multiplying the limitation perpendicular velocity element Vty_bm_lmt by sin(π/2−α). In step S38, when the pilot pressure based on the boom interposition instruction CBI is larger than the pilot pressure generated based on the operation of the boom 6, the work unit control unit 57 of the work unit controller 26 generates the boom instruction signal CB so that the velocity of the boom 6 becomes the boom limitation velocity Vt_bm_lmt and controls the interposition valve 27C illustrated in FIG. 2.

In the present example, the work unit controller 26 can acquire the target excavation ground shape 74 in consideration of the operation in the front to back direction and the width direction of the work unit 2 by using the control target velocity Vt having the swing target velocity Vct synthesized with the target velocity Vft in the front to back direction. For this reason, since there is no need to switch the front to back direction and the width direction of the work unit 2 in the excavation control, the smooth excavation control can be realized.

Modified Example

In the present embodiment, the swing target velocity Vct of the blade tip 8T is obtained based on the swing operation amount MR obtained from the operation device 25. In the present modified example, a swing target velocity Vct of a blade tip 8T is obtained based on a detection result of the IMU 24 illustrated in FIG. 2 and reference position data items P1 and P2 of GNSS antennas 21 and 22 detected by a position detection device 19. In the present modified example, a position of a work unit 2 is predicted by using the detection result of the IMU 24 and the reference position data items P1 and P2 of the GNSS antennas 21 and 22 detected by the position detection device 19.

Figure 37:
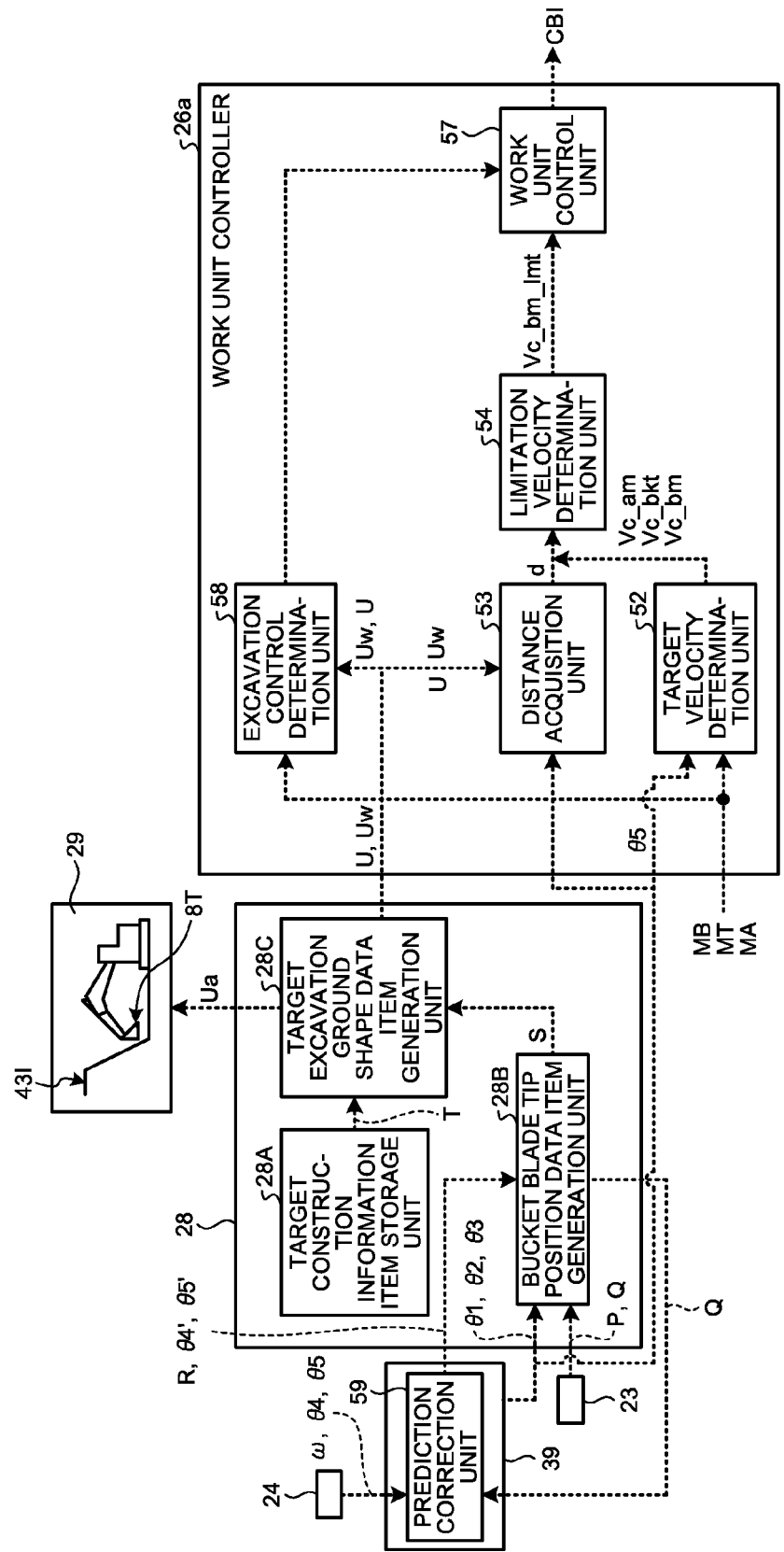
FIG. 37 is a block diagram illustrating a display controller and illustrating a work unit controller and a sensor controller according to a modified example.
Figure 38A:
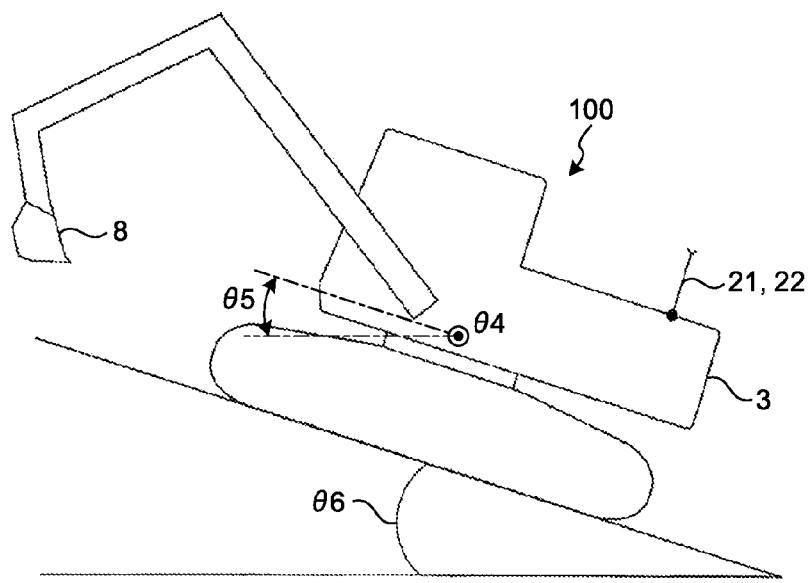
FIG. 38A is a diagram illustrating a posture of an excavator.
Figure 38B:
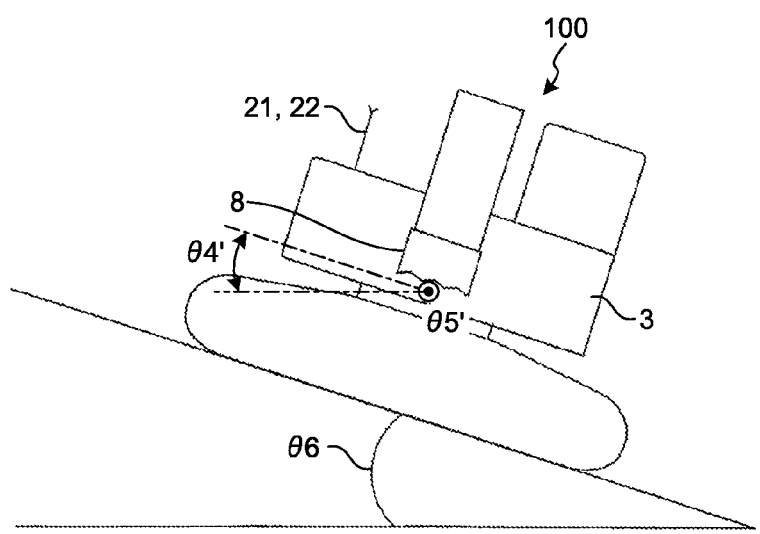
FIG. 38B is a diagram illustrating a posture of the excavator.

FIG. 37 is a block diagram illustrating a display controller 28 and illustrating a work unit controller 26*a* and a sensor controller 39a according to the modified example. FIGS. 38A and 38B are diagrams illustrating a posture of an excavator 100. The work unit controller 26a is the same as the work unit controller 26 (see FIG. 5) described in the first embodiment, but has a difference in that a prediction correction unit 59 is included. The prediction correction unit 59 acquires a swing body orientation data item Q indicating the orientation in which an upper swing body 3, that is, the work unit 2 faces from the display controller 28. The prediction correction unit 59 acquires a swing angular velocity ω of the upper swing body 3 from the IMU 24. The prediction correction unit 59 predicts and corrects the swing body orientation data item Q based on a swing angular velocity data item Dω.

For example, the prediction correction unit 59 calculates a prediction rotation angle ω·t by multiplying the swing angular velocity ω by a delay time t. The delay time t refers to a time which is predicted to be necessary for the generation of a bucket blade tip position data item S and a target excavation ground shape data item U. For example, in the present embodiment, since the position detection device 19 detects the reference position data items P1 and P2 of the GNSS antennas 21 and 22 in a cycle of, for example, about 100 msec and outputs the reference position data items to the display controller 28, a time of about at least 100 msec is necessary for the work unit controller 26 to acquire the bucket blade tip position data item S and the target excavation ground shape data item U output from the display controller 28. Furthermore, when a calculation is performed through the display controller 28, further time is necessary for the work unit controller 26 to acquire the bucket blade tip position data item S and the target excavation ground shape data item U.

The prediction correction unit 59 generates a correction swing body orientation data item R indicating a prediction orientation at a time point at which the upper swing body rotates only by the prediction rotation angle ω·t, based on the orientation of the swing body orientation data item Q of the upper swing body 3 acquired from a bucket blade tip position data item generation unit 28B, the angular velocity ω acquired from the IMU 29, and the prediction delay time t. The prediction orientation indicated by the correction swing body orientation data item R is the orientation of the upper swing body 3, that is, the work unit 2 at a generation time point of the target excavation ground shape data item U.

The prediction correction unit 59 acquires an inclination angle θ4 with respect to the width direction of the upper swing body 3 and an inclination angle θ5 with respect to the front to back direction of the upper swing body 3 from the IMU 24. The prediction correction unit 59 calculates the prediction orientation of the upper swing body 3 based on the correction swing body orientation data item R from the prediction orientation data item R, the inclination angle θ4, and the inclination angle θ5. The prediction correction unit 59 calculates prediction inclination angles θ4' and θ5' in the prediction orientation. Next, the prediction inclination angles θ4' and θ5' will be described on the assumption that after the excavator 100 performs work in the front direction in an inclined ground surface of an inclination angle θ6 as illustrated in FIG. 38A, the upper swing body 3 swings and faces the lateral side as illustrated in FIG. 38B.

Before and after the swing operation, the inclination angle θ5 with respect to the front to back direction of the upper swing body 3 gradually decreases from θ6 and becomes zero. Meanwhile, the inclination angle θ4 with respect to the lateral direction gradually increases from zero and becomes θ6. Accordingly, the prediction correction unit 59 can calculate the prediction inclination angles θ4' and θ5' after the elapse of the delay time t, based on the swing angular velocity ω. The prediction correction unit 59 outputs the prediction inclination angles θ4' and θ5' to the bucket blade tip position data item generation unit 28B. When the excavator 100 performs work in an inclined ground surface or the like, the predication correction of the inclination of the upper swing body 3 becomes possible even in a circumstance where the inclination angles θ4 and θ5 of the upper swing body 3 change with the swing.

Figure 39:
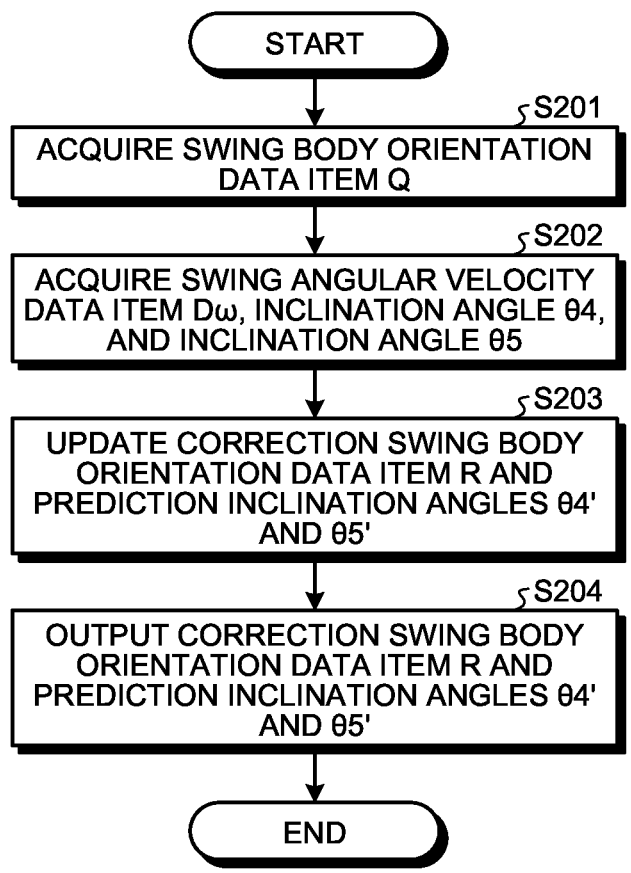
FIG. 39 is a flowchart illustrating a process in which a prediction correction unit updates a correction swing body orientation data item.
Figure 40:
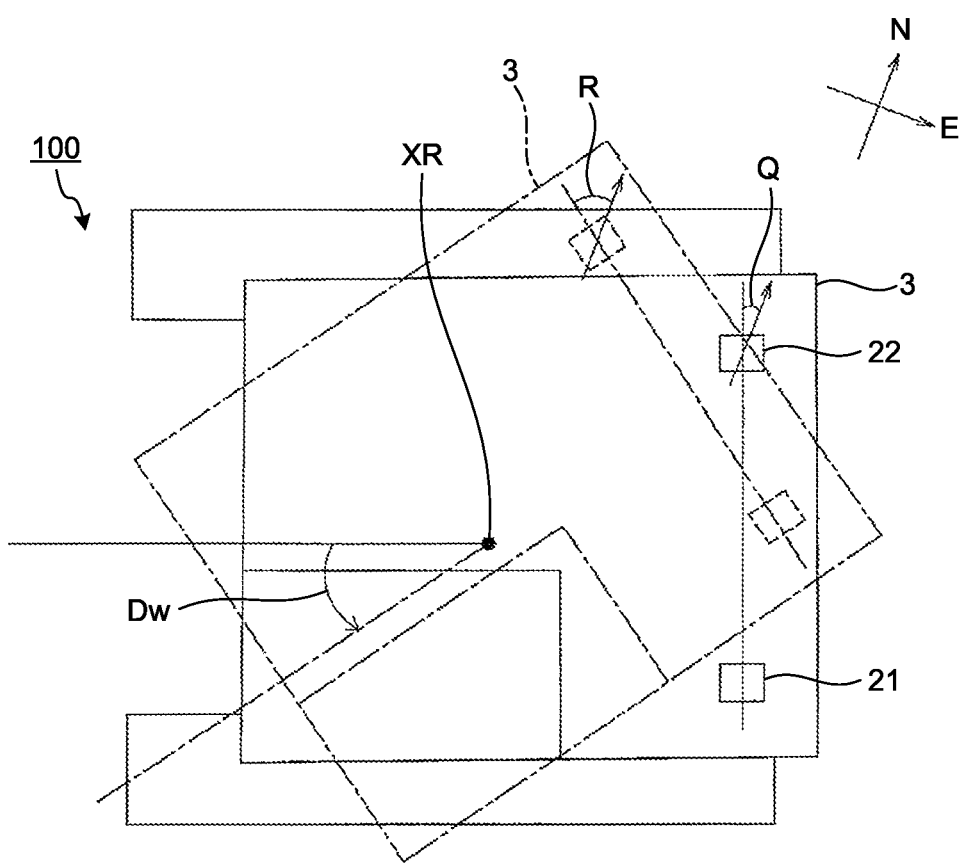
FIG. 40 is a diagram illustrating a process of the prediction correction unit which is performed in accordance with the operation of an upper swing body.

FIG. 39 is a flowchart illustrating a process in which the prediction correction unit 59 updates the correction swing body orientation data item R. FIG. 40 is a diagram illustrating a process of the prediction correction unit 59 which is performed in accordance with the operation of the upper swing body 3. The correction swing body orientation data item R of the prediction correction unit 59 will be described with reference to FIGS. 38A, 38B, and 40. In step S201, the prediction correction unit 59 acquires the swing body orientation data item Q indicating the orientation in which the upper swing body 3 faces in, for example, a cycle of 10 Hz (an example of a second cycle) from a global coordinate calculation unit 23.

In step S202, the prediction correction unit 59 acquires the swing angular velocity ω about a swing axis z, the inclination angle θ4 with respect to the front to back direction of the upper swing body 3, and the inclination angle θ5 with respect to the right and left direction of the upper swing body 3 in, for example, a cycle of 100 Hz (an example of a first cycle) from the IMU 24. In step S203, the prediction correction unit 59 updates the information items to the correction swing body orientation data item R indicating the orientation of the upper swing body 3 after the upper swing body 3 swings by ω·t, the prediction inclination angle θ4' with respect to the front to back direction of the upper swing body 3, and the prediction inclination angle θ5' with respect to the right and left direction of the upper swing body 3 by using the recent swing angular velocity ω in response to the acquisition of the swing body orientation data item Q.

In step S204, the prediction correction unit 59 outputs the updated correction swing body orientation data item R and the updated prediction inclination angles θ4' and θ5' to the bucket blade tip position data item generation unit 28B. The prediction correction unit 59 updates the correction swing body orientation data item R and the prediction inclination angles θ4' and θ5' by repeating step S201 to step S204 every time the swing body orientation data item Q is acquired.

In this way, the prediction correction unit 59 can generate the correction swing body orientation data item R and the prediction inclination angles θ4' and θ5' at a cycle higher than the swing body orientation data item Q by using the swing angular velocity ω and the inclination angles θ4 and θ5 generated by the IMU 24 at the measurement cycle faster than the swing body orientation data item Q. Furthermore, the correction swing body orientation data item R and the prediction inclination angles θ4' and θ5' can also update the swing angular velocity ω and the inclination angles θ4 and θ5 which are likely to include a variation in thermal drift by the swing body orientation data item Q acquired from the global coordinate calculation unit 23. For this reason, it becomes possible to output the correction swing body orientation data item R and the prediction inclination angles θ4' and θ5' related to the cycle of generating the target excavation ground shape data item U with respect to the delay time t.

The prediction correction unit 59 generates the correction swing body orientation data item R (an example of the correction swing body arrangement data item) by predicting and correcting the swing body orientation data item Q based on the swing angular velocity ω (an example of the operation data item) indicating the swing angular velocity ω of the upper swing body 3, and the delay time t. The bucket blade tip position data item generation unit 28B generates the bucket blade tip position data item S (an example of the work unit position data item) indicating the position of the blade tip 8T of the bucket 8, based on the reference position data item P1, the swing body orientation data item Q, and the correction swing body orientation data item R. A target excavation ground shape data item generation unit 28C generates the target excavation ground shape data item U based on the bucket blade tip position data item S and a target construction information item T. The delay time t includes a time necessary for generating the bucket blade tip position data item S and the target excavation ground shape data item U and a communication time necessary for the work unit controller 26 to acquire the generated target excavation ground shape data item U. In the time necessary for generating the bucket blade tip position data item S and the target excavation ground shape data item U, there is considered the calculation delay when the calculation is performed through the display controller 28. In the present embodiment, about 0.4 seconds is assumed as the delay time t in consideration of the above, but the delay time t can be appropriately changed in response to the specification or the like of the work unit controller 26 and the display controller 28.

In this way, the prediction correction unit 59 can predict the orientation in which the upper swing body 3 faces at the generation time point of the target excavation ground shape data item U, based on the swing angular velocity ω of the upper swing body 3. For that reason, the bucket blade tip position data item generation unit 28B can predict the position of the blade tip 8T of the bucket 8 (the position of the work unit 2) at a time point at which the delay time t elapses. As a result, the target excavation ground shape data item generation unit 28C can generate the target excavation ground shape data item U corresponding to the position of the blade tip 8T of the bucket 8 at the time point at which the delay time t elapses. Since the work unit controller 26 performs the excavation control in the width direction by using the target excavation ground shape data item U with the delay time t taken into consideration, the work unit 2 can be controlled based on the target excavation ground shape data item U in which the bucket 8 is close to a portion that is to be the excavation target.

The prediction correction unit 59 acquires the swing angular velocity ω at, for example, 100 Hz (an example of a first cycle) and acquires the swing body orientation data item Q at, for example, 10 Hz (an example of a second cycle). Accordingly, the prediction correction unit 59 can generate the correction swing body orientation data item R by using the swing body orientation data item Q which is acquired periodically. For this reason, even when a thermal drift is generated in the IMU 24 generating the swing angular velocity ω, a correction orientation can be calculated based on the swing body orientation data item Q which is updated every, for example, 10 Hz. As a result, it is possible to continuously generate the correction swing body orientation data item R indicating the correction orientation.

In the present embodiment, the IMU 24 acquires the swing angular velocity ω indicating the swing angular velocity ω of the upper swing body 3, and the inclination angles θ4 and θ5 as the operation data item indicating the operation of the upper swing body 3, but is not limited thereto. The IMU 24 may acquire a change in an inclination angle indicating the inclination of the upper swing body 3. The inclination angle of the upper swing body 3 refers to a change amount of the inclination angles θ4 and θ5 (see FIGS. 3A and 3B) per unit time. Since the position of the blade tip 8T of the bucket 8 at the elapse time point of the delay time t can also be acquired when the excavator 100 rotates by using such a change in the inclination angle instead of the swing angular velocity ω, the target excavation ground shape data item generation unit 28C can generate the target excavation ground shape data item U corresponding to the position of the blade tip 8T of the bucket 8 at the time point at which the delay time t elapses.

In the present embodiment, the prediction correction unit 59 acquires the swing angular velocity ω generated by the IMU 24, but is not limited thereto. The prediction correction unit 59 can acquire the swing angular velocity ω based on the rotation angle detected by the potentiometer installed in the upper swing body 3 and the swing operation amount MR output from the operation device 25. Furthermore, the prediction correction unit 59 can also acquire the reference position data items P1 and P2 of the GNSS antennas 21 and 22 from the global coordinate calculation unit 23 and acquire the swing angular velocity ω based on the two reference position data items P1 and P2.

In the present embodiment, the bucket blade tip position data item generation unit 28B calculates the position of the swing center of the excavator 100 based on the reference position data item P1 and the swing body orientation data item Q, but is not limited thereto. The bucket blade tip position data item generation unit 28B may use a data item acquired by an orientation sensor such as a magnetic sensor indicating the orientation of the upper swing body 3 at a time point at which the GNSS antenna 21 receives the reference position data item P1, instead of the swing body orientation data item Q.

In the present embodiment, the prediction correction unit 59 acquires the swing body orientation data item Q in, for example, a cycle of 10 Hz (an example of a second cycle) from the global coordinate calculation unit 23, but the swing body orientation data item Q may be acquired at least once unless the thermal drift of the IMU 24 needs to be considered. In this case, the prediction correction unit 59 can update the orientation of the upper swing body 3 in, for example, a cycle of 100 Hz (an example of a first cycle) by adding the swing angular velocity ω based on the acquired swing body orientation data item Q whenever necessary.

In the present embodiment, the display controller 28 generates the bucket blade tip position data item S as the work unit position data item, but is not limited thereto. The display controller 28 may acquire a position data item indicating an arbitrary position of the bucket 8, instead of the bucket blade tip position data item S. Furthermore, the display controller 28 may acquire a position data item indicating an arbitrary position closer to the target excavation ground shape data item Ua of the bucket blade tip position data item S. Furthermore, the work unit controller 26 may perform at least one of the storage of the target construction information item, the generation of the bucket blade tip position data item, and the generation of the target excavation ground shape data item performed in the display controller 28. Each process performed by the sensor controller 39 may be performed by the work unit controller 26.

The excavator 100 may be an excavator that can perform both the excavation control based on the target excavation ground shape 46I in the width direction of the work unit 2 and the excavation control in the front to back direction based on the target excavation ground shape 43I in the front to back direction of the excavator 100. Furthermore, the excavator 100 may be an excavator that can perform the excavation control only based on the target excavation ground shape 46I in the width direction of the work unit 2.

While the first embodiment and the second embodiment have been described as above, the first embodiment and the second embodiment are not limited to the above-described content. Furthermore, the above-described component includes a component which can be easily envisaged by the person skilled in the art and a component which is substantially the same and a component within a so-called equivalent scope. Further, it is possible to combine the above-described components appropriately. Further, at least one of various omissions, substitutions, and modifications of the components can be made without departing from the spirit of the first embodiment and the second embodiment. For example, the work unit 2 includes the boom 6, the arm 7, and the bucket 8, but the attachment attached to the work unit 2 is not limited thereto nor limited to the bucket 8. The work machine is not limited to the excavator 100, and may be, for example, a bulldozer or a motor grader.

REFERENCE SIGNS LIST

1 VEHICLE BODY
2 WORK UNIT
3 UPPER SWING BODY
6 BOOM
7 ARM
8 BUCKET
8T BLADE TIP
10 BOOM CYLINDER
11 ARM CYLINDER
12 BUCKET CYLINDER
19 POSITION DETECTION DEVICE
21, 22 ANTENNA
23 GLOBAL COORDINATE CALCULATION UNIT
25 OPERATION DEVICE
25R RIGHT OPERATION LEVER
25L LEFT OPERATION LEVER
26, 26A WORK UNIT CONTROLLER
26M STORAGE UNIT
26P PROCESS UNIT
27 ELECTROMAGNETIC VALVE
28 DISPLAY CONTROLLER
28A TARGET CONSTRUCTION INFORMATION ITEM STORAGE UNIT
28B BUCKET BLADE TIP POSITION DATA ITEM GENERATION UNIT
28C TARGET EXCAVATION GROUND SHAPE DATA ITEM GENERATION UNIT
29S SWITCH
29 DISPLAY UNIT
35 ENGINE
36, 37 HYDRAULIC PUMP
38 SWING MOTOR
41 TARGET CONSTRUCTION FACE
42, 42m, 42c, 44, 45 PLANE
43, 46 INTERSECTION LINE
43I, 46I TARGET EXCAVATION GROUND SHAPE
44 EXCAVATION TARGET POSITION
52 TARGET VELOCITY DETERMINATION UNIT
53 DISTANCE ACQUISITION UNIT
54 LIMITATION VELOCITY DETERMINATION UNIT
57 WORK UNIT CONTROL UNIT
58 CONTROL DETERMINATION UNIT
59 PREDICTION CORRECTION UNIT
60 ALIGNMENT MARKER
60T TIP
70 ABYSS
71, 72 ABYSS WALL
73 ABYSS BOTTOM
100 EXCAVATOR
200 WORK MACHINE CONTROL SYSTEM (CONTROL SYSTEM)
300 HYDRAULIC SYSTEM

The invention claimed is:

1. A work machine control system that controls a work machine including a work unit with a working tool, the work machine control system comprising:
   a position detection unit that detects a position information item of the work machine;
   a generation unit that obtains a position of the work unit based on the position information item detected by the position detection unit and generates a first target excavation ground shape information item as an information item of an intersection portion of a first cut face which intersects a work unit operation plane as an operation plane for the work unit and is parallel to a vertical direction with respect to at least one target construction face which indicates a target shape; and
   a work unit control unit that performs an excavation control so that a velocity in a direction in which the work unit approaches an excavation target becomes equal to or less than a limitation velocity based on the first target excavation ground shape information item acquired from the generation unit, and
   wherein the work machine includes a swing body that has the work unit attached thereto and that swings about a predetermined axis, and
   wherein the work unit control unit performs the excavation control based on a velocity having a target velocity in a direction in which the work unit swings synthesized with a target velocity in a front to back direction of the working tool when the work unit is swinging along with the swing body.

2. The work unit control system according to claim 1, wherein the generation unit generates a second target excavation ground shape information item as an information item of an intersection portion of the at least one target construction face with respect to the work unit operation plane or a second cut face which is parallel to the work unit operation plane, and
   wherein the work unit control unit performs the excavation control based on the first target excavation ground shape information item and the second target excavation ground shape information item acquired from the generation unit.

3. The work machine control system according to claim 2, wherein the work unit control unit performs the excavation control based on the second target excavation ground shape information item, and stops the excavation control which is currently performed or resumes the excavation control which is currently stopped based on the first target excavation ground shape information item.

4. The work machine control system according to claim 3, wherein the work unit control unit stops the excavation control when an angle of the first target excavation ground shape information item directly below the working tool with respect to a horizontal plane of the work machine is equal to or more than a predetermined magnitude.

5. The work machine control system according to claim 1, wherein the work unit control unit performs the excavation control based on a shortest distance between a blade tip of the working tool and the first target excavation ground shape information item.

6. The work machine control system according to claim 1, wherein the work unit control unit determines whether to perform the excavation control on the target construction face corresponding to the first target excavation ground shape information item based on a distance between a blade tip of the working tool and the first target excavation ground shape information item.

7. The work machine control system according to claim 6, wherein the work machine includes a swing body that has the work unit attached thereto and that swings about a predetermined axis, and
wherein the work unit control unit performs the excavation control when the work unit is swinging along with the swing body.

8. A work machine comprising:
the work machine control system according to claim 1.

9. A work machine control system that controls a work machine including a work unit with a working tool, the work machine control system comprising:
a position detection unit that detects a position information item of the work machine;
a generation unit that obtains a position of the work unit based on the position information item detected by the position detection unit and generates a first target excavation ground shape information item as an information item of an intersection portion of a first cut face, which intersects a work unit operation plane as an operation plane for the work unit and is parallel to a vertical direction, with respect to a first target construction face which indicates a target shape and a second target construction face which is continuous to a lateral side of the first target construction face; and
a work unit control unit that performs an excavation control so that a velocity in a direction in which the work unit approaches an excavation target becomes equal to or less than a limitation velocity based on the first target excavation ground shape information item acquired from the generation unit.

10. The work unit control system according to claim 9, wherein the generation unit generates a second target excavation ground shape information item as an information item of an intersection portion of the first target construction face with respect to the work unit operation plane or a second cut face which is parallel to the work unit operation plane, and
wherein the work unit control unit performs the excavation control based on the first target excavation ground shape information item and the second target excavation ground shape information item acquired from the generation unit.

11. The work machine control system according to claim 10,
wherein the work unit control unit performs the excavation control based on the second target excavation ground shape information item, and stops the excavation control which is currently performed or resumes the excavation control which is currently stopped based on the first target excavation ground shape information item.

12. The work machine control system according to claim 11,
wherein the work unit control unit stops the excavation control when an angle of the first target excavation ground shape information item directly below the working tool with respect to a horizontal plane of the work machine is equal to or more than a predetermined magnitude.

13. The work machine control system according to claim 9,
wherein the work unit control unit performs the excavation control based on a shortest distance between a blade tip of the working tool and the first target excavation ground shape information item.

14. The work machine control system according to claim 9,
wherein the work unit control unit determines whether to perform the excavation control on the target construction face corresponding to the first target excavation ground shape information item based on a distance between a blade tip of the working tool and the first target excavation ground shape information item.

15. The work machine control system according to claim 9,
wherein the work machine includes a swing body that has the work unit attached thereto and that swings about a predetermined axis, and
wherein the work unit control unit performs the excavation control when the work unit is swinging along with the swing body.

16. A work machine comprising:
the work machine control system according to claim 9.

17. A work machine control method of controlling a work machine including a work unit with a working tool and a swing body that has the work unit attached thereto and that swings about a predetermined axis, the work machine control method comprising:
detecting a position of the work unit;
predicting and obtaining the position of the work unit based on the detected position information item of the work machine and a swing velocity of the swing body and generating a first target excavation ground shape information item as an information item of an intersection portion of a first cut face which intersects a work unit operation plane as an operation plane for the work unit and is parallel to a vertical direction with respect to at least one target construction face indicating a target shape;
performing, by a work unit controller, when the work unit is swinging along with the swing body, an excavation control so that a velocity in a direction in which the work unit approaches an excavation target becomes equal to or less than a limitation velocity based on the first target excavation ground shape information item; and
predicting the position of the work unit by using the swing velocity of the swing body.

18. The work unit control method according to claim 17, wherein the controlling includes controlling the velocity in a direction in which the work unit approaches the excavation target so that the velocity becomes equal to or less than the limitation velocity based on the first target excavation ground shape information item and a second target excavation ground shape information item as an information item of an intersection portion of the at least one target construction face with respect to the work unit operation plane or a second cut face which is parallel to the work unit operation plane.

19. The work machine control method according to claim 18,
wherein in a case where a control is performed in which the velocity in a direction in which the work unit approaches the excavation target becomes equal to or less than the limitation velocity, it is determined whether to perform the excavation control on the target construction face corresponding to the first target excavation ground shape information item based on a distance between a blade tip of the working tool and the first target excavation ground shape information item.

20. A work machine control method of controlling a work machine including a work unit with a working tool, the work machine control method comprising:
detecting a position of the work machine;
obtaining the position of the work unit based on the detected position information item of the work machine and generating a first target excavation ground shape information item as an information item of an intersection portion of a first cut face which intersects a work unit operation plane as an operation plane for the work unit and is parallel to a vertical direction with respect to a first target construction face indicating a target shape and a second target construction face which is continuous to a lateral side of the first target construction face; and
performing, by a work unit controller, an excavation control so that a velocity in a direction in which the work unit approaches an excavation target becomes equal to or less than a limitation velocity based on the first target excavation ground shape information item.

21. A work machine control system that controls a work machine including a work unit with a working tool, the work machine control system comprising:
a position detection unit that detects a position information item of the work machine;
a generation unit that obtains a position of the work unit based on the position information item detected by the position detection unit and generates a first target excavation ground shape information item as an information item of an intersection portion of a first cut face which intersects a work unit operation plane as an operation plane for the work unit and is parallel to a vertical direction with respect to at least one target construction face which indicates a target shape;
a work unit control unit that performs an excavation control so that a velocity in a direction in which the work unit approaches an excavation target becomes equal to or less than a limitation velocity based on the first target excavation ground shape information item acquired from the generation unit; and
a detection device that is provided in the work machine and detects an angular velocity and acceleration,
wherein the work machine includes a swing body that has the work unit attached thereto and that swings about a predetermined axis, and
wherein the work unit control unit performs the excavation control when the work unit is swinging along with the swing body, and
wherein the work unit control unit predicts a position of the work unit by using a swing velocity of the work unit detected by the detection device.

22. A work machine control method of controlling a work machine including a work unit with a working tool and a swing body that has the work unit attached thereto and that swings about a predetermined axis, the work machine control method comprising:
detecting a position of the work unit;
obtaining the position of the work unit based on the detected position information item of the work machine and generating a first target excavation ground shape information item as an information item of an intersection portion of a first cut face which intersects a work unit operation plane as an operation plane for the work unit and is parallel to a vertical direction with respect to at least one target construction face indicating a target shape; and
performing, by a work unit controller, when the work unit is swinging along with the swing body, an excavation control so that a velocity in a direction in which the work unit approaches an excavation target becomes equal to or less than a limitation velocity based on the first target excavation ground shape information item,
wherein the excavation control is performed based on a velocity having a target velocity in a direction in which the work unit swings synthesized with a target velocity in a front to back direction of the working tool.

* * * * *